US012748263B2

(12) United States Patent
Prabhu et al.

(10) Patent No.: US 12,748,263 B2
(45) Date of Patent: Sep. 29, 2026

(54) OPTICAL FLOW SWITCHING USING PHOTONIC INTEGRATED CIRCUITS

(71) Applicant: Lightmatter, Inc., Boston, MA (US)

(72) Inventors: Mihika Prabhu, Watertown, MA (US); Alexander Sludds, Cambridge, MA (US); Aravind Kalaiah, San Jose, CA (US); Ajay Joshi, Lexington, MA (US); Bradford Turcott, Georgetown, TX (US); Robert Turner, Georgetown, TX (US); Nicholas C. Harris, Menlo Park, CA (US); Darius Bunandar, Boston, MA (US)

(73) Assignee: Lightmatter, Inc., Mountain View, CA (US)

( * ) Notice: Subject to any disclaimer, the term of this patent is extended or adjusted under 35 U.S.C. 154(b) by 341 days.

(21) Appl. No.: 18/417,875

(22) Filed: Jan. 19, 2024

(65) Prior Publication Data

US 2024/0248260 A1 Jul. 25, 2024

Related U.S. Application Data

(60) Provisional application No. 63/511,165, filed on Jun. 29, 2023, provisional application No. 63/503,452, filed on May 19, 2023, provisional application No. 63/440,332, filed on Jan. 20, 2023.

(51) Int. Cl.

*G02B 6/35* (2006.01)
*G02B 6/293* (2006.01)

(52) U.S. Cl.

CPC ....... *G02B 6/3546* (2013.01); *G02B 6/29353* (2013.01); *G02B 6/29355* (2013.01)

(58) Field of Classification Search

CPC ........................................................ G02B 6/3546

See application file for complete search history.

(56) References Cited

U.S. PATENT DOCUMENTS

| | | | | |
|---|---|---|---|---|
| 5,878,177 | A | 3/1999 | Karasan et al. | |
| 6,259,833 | B1 * | 7/2001 | Doerr ................ | H04Q 11/0005 398/9 |
| 2020/0066651 | A1 | 2/2020 | Burton et al. | |
| 2020/0393737 | A1 | 12/2020 | Hosseini et al. | |

OTHER PUBLICATIONS

International Search report and Written Opinion dated Jul. 5, 2024, in connection with International Application No. PCT/US2024/12166.

(Continued)

*Primary Examiner* — Lisa M Caputo

(74) *Attorney, Agent, or Firm* — Wolf, Greenfield & Sacks, P.C.

(57) ABSTRACT

Provided herein are optical flow switches, and optical flow switch packages, implemented using photonic switches. The optical flow switch includes a network of photonic switches arranged between input and output ports of the optical flow switch. The network of photonic switches spans two or more reticles, and the two or more reticles may include photonic switching arrangements corresponding to repeated reticle masks or sets of reticle masks. The optical flow switch may be mounted to a glass substrate to form an optical flow switch package.

30 Claims, 48 Drawing Sheets

(56) References Cited

OTHER PUBLICATIONS

Invitation to Pay Additional Fees dated Apr. 8, 2024, in connection with International Application No. PCT/US2024/012166.
Jin et al. Seamless multi-reticle photonics. Optics Letters. Jun. 15, 2021;46(12). 4 Pages.
Seok et al., Wafer-scale silicon photonic switches beyond die size limit. Journal of Optical Society of America. Apr. 12, 2019;6(4):490-94.

* cited by examiner

OPTICAL FLOW SWITCHING USING PHOTONIC INTEGRATED CIRCUITS

CROSS-REFERENCE TO RELATED APPLICATIONS

This application claims the benefit of U.S. Provisional Application Ser. No. 63/440,332, filed on Jan. 20, 2023, and entitled "OPTICAL FLOW SWITCHING USING PHOTONIC INTEGRATED CIRCUITS," and of U.S. Provisional Application Ser. No. 63/503,452, filed on May 19, 2023, and entitled "MULTI-RETICLE OPTICAL FLOW SWITCH," and of U.S. Provisional Application Ser. No. 63/511,165, filed on Jun. 29, 2023, and entitled "OPTICAL FLOW SWITCH WITH CROSSING STAMPS," each of which is hereby incorporated herein by reference in its entirety.

BACKGROUND

Field

The aspects described herein relate to photonic optical flow switches.

Related Art

An optical flow switch or an optical circuit switch (OCS) is a basic building block in high-performance data centers or computing systems and routes optical signals between portions of the data center or computing system. Optical flow switches may additionally route optical signals that are encoded in either the amplitude, phase, directionality, and/or polarization of light. Optical flow switches can be used to adapt the network topology such that, for example, servers that communicate high bandwidth data can be awarded additional direct optical connections to increase their bandwidth.

BRIEF SUMMARY

Some embodiments provide for an optical flow switch. The optical flow switch comprises a network of photonic switches arranged between input and output ports of the optical flow switch, and the network of photonic switches spans two or more reticles.

In some embodiments, the two or more reticles comprise a same reticle pattern, and the network of photonic switches is formed of a repeating arrangement of the same reticle pattern.

In some embodiments, the network of photonic switches comprises a Cantor network or a Benes network.

In some embodiments, the network of photonic switches comprises a first plurality of switches arranged to form Benes switches.

In some embodiments, the network of photonic switches further comprises a second plurality of switches comprising input routing switches coupled between the input ports and the Benes switches. In some embodiments, switches of the second plurality of switches are coupled between an input port of the input ports and each Benes switch of the Benes switches. In some embodiments, switches of the second plurality of switches are coupled between an input port of the input ports and Benes switches disposed across the two or more reticles.

In some embodiments, the second plurality of switches comprise: first input routing switches arranged to receive optical signals from the input ports, second input routing switches arranged to receive optical signals from the first routing switches, and third input routing switches arranged to receive optical signals from the second routing switches and to transmit optical signals to the Benes switches.

In some embodiments, the Cantor network comprises an N×N Cantor network, the input ports comprise k input ports, the two or more reticles comprise r reticles, and the Benes switches comprise m total $\tilde{N}\times\tilde{N}$ Benes switches, where $\tilde{N}=2^{ceil(log_2 N)}$, $m=qr\geq\log_2\tilde{N}$, and $kr\geq\tilde{N}$.

In some embodiments, the first input routing switches comprise k total 1:r photonic switches; the second input routing switches comprise kr total 1:r photonic switches; and the third input routing switches comprise $kr^2$ total r:q photonic switches.

In some embodiments, the network of photonic switches further comprises a third plurality of switches comprising output routing switches coupled between the Benes switches and the output ports. In some embodiments, switches of the third plurality of switches are coupled between each Benes switch and an output port of the output ports. In some embodiments, switches of the third plurality of switches are coupled between Benes switches disposed across the two or more reticles and an output port of the output ports.

In some embodiments, the two or more reticles comprise rows or columns of reticles, each row or column of reticles being formed using a same set of reticle patterns.

In some embodiments, the rows or columns of reticles comprise X rows or columns of reticles, and the optical flow switch further comprises 1:X and/or X:1 switch routers disposed between photonic switches of the network of photonic switches. In some embodiments, X=2. In some embodiments, X=4.

In some embodiments, the optical flow switch further comprises 1:2 and/or 2:1 switch routers disposed between photonic switches of the network of photonic switches.

In some embodiments, photonic switches of the network of photonic switches that are disposed in a first reticle are coupled to photonic switches of the network of photonic switches disposed in a second reticle by waveguides.

In some embodiments, photonic switches of the network of photonic switches are disposed in an arrangement spanning two or more chips. In some embodiments, the two or more chips are coupled using optical fibers.

In some embodiments, photonic switches of the network of photonic switches comprise a 2×2 Mach-Zehnder interferometer (MZI) switch. In some embodiments, photonic switches of the network of photonic switches comprise three MZI switches arranged in series. In some embodiments, photonic switches of the network of switches comprise a dilated MZI switch. In some embodiments, photonic switches of the network of photonic switches comprise silicon photonic switches.

In some embodiments, the input and output ports comprise grating couplers, edge couplers, and/or v-groove couplers.

Some embodiments are directed to an optical switch package. The optical switch package comprises a switch photonic integrated circuit (PIC) comprising an optical flow switch and a glass substrate supporting the switch PIC.

In some embodiments, the optical switch package further comprises a plurality of input ports and a plurality of output ports, each of the plurality of input ports and each of the plurality of output ports comprising active pluggable fiber array units. The active pluggable fiber array units comprise a plurality of optical couplers configured to optically couple optical fibers to the glass substrate, and a plurality of optical amplifiers configured to amplify optical signals at each of the plurality of optical couplers.

In some embodiments, the optical switch package further comprises glass waveguides optically coupling the active pluggable fiber array unit to the switch PIC. In some embodiments, the glass waveguides are a fanout between the switch PIC and the active pluggable fiber array. In some embodiments, the glass waveguides are coupled to the switch PIC by a plurality of evanescent couplers.

In some embodiments, the switch PIC further comprises control circuitry coupled to the optical flow switch.

In some embodiments, the control circuitry is monolithically integrated in the switch PIC.

In some embodiments, the optical switch package further comprises a first amplifier PIC and a second amplifier PIC. The first amplifier PIC optically couples the input ports to the switch PIC, and the second amplifier PIC optically couples switch PIC and the output ports.

In some embodiments, the switch PIC comprises a first switch PIC and a second switch PIC, the first switch PIC and the second switch PIC comprise substantially identical switch networks, and the second switch PIC comprises an optical flow switch having a switch network that is rotated 180 degrees relative to a switch network of the first switch PIC.

In some embodiments, the optical switch package further comprises a third amplifier PIC optically coupled between the first and second switch PICs. In some embodiments, the optical switch package further comprises a first amplifier PIC, and a second amplifier PIC, wherein: the first amplifier PIC optically couples the input ports and the first switch PIC, and the second amplifier PIC optically couples the second switch PIC and the output ports.

In some embodiments, the glass substrate comprises a first glass substrate and a second glass substrate, the first switch PIC is disposed on the first glass substrate, and the second switch PIC is disposed on the second glass substrate.

Some embodiments are directed to a method of manufacturing an optical switch package. The method comprises transferring two or more reticles comprising at least one reticle pattern to a photoresist supported by a switch photonic integrated circuit (PIC) substrate, depositing an optical material on the switch PIC substrate through the portions of the photoresist corresponding to the transferred two or more reticles, wherein depositing the optical material forms at least part of an optical flow switch comprising a network of photonic switches spanning the two or more reticles, coupling a chip comprising control circuitry to the switch PIC substrate, and bonding the switch PIC substrate to a glass substrate.

In some embodiments, transferring the two or more reticles comprises transferring two or more reticles comprising a same reticle pattern to the photoresist such that the network of photonic switches is formed of a repeating arrangement of the same reticle pattern.

In some embodiments, depositing the optical material forms a network of photonic switches comprising a Cantor network or a Benes network.

In some embodiments, depositing the optical material forms a network of photonic switches comprising a first plurality of switches arranged to form Benes switches.

In some embodiments, depositing the optical material further forms a second plurality of switches comprising input routing switches coupled between input ports disposed on the switch PIC substrate and the Benes switches.

In some embodiments, depositing the optical material further forms waveguides coupling switches of the second plurality of switches to Benes switches disposed across the two or more reticles.

In some embodiments, transferring the two or more reticles comprises transferring rows or columns of reticles, each row or column of reticles being formed using a same set of reticle patterns.

In some embodiments, transferring the two or more reticles comprising at least one reticle pattern to a photoresist comprises transferring the two or more reticles to photoresist supported by two switch PIC substrates.

In some embodiments, depositing the optical material comprises depositing silicon.

In some embodiments, the method further comprises bonding a first amplifier PIC and a second amplifier PIC to the glass substrate, wherein: the first amplifier PIC optically couples input ports of the glass substrate to the switch PIC substrate, and the second amplifier PIC optically couples the switch PIC substrate to output ports of the glass substrate.

In some embodiments, bonding the switch PIC substrate to the glass substrate comprises bonding two switch PIC substrates to the glass substrate, the two switch PIC substrates supporting substantially identical networks of photonic switches.

In some embodiments, bonding the two switch PIC substrates to the glass substrate comprises bonding a first one of the switch PIC substrate to the glass substrate and bonding a second one of the switch PIC substrate to the glass substrate with a rotation of 180 degrees in a plane parallel to a plane of the glass substrate relative to an orientation of the first switch PIC substrate.

In some embodiments, bonding an amplifier PIC to the glass substrate such that the amplifier PIC is optically coupled between the first and second switch PIC substrates.

In some embodiments, the glass substrate comprises a first glass substrate and a second glass substrate, bonding the first switch PIC substrate to the glass substrate comprises bonding the first switch PIC substrate to the first glass substrate, and bonding the second switch PIC substrate to the glass substrate comprises bonding the second switch PIC substrate to the second glass substrate.

BRIEF DESCRIPTION OF DRAWINGS

Various aspects and embodiments will be described with reference to the following figures. It should be appreciated that the figures are not drawn to scale. In the drawings, each identical or nearly identical component that is illustrated in various figures is represented by a like numeral. For purposes of clarity, not every component may be labeled in every drawing.

DETAILED DESCRIPTION

Figure 1A:
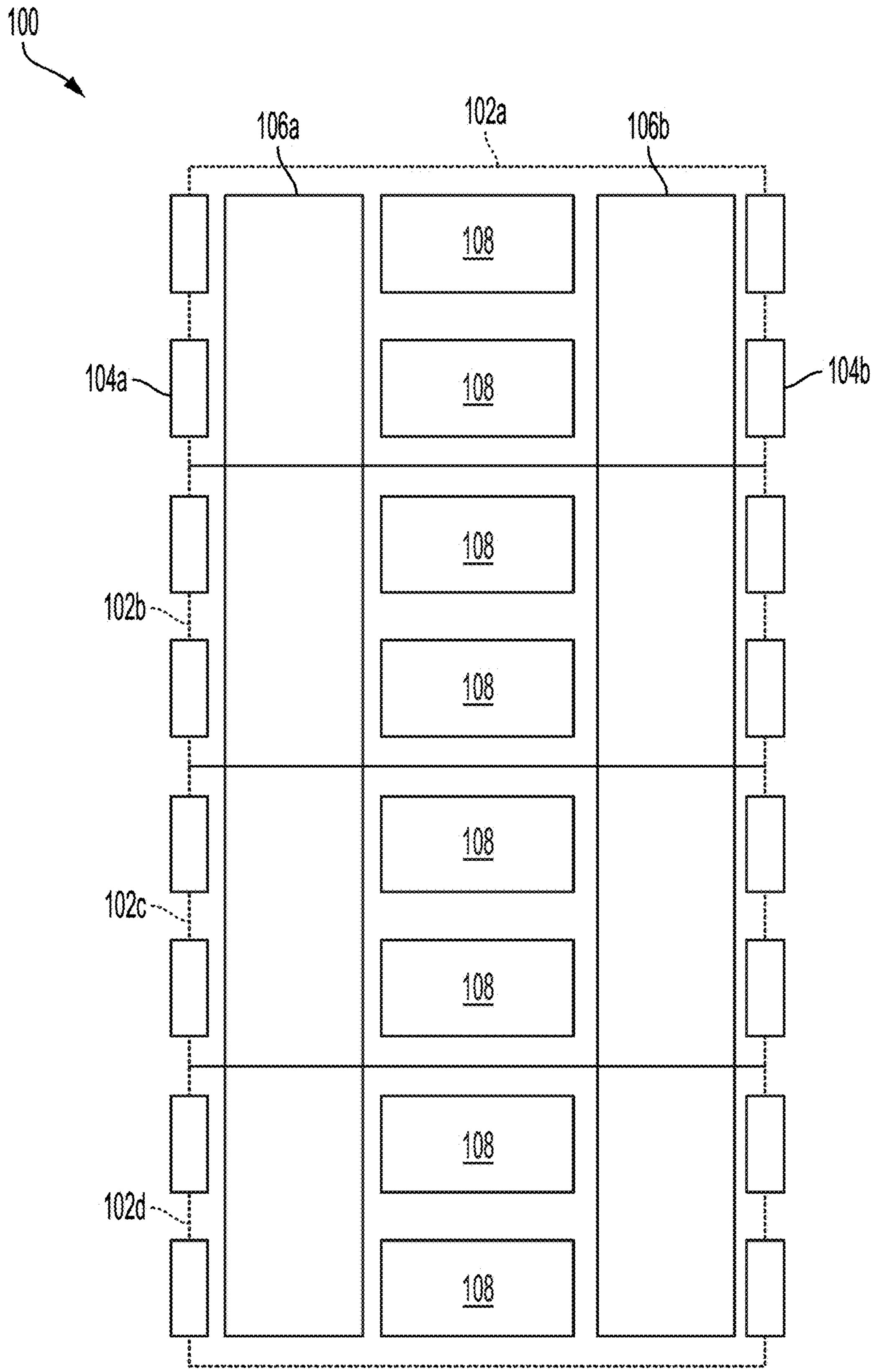
FIG. 1A is a schematic diagram of an optical flow switch layout across four identical reticles, in accordance with some embodiments of the technology described herein.

Optical flow switches are typically implemented using three-dimensional free-space micro-electromechanical systems (MEMS) mirror switches. These MEMS mirror switches can scale up to approximately 1000 input and output ports with switching times on the order of 10-20 ms. However, the fabrication of optical flow switches using three-dimensional MEMS mirror switches is challenging and requires calibration and installation of discrete components such as two-dimensional fiber arrays, micro-lens arrays, and beam steering mirrors. Furthermore, optical flow switches typically rely on the concurrent use of electronic packet switches which results in packet drops during periods of traffic contention. The high production costs, relatively slow switching speeds, and potential data loss discourage the implementation of three-dimensional MEMS optical flow switches in large computational systems and data centers.

The inventors have recognized and appreciated that the use of integrated photonics (e.g., silicon photonics) in optical flow switches offers a path towards implementing optical flow switches in computing systems and data centers by providing miniaturization and improved phase stability of optical signals transmitted through the optical flow switches. Additionally, the use of integrated photonics provides significantly faster (e.g., approximately 1 μs or less) switching times. This faster switching time lends itself to better programmability of the optical flow switches and better utilization. For example, the switches can be reconfigured during runtime, and endpoints of the switches can be linked in a round-robin fashion during runtime to improve utilization.

The inventors have further recognized and appreciated that integrated photonics are implemented on chips using relatively few layers for routing the optical signals (e.g., silicon and silicon nitride layers in the case of silicon photonics). Thus, the routing of optical signals in integrated photonics systems is inherently two-dimensional. Such two-dimensional photonic switch structures have conventionally limited the number of input and output ports because of reticle-size limits of the fabrication masks for photolithography. Additionally, photonics switching structures have been limited in size due to the difficulty in controlling and stabilizing photonic switches simultaneously.

Accordingly, the inventors have developed multi-reticle photonic optical flow switches and photonic switching structures that have low manufacturing costs (e.g., being manufacturable with 200 mm and 300 mm complementary metal-oxide-semiconductor (CMOS) processes), are scalable to large numbers of input and output ports, and have fast reconfiguration times on the order of sub-microseconds. Additionally, the multi-reticle photonic optical flow switches described herein enable non-blocking optical flow switches with mode sizes larger than those achievable with single-reticle optical flow switches.

I. Multi-Reticle Optical Flow Switches

In some embodiments, the multi-reticle optical flow switches described herein includes a series of substantially identical adjacent reticles that together implement a network of switches, as shown in the example of FIG. 1A. The multi-reticle optical flow switch 100 includes four reticles 102*a*-102*d*, each of which is fabricated using a same reticle mask pattern that is repeated from top to bottom of the multi-reticle optical flow switch 100. Each reticle 102*a*-102*d* includes input ports 104*a* and output ports 104*b*, each of which may couple the multi-reticle optical flow switch 100 to one or more optical fibers (e.g., each coupling to 32 optical fibers).

In some embodiments, the network of switches forming the multi-reticle optical flow switch 100 includes photonic switches arranged in the Cantor network topology. In a general N×N Cantor network, a set of N input optical fibers is coupled to the multi-reticle optical flow switch 100 by input ports 104*a* and routed-via input routing switches 106*a*—to an intermediate switch layer including log(N) independent Ñ×Ñ Benes switches, where $N=2^{ceil(log_2 N)}$ is the largest integer power of two greater than N. The Cantor network further includes output routing switches 106*b* arranged to couple the Benes switches 108 to the output ports 104*b*, which couple the multi-reticle optical flow switch 100 to output optical fibers.

Spatial dilation across the log(N) Benes switches 108 introduces a circuit layout complexity that is prohibitive for large N for fabrication using a single two-dimensional reticle. In some embodiments, the multi-reticle optical flow switch 100 distributes the log(N) Benes switches across multiple reticles (e.g., reticles 102*a*-102*d*), lowering the circuit complexity in each reticle. Each Benes switch 108 is independent and operates using waveguide connections within its reticle.

Figure 1B:
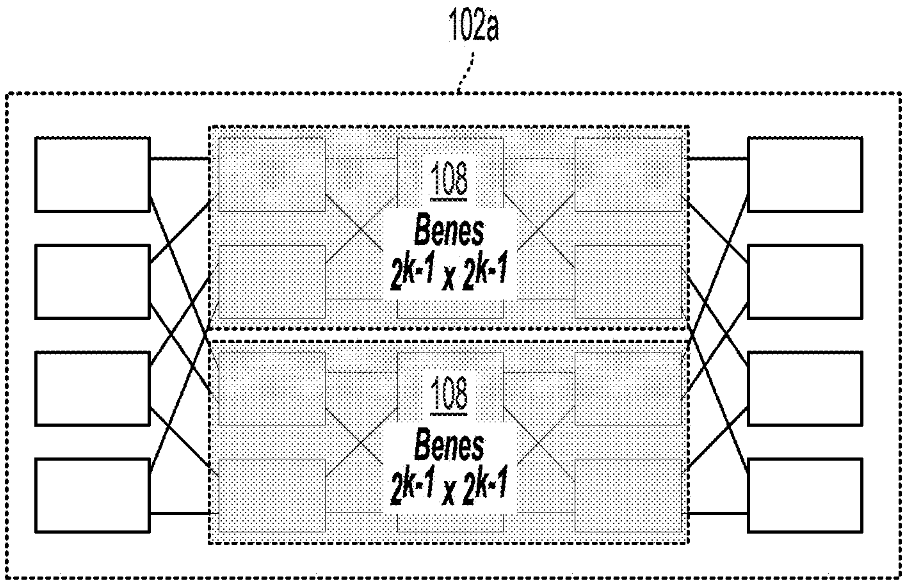
FIG. 1B is a schematic diagram of a Benes switch, in accordance with some embodiments of the technology described herein.

In some embodiments, the Benes switches 108 are implemented using a recursive structure, as illustrated in the example of FIG. 1B. In such embodiments, the $i^{th}$ input fiber can be routed to the $i^{th}$ input mode of any of the log(N) Benes switches 108 using a 1: log(N) active switch in the input routing switches 106*a*. The output routing switches 106*b* performs the reverse operation: routing the $i^{th}$ output mode from any Benes switch 108 to the $i^{th}$ output fiber at the output ports 104*b*.

In some embodiments, the input and output routing switches 106*a*, 106*b* include routing of optical signals across reticle boundaries. The individual 2×2 photonic switches in different reticles may be connected by waveguides that extend across reticle boundaries, and waveguide continuity at the reticle boundaries may be implemented using reticle stitch technology.

Figure 1C:
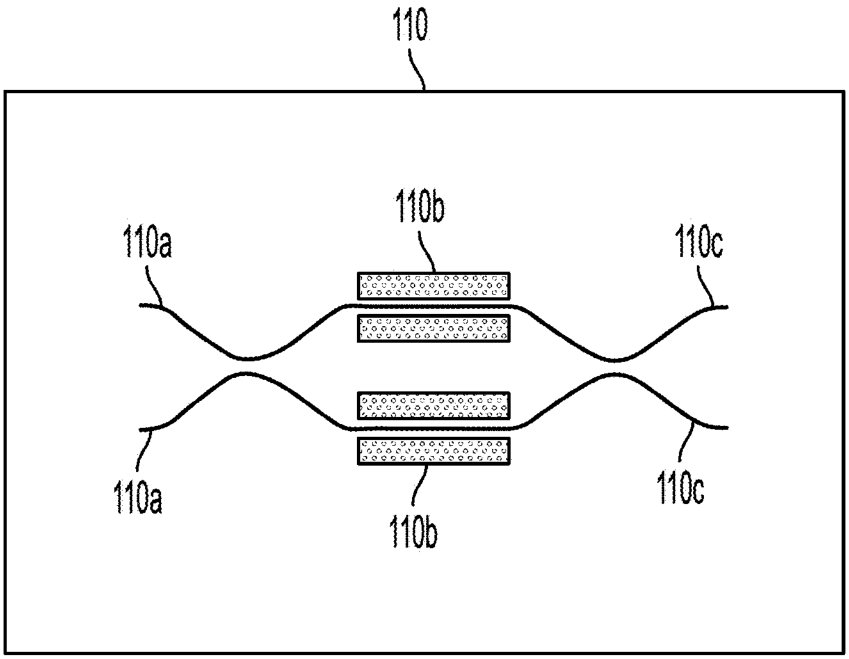
FIG. 1C is a schematic diagram of a photonic switch, in accordance with some embodiments of the technology described herein.

In some embodiments, the input routing switches 106*a*, the Benes switches 108, and/or the output routing switches 106*b* are formed of photonic switches, an example of which is depicted in FIG. 1C. The photonic switches 110 may be Mach Zehnder interferometer (MZI) switches including two input waveguides 110*a* that transmit input optical signals to a first coupler, two electronically controlled phase shifters 110*b* disposed on opposing interferometer arms of the MZI switch, and two output waveguides 110*c* that transmit an output optical signal away from a second coupler on one of the two output waveguides 110*c*. The choice of which output waveguide 110*c* is implemented using the phase shifters 110*b*. Alternative examples of photonic switches comprising MZI switches are described herein with reference to FIGS. 8A-8C.

In some embodiments, the input and output ports 104*a*, 104*b* may be coupled to multiple optical fibers. The optical fibers may be attached to the switch network using coupling techniques such as, for example, grating couplers, edge couplers, or v-groove couplers. A waveguide-array to fiber transposer (WAFT) may be used to reduce the pitch between the neighboring inputs from 127 μm or 250 μm for standard optical fibers to a pitch that is less than 10 μm. A WAFT can therefore be used to increase the number of spatial mode inputs and outputs at the reticle edge of the switch, which is currently limited to 32 mm by the size of standard 26 mm×32 mm reticles. Multi-core fibers may be attached to the input and output ports 104*a*, 104*b* using grating couplers that match the array of cores, thereby further increasing the number of spatial modes in and out of the switch.

It should be appreciated that while the examples of multi-reticle optical flow switches described herein are depicted as providing unidirectional communication, the described photonic switch networks can be used for bidirectional communication, as aspects of the technology described herein are not limited in that respect. For example, the endpoints on the left sides of the illustrative multi-reticle optical flow switches can be configured to send data to the endpoints on the right, and endpoints on the right can also be configured to send data to the endpoints on the left.

In some embodiments, the total number of Benes switches in the multi-reticle optical flow switch is given by m=qr, where each reticle is populated with q independent Ñ×Ñ Benes switches. The per-reticle switch count q may be chosen as the minimum integer such that $qr \geq \log_2 \tilde{N}$. The number of optical fibers, k, at the input and output of each reticle is then given by the largest integer satisfying $kr \geq \tilde{N}$.

Figure 2:
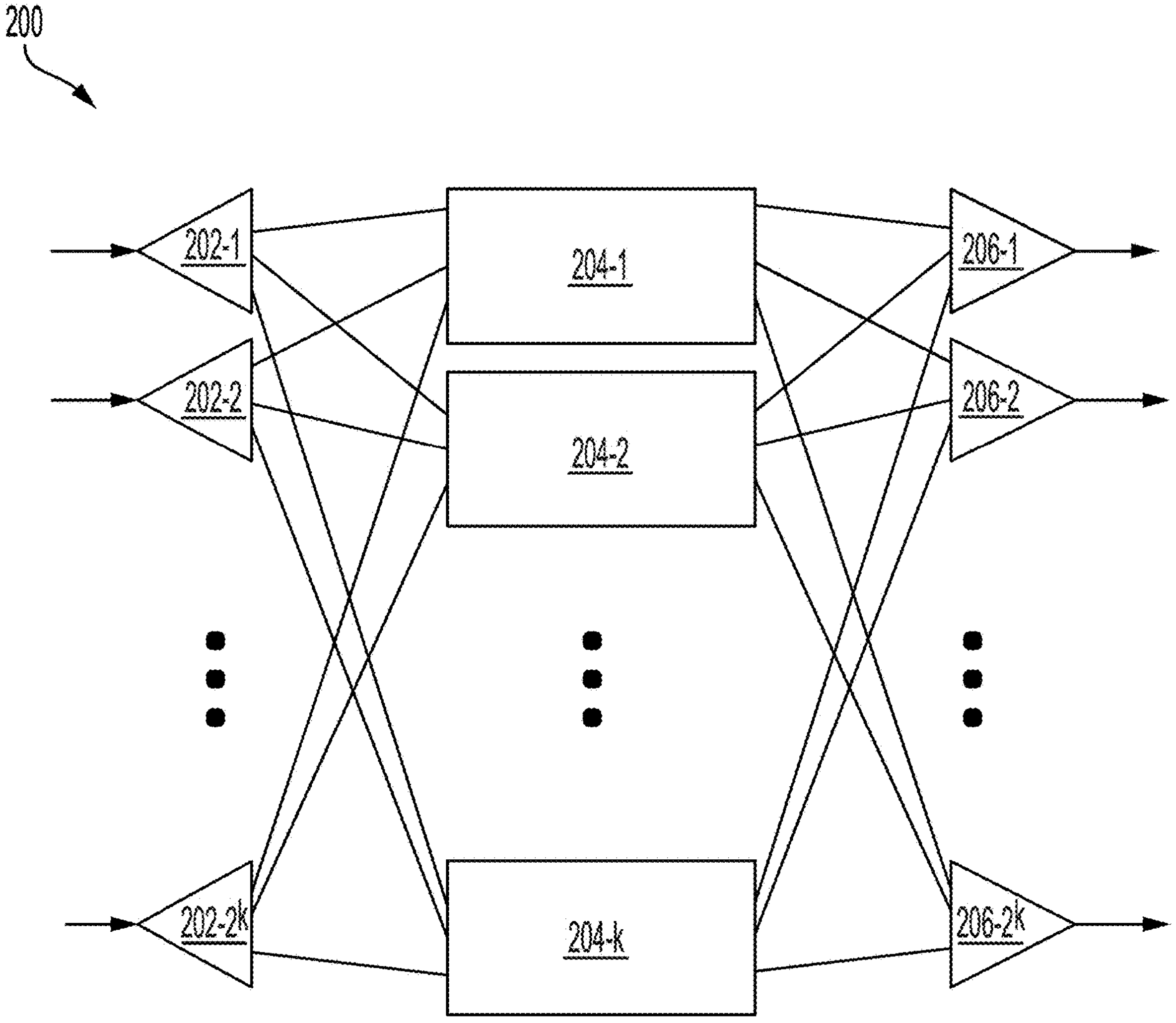
FIG. 2 is a schematic diagram of a Cantor switch, in accordance with some embodiments of the technology described herein.

FIG. 2 is a schematic diagram of a general Cantor switch 200, in accordance with some embodiments of the technology described herein. the Cantor switch 200 includes a total of $2^k$ 1:k input photonic switches 202-1 through 202-2$^k$. The input photonic switches 202-1 through 202-2$^k$ are optically coupled to each of the k total $2^k \times 2^k$ Benes switches 204-1 through 20-4-*k*. The Benes switches 204-1 through 20-4-*k* are then optically coupled to a symmetric set of $2^k$ k:1 output photonic switches 206-1 through 206-2$^k$.

Figure 3A:
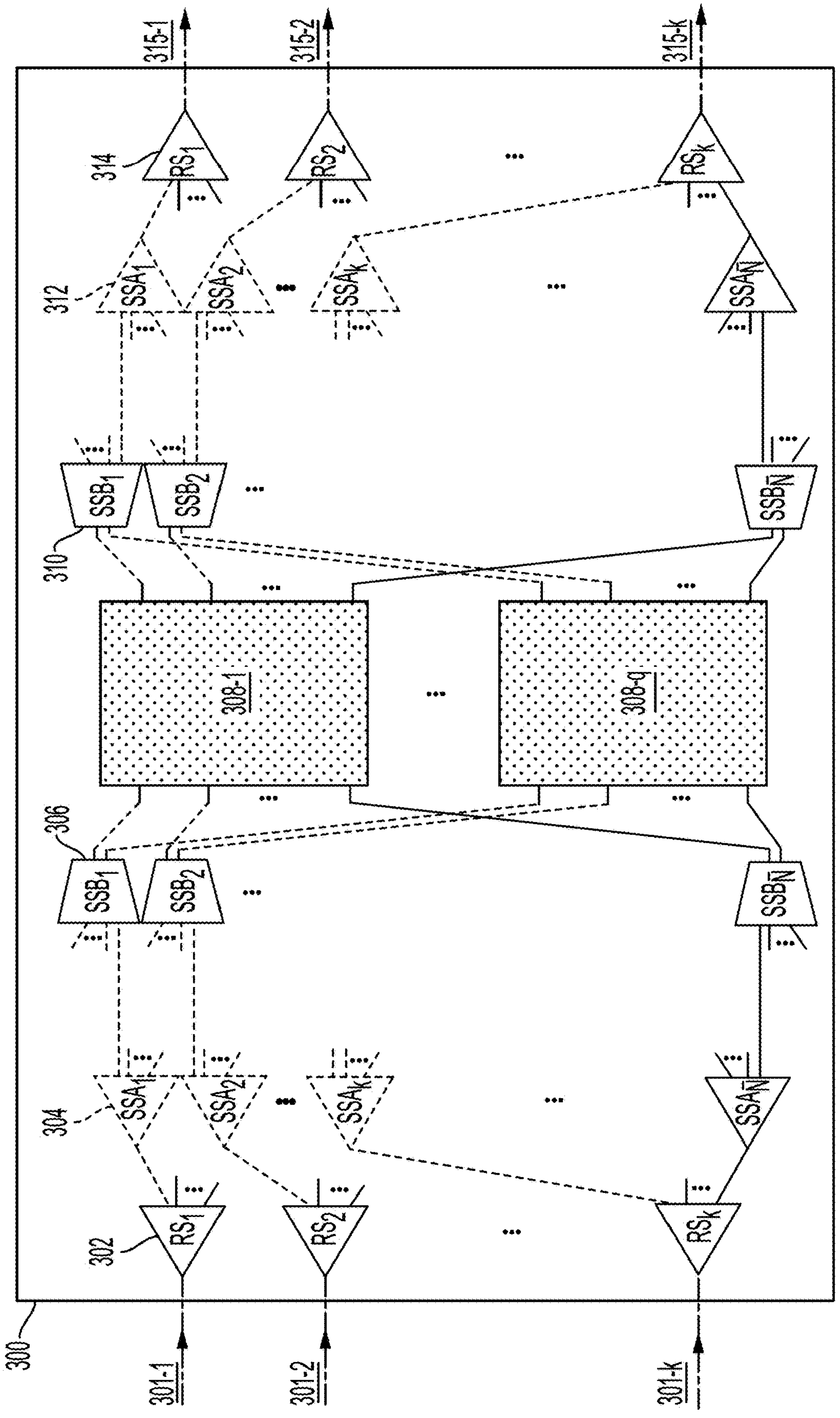
FIG. 3A is a schematic diagram of a Cantor switch network, in accordance with some embodiments of the technology described herein.

In some embodiments, input routing and/or output routing from the Benes switches of the multi-reticle optical flow switch may be implemented using three sets of photonic switches, as depicted in the example of a reticle 300 depicted in FIG. 3A. The reticle 300 may be repeated (e.g., forming a column of substantially identical reticles) to form the switch network of the multi-reticle optical flow switch. The reticle 300 may include k inputs 301-1 through 301-*k* that are configured to couple k input optical fibers to k total first input routing switches 302. The first input routing switches 302 may be 1:r reticle select (RS) active switches. The configuration of the $i^{th}$ RS switch, $RS_i$, may be tuned to its $j^{th}$ output mode, where j is the position of the reticle stamp in the network and selected data paths are denoted by solid lines between switches. For example, as depicted in FIG. 3A, all $RS_i$ in the reticle 300 may be configured to route input data to respective top output modes.

In some embodiments, the first input routing switches 302 may be configured to provide optical outputs to second input routing switches 304. The reticle 300 may include kr total second input routing switches 304, which may be 1:r Benes Switch Select A (SSA) active switches. The second input routing switches 304 may control the reticle to which input data will be sent during transmission through the multi-reticle optical flow switch.

In some embodiments, the second input routing switches 304 may be configured to provide optical outputs to third input routing switches 306. The reticle may include $kr^2$ total third input routing switches 306, which may be r:q Switch Select B (SSB) active switches. The third input routing switches 306 may be configured to control the routing of the optical signal to particular Benes switches 308-1 through 308-*q* within the reticle 300.

In some embodiments, output routing may be implemented with three sets of output routing switches that are structurally symmetric to the input routing switches 302, 304, and 306. For example, the output routing switches may include first output routing switches 310, which may include $kr^2$ total q:r SSB active switches. The output routing switches may further include second output routing switches 312, which may include kr total r:1 SSA active switches. The output routing may also include third output routing switches 314, which may include k total r:1 RS active switches. The third output routing switches 314 may be optically coupled to k total outputs 315-1 through 315-*k*, each of which may be coupled to output optical fibers.

Figure 3B:
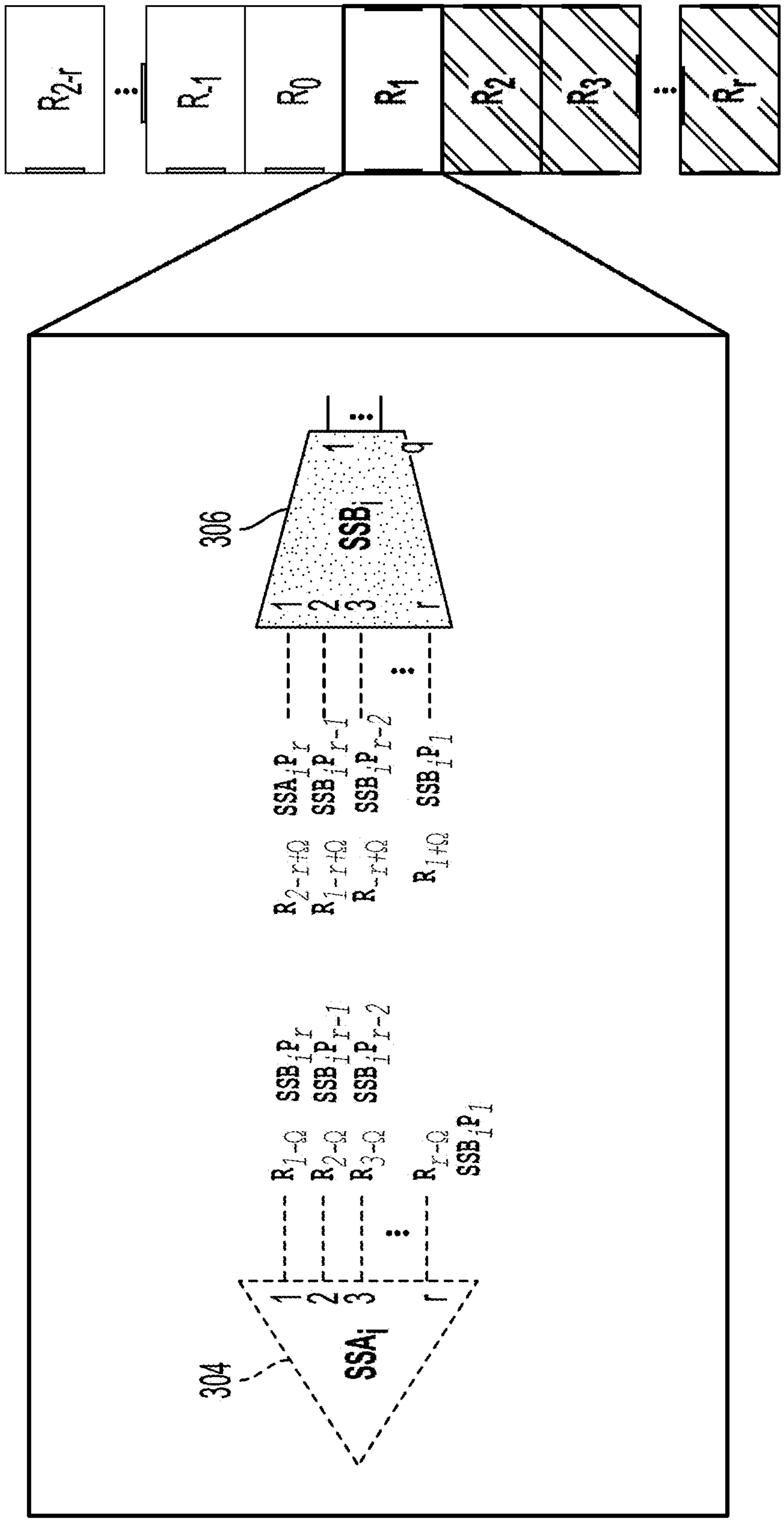
FIG. 3B is a schematic diagram of a waveguide connection configuration between input routing switches of the Cantor switch network of FIG. 3A, in accordance with some embodiments of the technology described herein.

In some embodiments, the only connections between routing switches that are formed of reticle-crossing waveguides are the connections between the SSA and SSB switches. As each reticle in the multi-reticle optical flow switch is fabricated using identical fabrication masks, it is important to configure the inter-reticle waveguides to be continuous at the reticle boundary. The waveguide routing between SSA and SSB switches for a switch network distributed over r reticles $\{R_1, R_2, \ldots, R_r\}$ can be configured by instead considering a network with 2r−1 reticles $\{R_{-(r-2)}, R_{-(r-3)}, \ldots, R_0, R_1, \ldots, R_r\}$, where the reticle mask is located in the middle position at $R_1$. An example of the waveguide connections between SSA switches 304 and SSB switches 306, using the extended reticle network for routing, are depicted in the example of FIG. 3B, where Ω=(i−1)/r and the naming convention for inputs and outputs is given by $R_a SSA_b P_c$, where a is the reticle label, b is the SSA label, and c is the port label of the switch.

Figure 4A:
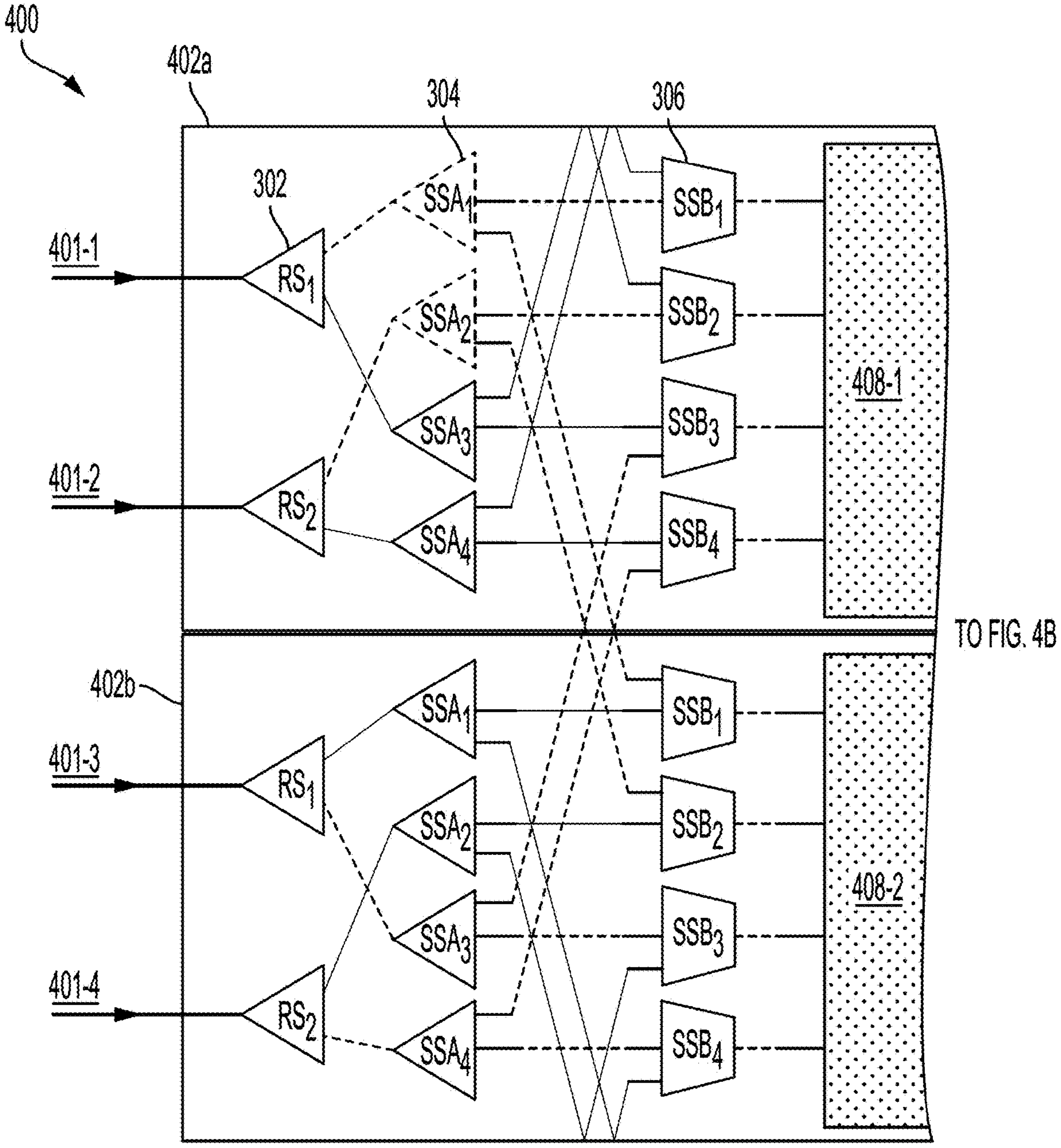
FIGS. 4A and 4B are a schematic diagram of a 4×4 Cantor network implemented using two instances of a same reticle pattern, in accordance with some embodiments of the technology described herein.
Figure 4B:
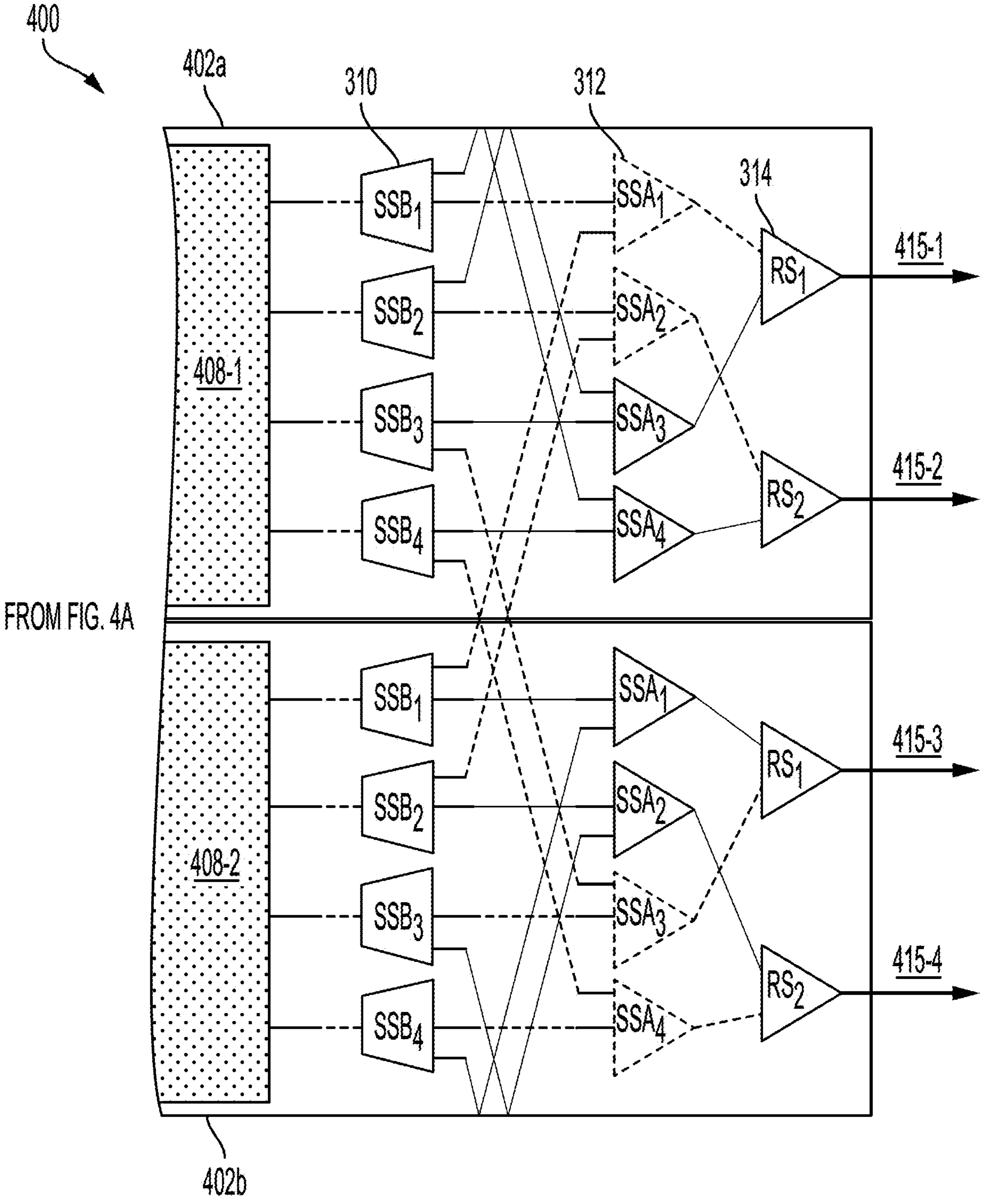

FIGS. 4A and 4B are a schematic diagram of a 4×4 Cantor network 400 implemented using two reticles, 402*a* and

402*b*, formed using a same reticle pattern, in accordance with some embodiments of the technology described herein. The network 400 accepts four inputs, 401-1 through 401-4, where two inputs are provided to each reticle 402*a* and 402*b*. Each reticle 402*a* and 402*b* includes two first input routing switches 302 comprising 1:2 RS switches, four second input routing switches 304 comprising 1:4 SSA switches, four third input routing switches 306 comprising 4:1 SSB switches, and one 4×4 Benes switch 408-1 or 408-2. Output routing from the Benes switches 408-1 and 408-2 is implemented using a symmetrical output network including four first output routing switches 310 comprising 1:4 SSB switches, four second output routing switches 312 comprising 4:1 SSA switches, and two third output routing switches 314 comprising 2:1 RS switches. The third output routing switches 314 are respectively optically coupled to outputs 415-1 through 415-4.

The multi-reticle input and output routing strategies described herein are also applicable to other switch networks in addition to the Cantor network. In the most general case, the reticle select (RS) stage (e.g., first input routing switches 302) may configure the switch network to perform the function of a specific reticle location. For example, the RS switches can be configured to select which input mode in the schematic a specific input optical fiber represents. The switch select A (SSA) stage (e.g., second input routing switches 304) may route the optical signal to the reticle that the destination switch is on (e.g., acting as an inter-reticle transmitter). The switch select B (SSB) stage (e.g., third input routing switches 306) may receive the signal routed by the SSA switches (e.g., acting as an inter-reticle receiver) and selects the intra-reticle destination Benes switch that the signal should be routed to. For a $2^k$ Cantor network, the destination switch is a $2^k$ Benes switch, and for a $2^k$ Benes network, the destination switch is a $2^{k-1}$ Benes switch.

Figure 5A:
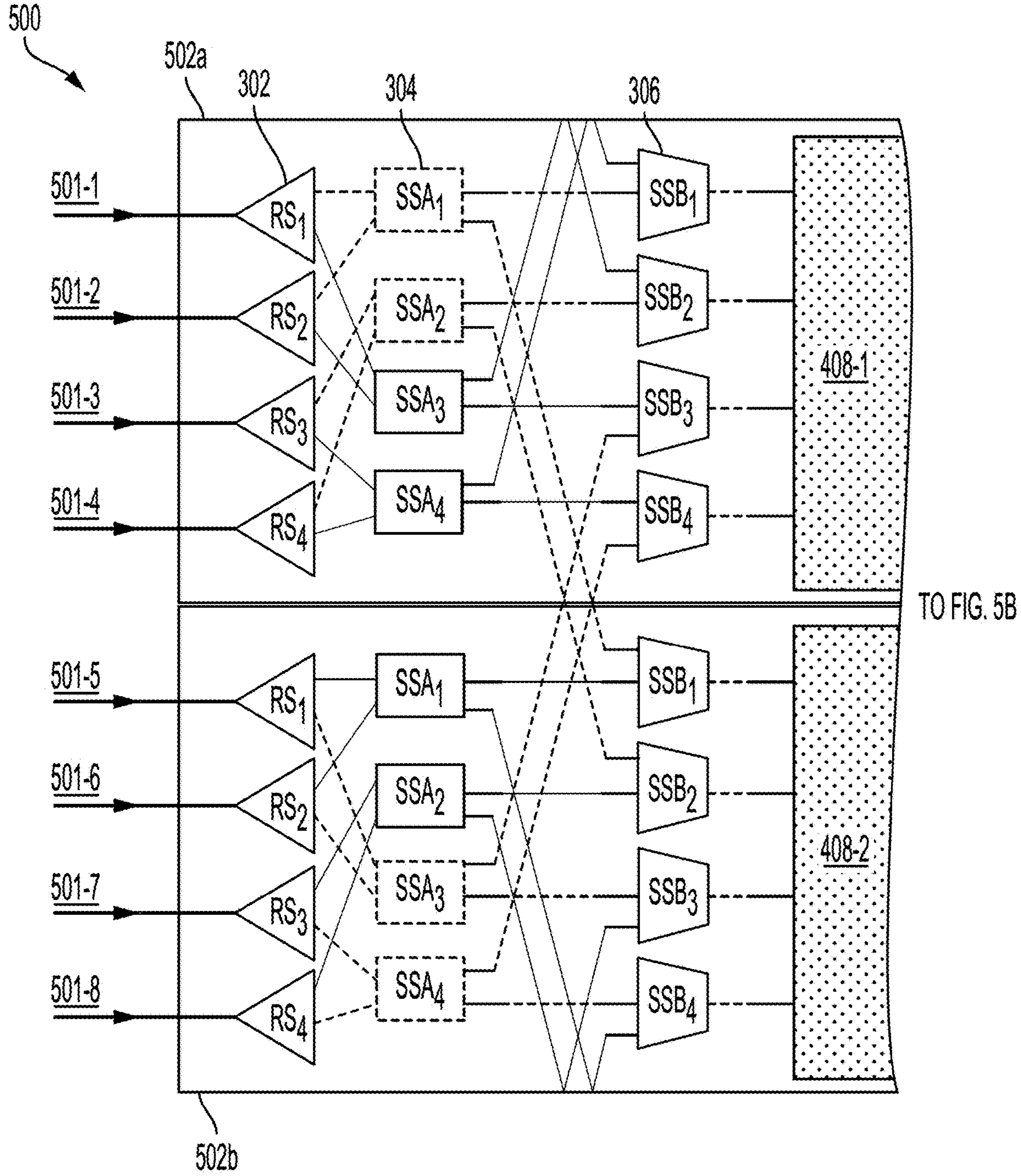
FIGS. 5A and 5B are a schematic diagram of an 8×8 Benes network implemented using two instances of a same reticle pattern, in accordance with some embodiments of the technology described herein.
Figure 5B:
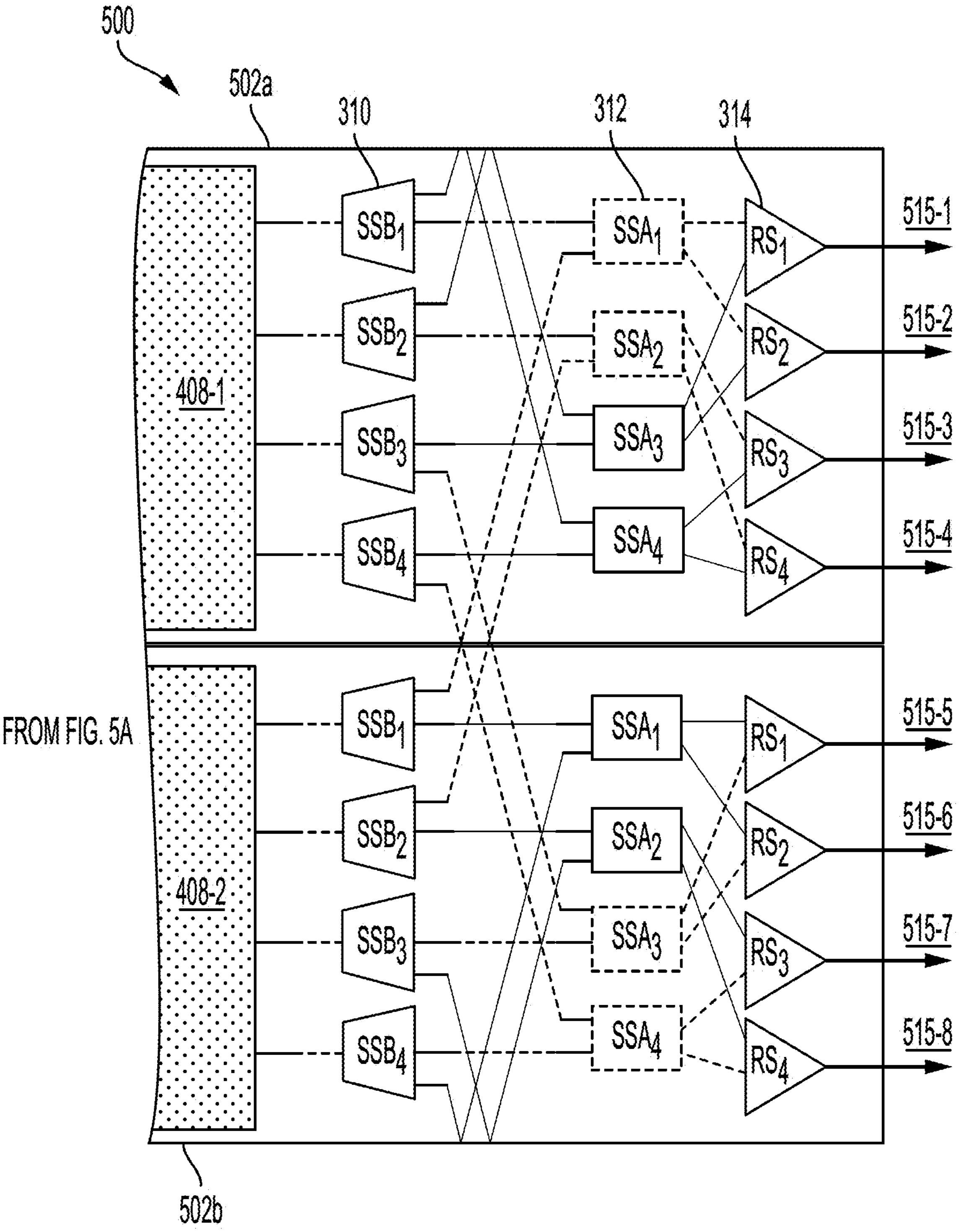

FIGS. 5A and 5B are a schematic diagram of an 8×8 Benes network 500 implemented using two reticles, 502*a* and 502*b*, formed using a same reticle pattern, in accordance with some embodiments of the technology described herein. The network 500 accepts eight inputs, 501-1 through 501-8, where four of the inputs are provided to each reticle 502*a* and 502*b*. Each reticle 502*a* and 502*b* includes four first input routing switches 302 comprising 1:2 RS switches, four second input routing switches 304 comprising 2:2 SSA switches, four third input routing switches 306 comprising 2:1 SSB switches, and one 4×4 Benes switch 408-1 or 408-2. Output routing from the Benes switches 408-1 and 408-2 is implemented using a symmetrical output network including four first output routing switches 310 comprising 1:2 SSB switches, four second output routing switches 312 comprising 2×2 SSA switches, and four third output routing switches 314 comprising 2:1 RS switches. The third output routing switches 314 are respectively optically coupled to outputs 515-1 through 515-8.

More generally, the input and output layers of a $2^k \times 2^k$ Benes network are composed of $2^{k-1}$ total 2×2 photonic switches. For the example of two reticles, the first input routing switch layer may be implemented with $2^{k-1}$ 1:2 switches that specify which input a given fiber mode represents. The second input routing switch may include of $2^{k-1} \times 2 \times 2$ switches, each receiving data from two switches of the first input switch layer simultaneously. The third input switch layer may include $2^{k-1}$ 2:1 switches that each receive input from the second input routing switch layer and output to the local (e.g., on the same reticle)$2^{k-1} \times 2^{k-1}$ Benes switch.

Additionally, the routing strategies described herein may also be applicable recursively. For example, the strategy allows for the construction of a $2^k$ Cantor network with destination switches that are $2^k$ Benes switches. Each of the $2^k$ Benes switches can be constructed using the same input and output routing strategies described in connection with FIGS. 3A-5, where each of the $2^k$ Benes switches has two $2^{k-1}$ Benes switches as their destination switches.

II. Waveguide Crossings Between Reticles

In some embodiments, data routing between reticles may be achieved using a variety of physical mechanisms. However, reticle stitch waveguide couplers expand the optical mode near the reticle boundary. Thus, low-loss transmission of data across a reticle boundary can be achieved in a continuous waveguide with two reticle stitch couplers aligned on either end of the reticle boundary. Reticle stitching enables monolithic switch fabrics composed of multiple identical reticles, without requiring dicing and waveguide coupling across independent chips.

The inventors have further recognized that the compressive strain experienced by commercial photonic wafers imposes limitations on the aspect ratio of monolithic photonic integrated circuits. In cases where a high aspect ratio is desired—for example, where the number of reticles r becomes large—the full switch network may be subdivided across a plurality of chips each having smaller monolithic sub-circuits composed of fewer reticles, in some embodiments. These sub-circuits may then be connected between chips using off-chip waveguide coupling approaches, such as fiber edge coupling, grating coupling, or photonic wire-bonding.

Figure 6:
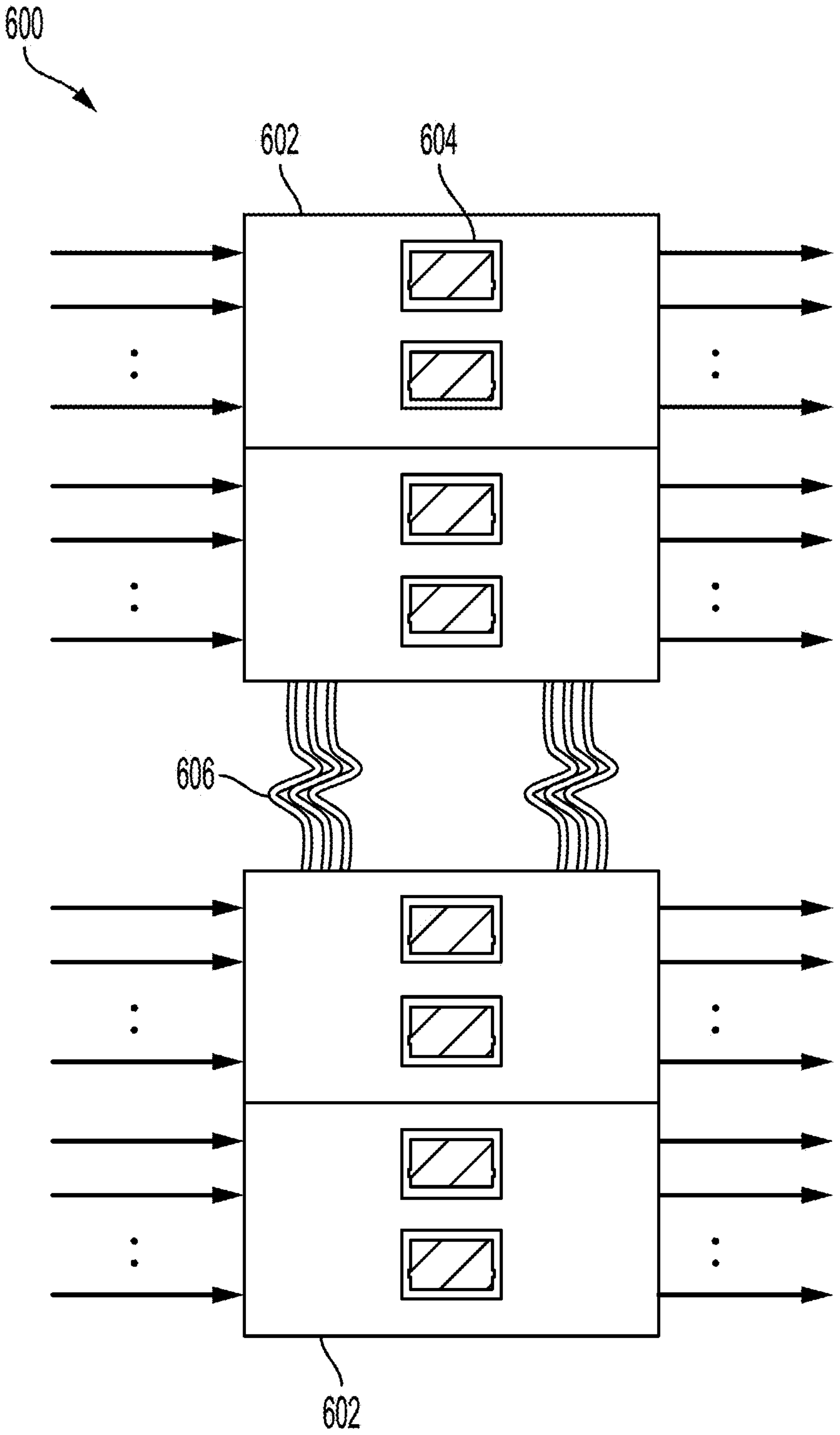
FIG. 6 is a schematic diagram of an optical flow switch implemented using two chips, each chip comprising a portion of the switch network implemented using multiple instances of a same reticle pattern, in accordance with some embodiments of the technology described herein.

FIG. 6 is a schematic diagram of a multi-reticle optical flow switch 600 implemented using two chips 602, each chip comprising two reticles of the four-reticle switch network, in accordance with some embodiments of the technology described herein. The reticles may support, for example, a Cantor network including Benes switches 604. The two halves of the switching network formed on the two chips 602 may be connected using optical fiber bundles 606 or other suitable techniques for coupling optical signals off-chip.

Figure 7:
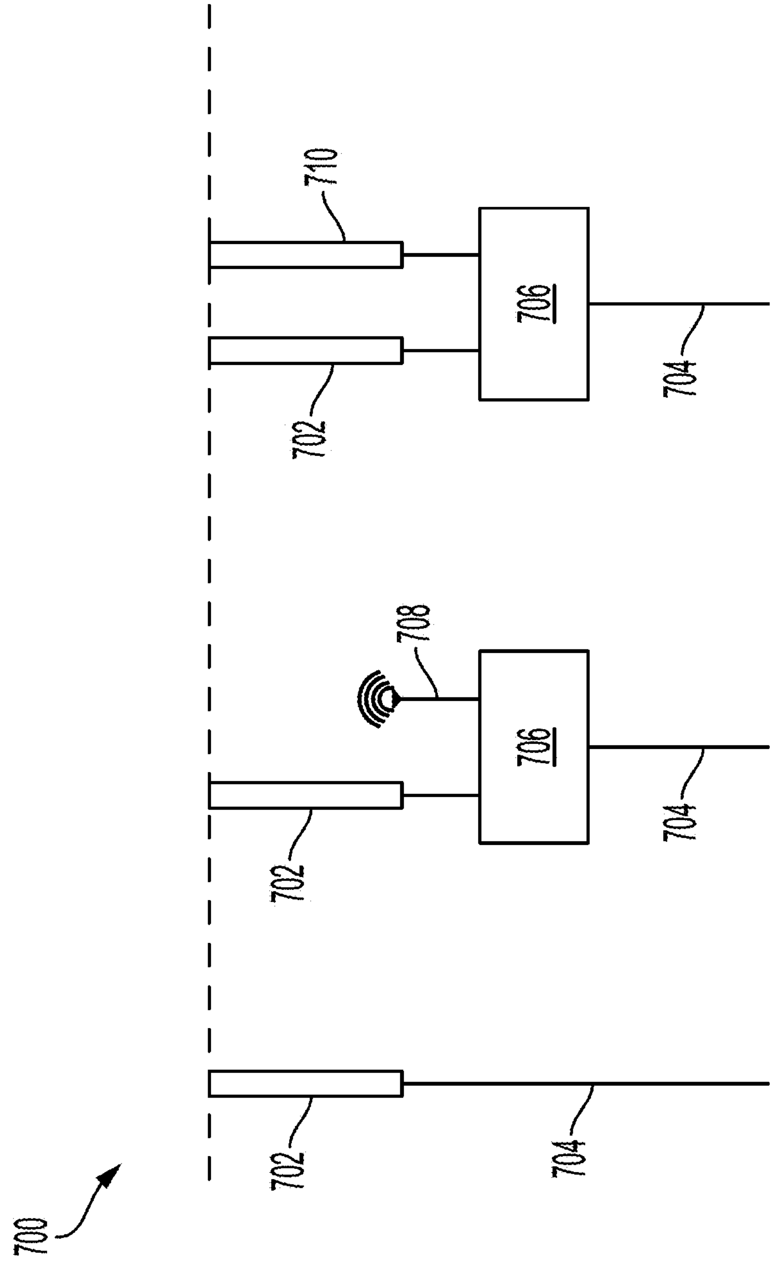
FIG. 7 is a schematic diagram illustrating examples of reticle and off-chip coupling techniques, in accordance with some embodiments of the technology described herein.

In some embodiments, a hybrid coupling architecture may still be implemented using a single fabrication mask. Flexibility can be achieved in the implemented coupling mechanisms by either designing the reticle stitch coupler to exhibit mode-matching to an edge-coupled fiber or using an active switch to select the coupling mechanism. FIG. 7 is a schematic diagram of a chip edge 700 illustrating examples of reticle and off-chip coupling techniques, in accordance with some embodiments of the technology described herein. Waveguides 704 may be coupled to off-chip optics using single reticle stich couplers 702, or the choice of coupling may be selected using switches 706. For example, a switch 706 may offer a choice between a reticle stitch coupler 702 and a grating coupler 708. Alternatively or additionally, a switch 706 may offer a choice between a reticle stitch coupler 702 and an edge coupler 710.

III. Photonic Switches with Minimized Crosstalk

Crosstalk between optical singles in an optical flow switch can degrade the signal-to-noise ratio (SNR) of the transmitted optical signals. For example, if the optical flow switch is implemented using 2×2 switches having $\in_s$ crosstalk (in percent) and optical crossings with $\in_x$ crosstalk, then the SNR of the optical flow switch will be degraded by approximately $(1-\in_S)^{N_S}(1-\in_X)^{N_X}$, where $N_S$ and $N_X$ are the number of 2×2 switches and the number of optical crossings in one specific optical path respectively.

Figure 8A:
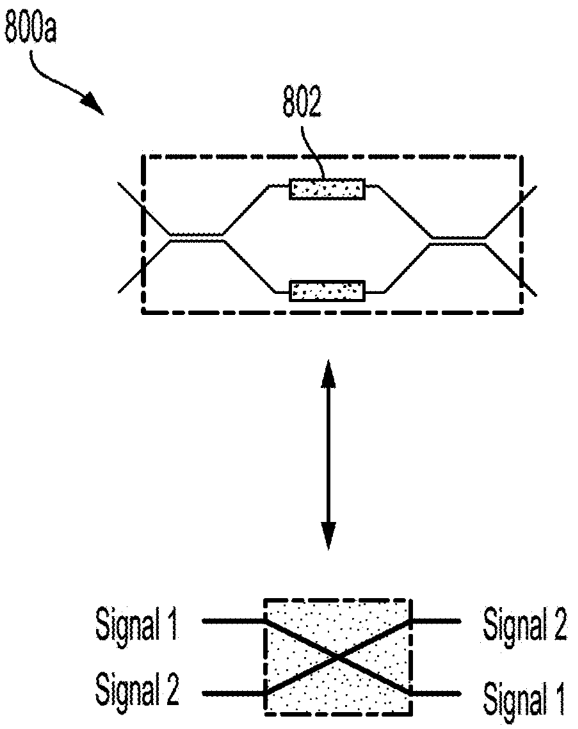
FIG. 8A is a schematic diagram of a photonic switch comprising a 2×2 Mach-Zehnder interferometer (MZI) switch, in accordance with some embodiments of the technology described herein.

The inventors have recognized that the crosstalk of an optical flow switch is dominated by the crosstalk of the switches, which have a finite extinction ratio. In a 2×2 MZI switch, as shown in the example of FIG. 8A, the extinction ratio of the switch 800*a* with phase shifters 802 may be limited by the deviation of the input and the output directional couplers from a perfect 50:50 splitting ratio. The deviation from a perfect 50:50 splitting ratio leads to the overall 2×2 switch being unable to obtain a perfect, or as close to ideal as possible, cross state or a perfect bar state. Such a deviation is typically caused by fabrication imperfections that lead to slight deviations in the coupling lengths of the directional couplers within the 2×2 MZI switch. Further, the deviation from 50:50 splitting ratio may also differ for different wavelengths which may significantly impact performance of the optical flow switch if the waveguides are carrying wavelength-multiplexed signals.

In some embodiments, reducing the crosstalk of the switch can be done by using multi-mode interferometers (MMI) as the input and output 50:50 splitters. MMIs are generally more resistant to deviations due to fabrication imperfection. Additionally, these MMIs can be designed using photonic inverse design which would generally perform better with finer lithographic definition.

Figure 8B:
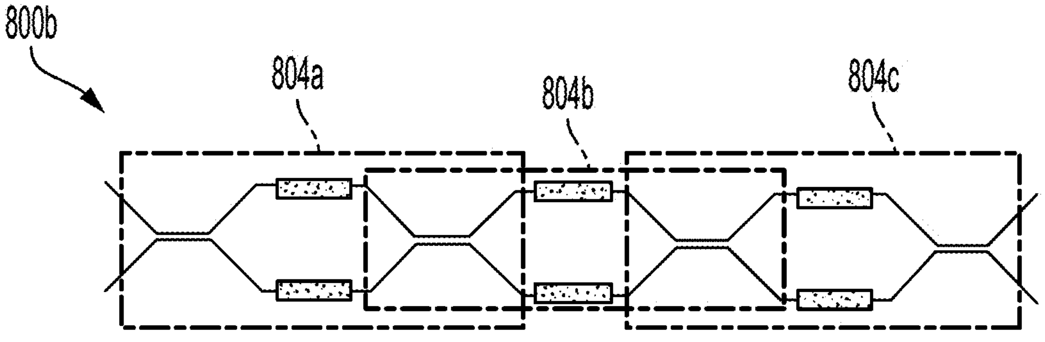
FIG. 8B is a schematic diagram of a photonic switch comprising three MZI switches connected in series, in accordance with some embodiments of the technology described herein.

In some embodiments, and as shown in the example of FIG. 8B, the switch crosstalk may alternatively be reduced by replacing a single MZI with three MZIs 804*a*, 804*b*, and 804*c* coupled in series. The first MZI 804*a* and the last MZI 804*c* may be tuned to be the input and output 50:50 splitters. Small deviations in the input and output splitters formed by MZIs 804*a* and 804*c* from the ideal 50:50 splitting ratio do not prevent the MZI switch 800*b* from obtaining an approximately ideal 50:50 state. Once the first and the last MZIs 804*a* and 804*c* are tuned to be the 50:50 input and output splitters, the central MZI 804*b* can be operated as usual as if it has perfect 50:50 input and output directional couplers.

Figure 8C:
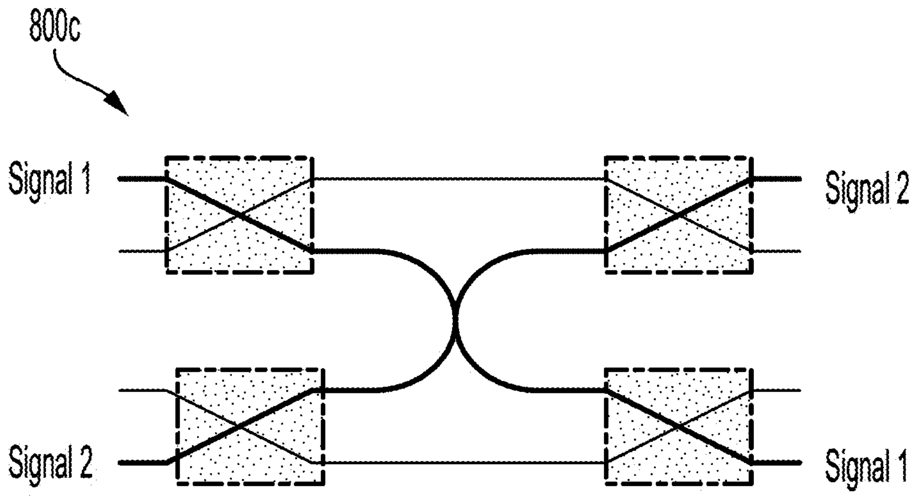
FIG. 8C is a schematic diagram of a photonic switch comprising a dilated MZI switch, in accordance with some embodiments of the technology described herein.

In some embodiments, and as shown in the example of FIG. 8C, reducing the switch crosstalk can be achieved by spatially dilating the 2×2 switches. By spatially dilating the MZI switch 800*c*, it is ensured that no two signals will be addressed by the same 2×2 switch within the optical flow switch.

Reducing crosstalk may also be achieved by reducing crosstalk in the optical crossings. For example, improved crossing structures with reduced crosstalk may be created using photonic inverse design and fabricated with better lithographic precision allows for finer patterning. Another way of reducing this crosstalk in crossing structures is to use more than a single optical routing layer. A crossing between two silicon and silicon-nitride layers spaced at approximately 2 μm apart vertically will lead to less than 1 mdB loss and less than −80 dB crosstalk per crossing. At this vertical distance, an intermediary layer (e.g., a silicon nitride layer) may be used to send the signal from the bottom silicon layer to the top silicon-nitride layer. In such an arrangement, an optical signal is first transferred to the intermediate layer through a taper and thereafter the signal is transferred to the top layer through another taper. Transferring the signal from the top layer to the top layer is also achievable through the intermediate layer. Lower crossing loss and crosstalk are achievable by increasing the distance between the silicon and the silicon-nitride layers. At larger vertical distances, more than a single intermediate layer may be used.

IV. Switching Speed

Multiple modulation physics schemes are suitable for the photonic switching elements. For example, carrier injection or depletion in silicon photonic devices can be used to modulate the switches between the cross and the bar states. While carrier injection and depletion allows for sub-picosecond modulation, the mechanism exhibits phase-dependent loss. As another example, physically actuating the arms of the 2×2 MZI switches using micro-electromechanical systems (MEMS) can also modulate the switches between the cross and the bar states. MEMS actuation can provide modulation in the sub-microsecond regimes. The process of releasing the MEMS switches, however, may not always be compatible with the fabrication process used to manufacture integrated photonics (e.g., CMOS-compatible silicon photonic processes). As a further example, in a system implemented using non-linear photonic materials (e.g., $\chi^{(2)}$ in InP), the switches can be modulated using non-linear optics. The non-linear process can be used to provide low-loss phase shifts to modulate the switch between the cross and bar states. If the non-linear process is sufficiently strong (e.g., through large amplifications), one optical signal can modulate a switch acting on another optical signal. Finally, thermo-optic modulation is another modulation technique that is compatible with the photonic switching elements. Heating up or cooling down the waveguides of the switching element effectively induces a phase shift which can be used to modulate the switch between the cross and the bar states.

In all the examples described above, equalization techniques can be used to shorten the switching time between the bar and the cross states, and vice versa. An optimal excitation signal can be derived by compensating for the slower responses limited by the physics of the modulation. For example, in a thermo-optic modulation, a pre-emphasis filter that takes into account the relatively slow speed of heat propagation and diffusion processes can induce a switching response that is faster than a simple step response time. The pre-emphasis filter may be designed to increase the magnitude of some frequency responses (e.g., high frequency responses). Similarly, a different pre-emphasis filter can take into account carrier recombination time in switching performed using carrier-depletion, or a different pre-emphasis filter can take into account the slower actuation bandwidth in MEMS devices in MEMS switching techniques.

Figure 9A:
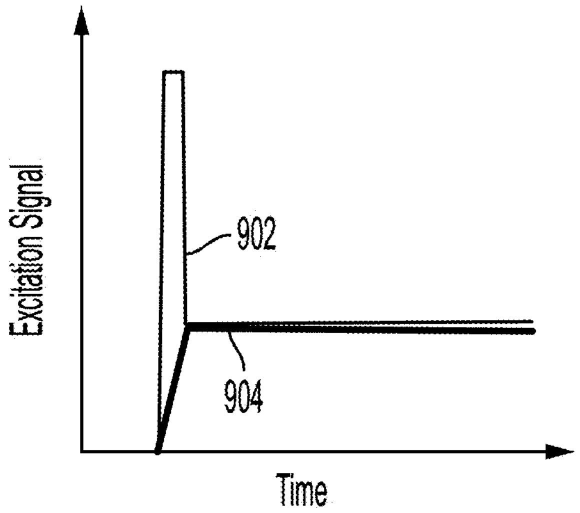
FIG. 9A is a plot showing examples of switch excitation signals as a function of time with and without pre-emphasis, in accordance with some embodiments of the technology described herein.
Figure 9B:
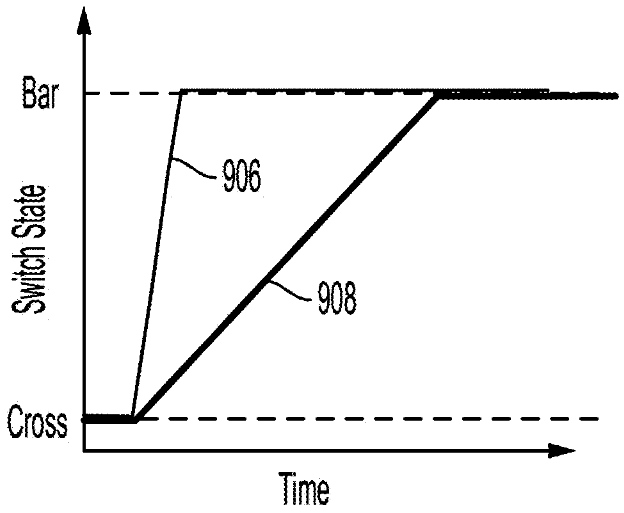
FIG. 9B is a plot showing examples of switch states as a function of time with and without pre-emphasis, in accordance with some embodiments of the technology described herein.

FIG. 9A is a plot showing examples of switch excitation signals as a function of time with and without pre-emphasis, where curve 902 represents the switch excitation signal with pre-emphasis and curve 904 represents the switch excitation signal without pre-emphasis, in accordance with some embodiments of the technology described herein. FIG. 9B is a plot showing examples of switch states as a function of time with and without pre-emphasis, where curve 906 represents the switch state with pre-emphasis and curve 908 represents the switch state without pre-emphasis. The horizontal dashed lines represent the cross and bar states of the switch. The pre-emphasis filter prevents a response that takes multiple e-folding times to switch from one state to another.

In some embodiments, the equalization filters can be applied in a single-ended scheme or a dual-ended scheme. Other equalization schemes include a de-emphasis filter which attenuates the magnitude of some frequency responses. De-emphasis filters, for example, can be used to counteract the high-frequency losses of some modulation schemes (e.g., carrier injection or depletion) to achieve a flat modulation response.

In some embodiments, the analog front end driving the switches and maintaining the stability of the switches (e.g., against temperature fluctuations during the operations) can be integrated monolithically in the same chip (e.g., for silicon photonic switches), integrated using a 3D stacking approach (e.g., application-specific integrated circuits (ASICs) with analog output DACs and readout ADCs bonded on top of the switch with direct bump-to-bump connections or through an interposer), or integrated using a two-dimensional or two-and-a-half-dimensional approach (e.g., the ASIC sends and receives its signals through an interposer substrate or through a PCB).

V. Switch Control

The inventors have further recognized that it may not be efficient or possible to reconfigure the optical flow switch network at nanosecond or picosecond time scale. The switch network may instead be configured on an application-by-application basis. The optical flow switch may be configured to create a network topology between the end-point processor and memory units that enables the best runtime performance of the computing system for a particular application before runtime. When another application is to be run in the system, the optical flow switch may be reconfigured to another network topology that enables the best runtime performance for that second application. In this scenario, the optical flow switch may be quasi-static.

In some embodiments, the optical flow switch may be dynamic even at slower times than the clock frequencies (e.g., on the order of GHz). In one example, one or more end-points of the switch system can request the control circuitry controlling the optical flow switch to provide one or more optical connections from one transmitter end-point to one or more receiver end-points. The number of optical connections may depend on the requested bandwidth. For example, if the optical communication transceiver uses eight wavelengths of light per connection, with each wavelength modulated at 56 Gbps, then an optical connection provides 448 Gbps between a transmitter and a receiver. Two optical connections then provide double the bandwidth (e.g., 896 Gbps) between a transmitter and a receiver. The request for additional optical connections may be made on top of a packet switch network, where if a request is received to send a large amount of data, then optical connections are provided within the optical switch network. Otherwise, data may simply be transmitted through the packet switch network electrically.

In some embodiments, the connections between the sending and the receiving end-points can be set up with a pre-determined schedule. For example, the senders and the receivers can be paired up in a round-robin manner such that each sender has the opportunity to send data to each receiver during their pre-determined schedule. The pre-determined scheduled is stored in the memory of the senders, the receivers, and in the optical switch network such that every participating element knows, at any period of time, who the senders are and who the receivers are. In some embodiments, the pre-determined schedule may be stored within the optical switch network. The sender and the receiver can identify themselves before any data is transmitted.

In some embodiments, the connection can also be made dependent on the wavelength transmitted from the sender. In a wavelength multiplexed scheme, the input data can be demultiplexed using a collection of resonant devices (e.g., ring resonators or racetrack resonators) or a series of unbalanced MZIs. The path taken by each wavelength can be different or the same. Data can also be wavelength multiplexed back into a single output waveguide or fiber using the same resonant devices. In another scenario, one or more wavelengths can be used to communicate the switch network configuration to the control processor.

In some embodiments, the optical flow switch may be configured for broadcasting. The 2×2 photonic switches may be configured to split an input signal to any ratio between the bar state (100:0) and the cross state (0:100). Using this property, the optical flow switch can be configured to broadcast a single input signal, or multiple input signals in different wavelengths multiplexed into a single input waveguide, to more than one receiver.

VI. Overcoming Optical Losses

Figure 10:
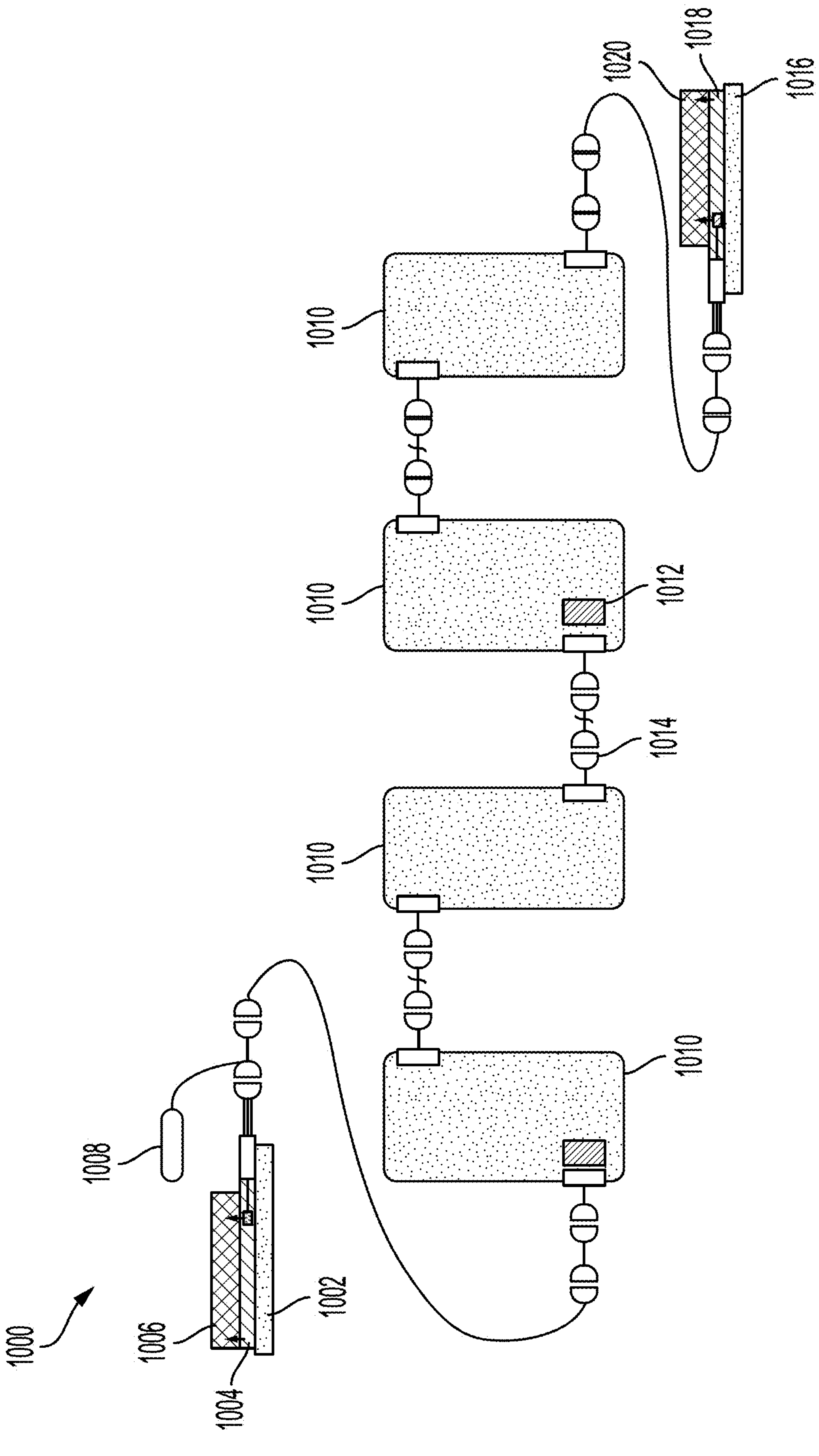
FIG. 10 is a schematic diagram of an example of linked optical flow switches, in accordance with some embodiments of the technology described herein.

FIG. 10 is a schematic diagram of an example of linked optical flow switches, in accordance with some embodiments of the technology described herein. The system 1000 includes a transmission device including a substrate 1002, sender PIC 1004, ASIC 1006, and laser 1008. The system 1000 further includes a receiving device including a substrate 1016, receiver PIC 1018, and ASIC 1020. The transmission device is coupled to the receiving device by a number of optical flow switches 1010, which may comprise any optical flow switch as described herein.

One or more of the optical flow switches 1010 may include an amplifier 1012 coupled adjacent to inter-switch optical couplers 1014, the amplifier 1012 may be configured to overcome losses introduced by the optical flow switches 1010. The amplifiers 1012 can be fabricated within the same monolithic circuit as the optical flow switches 1010 or be fabricated separated from the optical flow switches 1010 and positioned before or after one or more of the optical flow switches. More than a single amplifier can also be placed in the system. Where the amplifiers should be placed depend on the minimum signal power required by the amplifiers, the maximum saturated output of the amplifiers, as well as the desired signal power received at the receiver. The amplifiers 1012 may be semiconductor optical amplifiers (SOAs), erbium-doped fiber amplifiers (EDFAs), bismuth-doped fiber amplifiers (BDFAs), or praseodymium-doped fiber amplifiers (PDFAs).

VII. Computing Systems Including Optical Flow Switches

Figure 11:
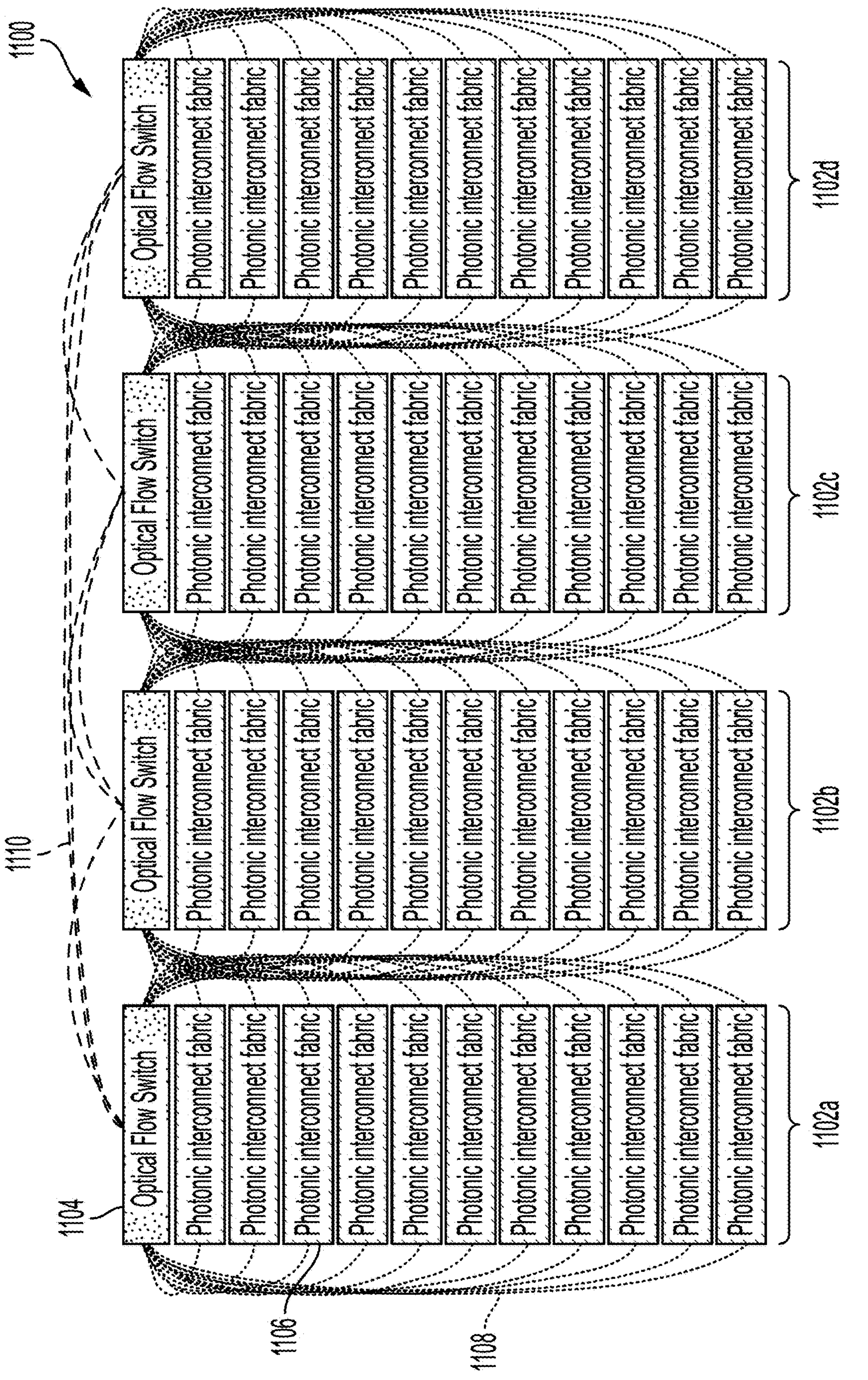
FIG. 11 is a schematic diagram of an example of a computing system including optical flow switches, in accordance with some embodiments of the technology described herein.

FIG. 11 is a schematic diagram of an example of a computing system 1100 including four racks 1102*a*-1102*d*, in accordance with some embodiments of the technology described herein. The racks 1102*a*-1102*d* include optical flow switches 1104 and photonic interconnect fabric 1106. The photonic interconnect fabric 1106 may be coupled to inputs and outputs of an optical flow switch 1104 within a same rack as the photonic fabric 1106 by optical fibers 1108. One or more of the photonic interconnect fabric 1106 may be directly connected using optical fibers (not depicted). The optical flow switches 1104 are optically coupled to one another using optical fibers 1110. It should be appreciated that the optical flow switches 1104 may be any optical flow switches described herein.

In some embodiments, the photonic interconnect fabric 1106 include built-in circuit switching that allows for reconfiguration of communication topology between ASICs, memory chips, and/or network chips that are using the photonic interconnect fabric 1106. For example, one or more of these chips may be coupled on top of each site of the photonic interconnect fabric 1106 and the electronic communications signals output by one or more of these chips may be converted to photonic signals within the photonic interconnect fabric 1106.

In some embodiments, the photonic interconnect fabric 1106 can be configured to provide all-to-all connections between the electronic chips disposed on top of the photonic interconnect fabric 1106. Additionally, each site of the photonic interconnect fabric 1106 has one fiber input and output to the optical flow switch 1104 within the same rack 1102*a*-1102*d*. Some of the outputs of one optical flow switch 1104 can be connected to the inputs of the other optical flow switches 1104.

Figure 12A:
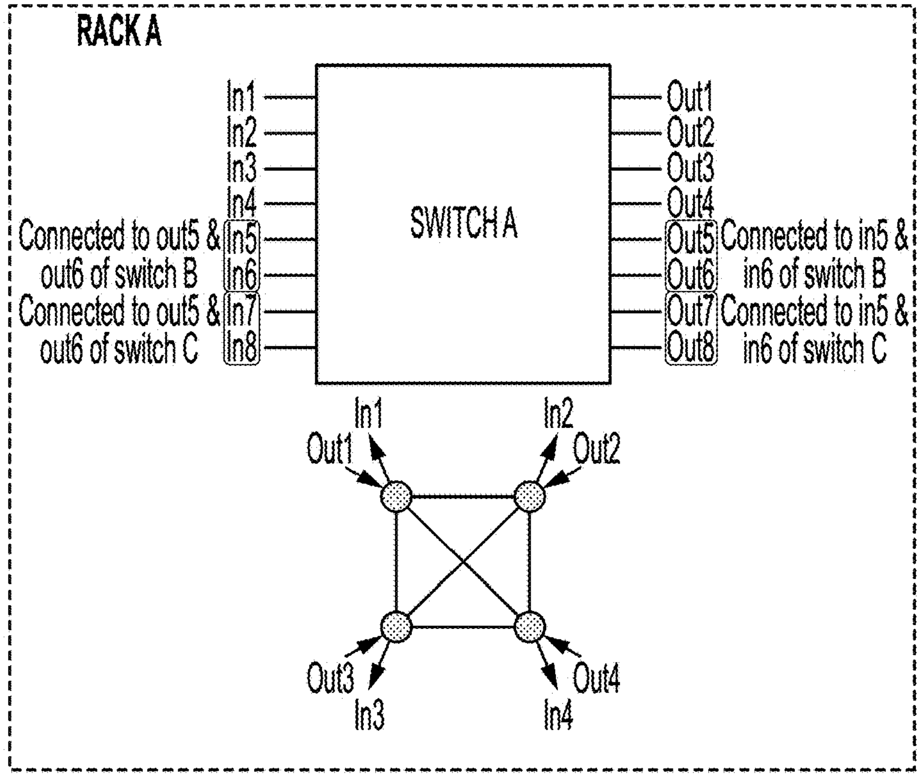
FIGS. 12A-12C are schematic diagrams illustrating connectivity between optical flow switches associated with three racks in a computing system, in accordance with some embodiments of the technology described herein.
Figure 12B:
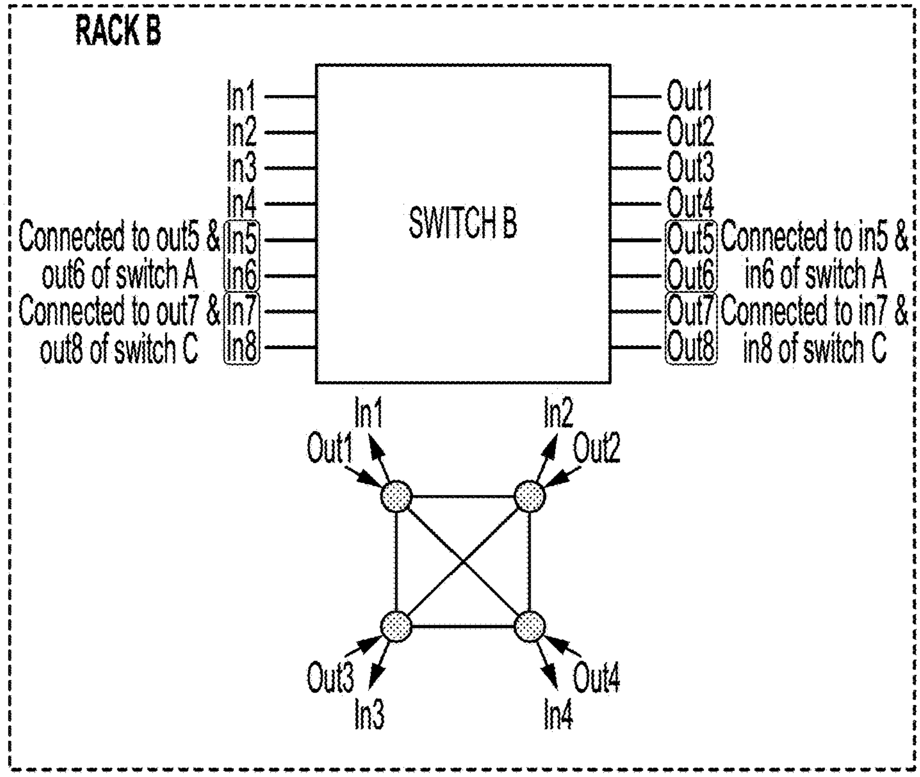
Figure 12C:
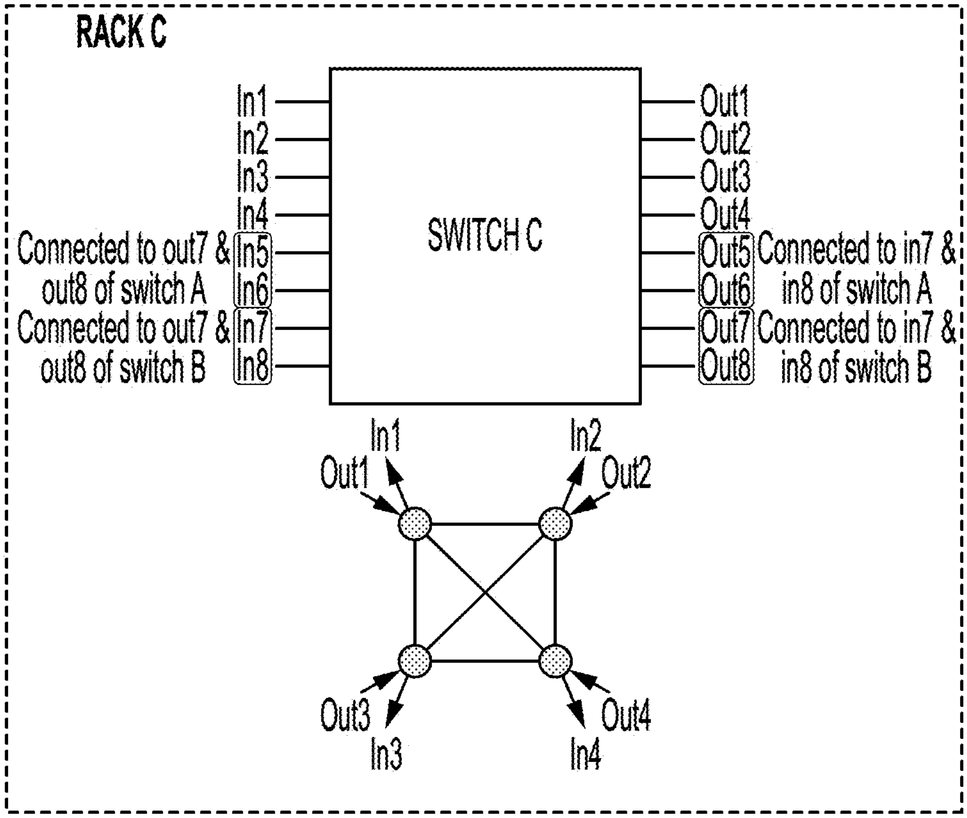

FIGS. 12A-12C are schematic diagrams illustrating connectivity between optical flow switches and photonic interconnect fabrics associated with three racks in a computing system such as computing system 1100 of FIG. 11, in accordance with some embodiments of the technology described herein. In the examples of FIGS. 12A-12C, each rack includes one 8×8 optical flow switch and four nodes and chips, denoted as circles. The connectivity between the four nodes and chips within a single rack can be afforded using a photonic interconnect fabric or, alternatively or additionally, by using optical fibers. Each chip may dedicate one unidirectional fiber link to the input of the optical flow switch located in the same rack as the chip and one unidirectional fiber link to the output of the optical flow switch in the same rack as the chip.

VIII. Multi-Reticle Optical Flow Switches with Multiple Reticle Mask Patterns

Figure 13:
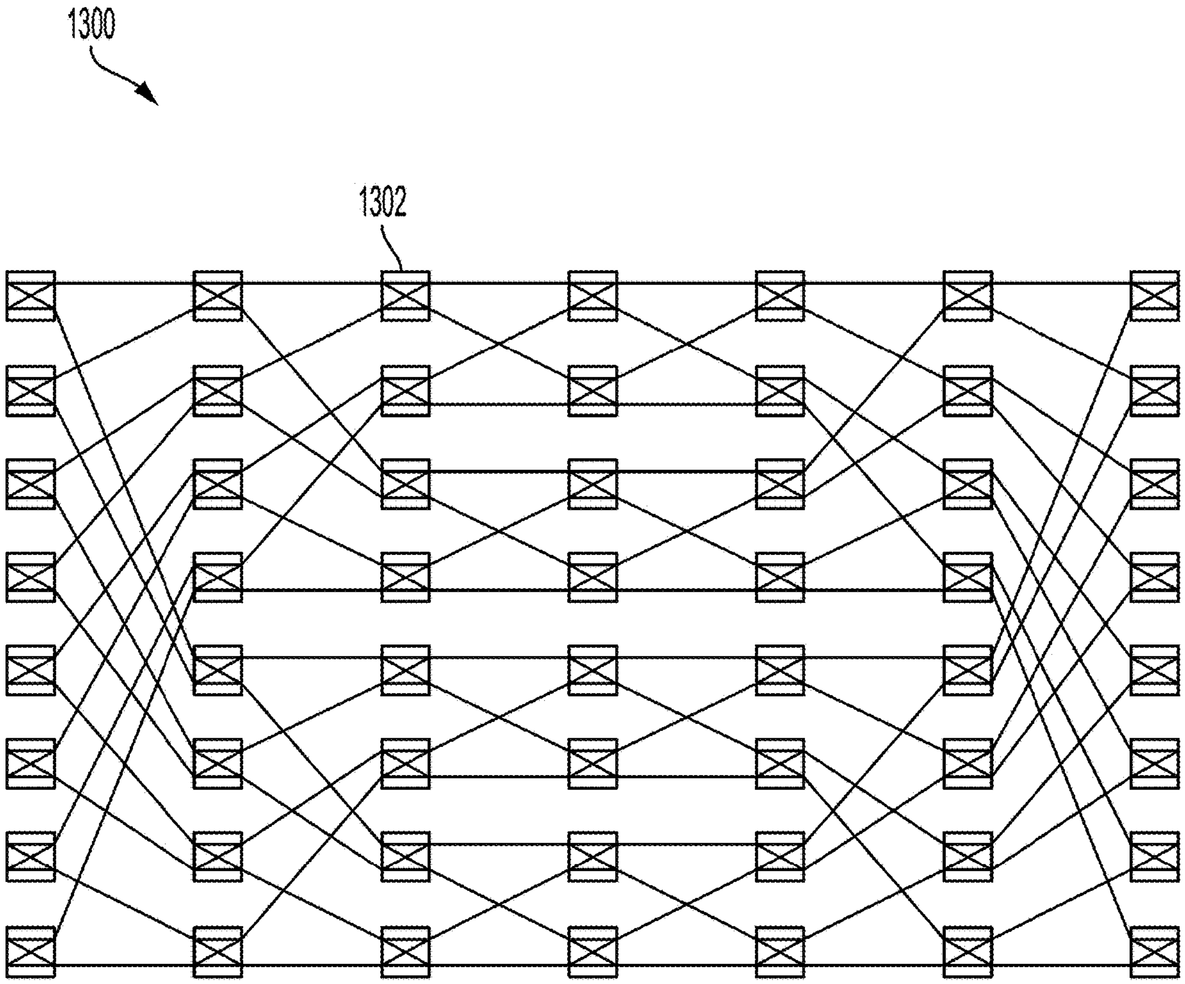
FIG. 13 is a schematic diagram illustrating a 16×16 Benes switch, in accordance with some embodiments of the technology described herein.
Figure 14A:
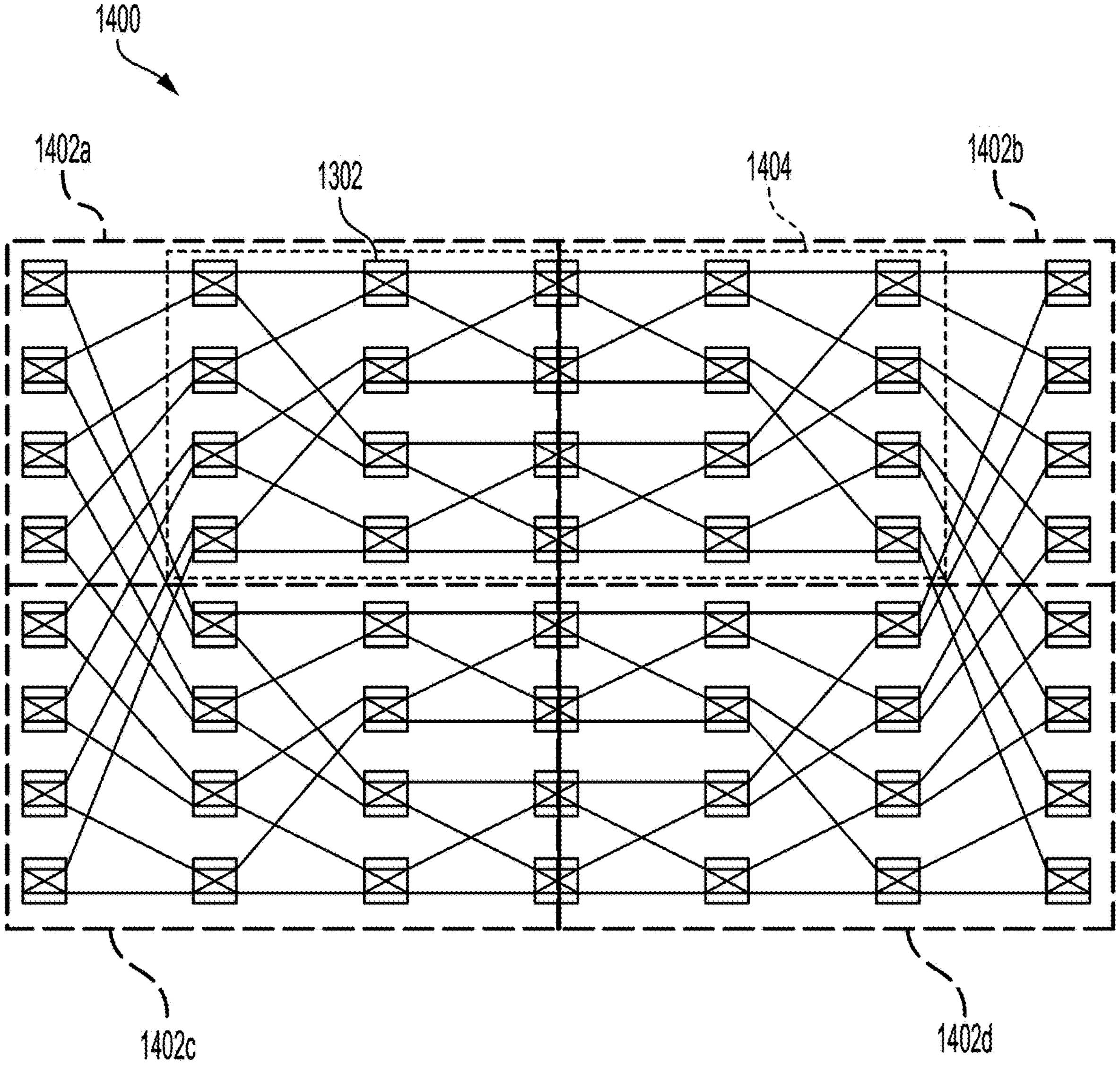
FIG. 14A is a schematic diagram illustrating a 16×16 Benes switch implemented using two columns and two rows of reticles, in accordance with some embodiments of the technology described herein.

The inventors have further recognized and appreciated that certain photonic switch architectures may benefit from being manufactured using more than a single reticle mask pattern. As an example, consider the problem of constructing a 16×16 Benes switch 1300 comprising 56 photonic switches 1302, as shown in the example of FIG. 13. As shown in FIG. 14A, the Benes switch 1300 may be fabricated using an arrangement of two columns and two rows of reticles 1402*a*-1402*d*. However, this arrangement utilizes four independent reticle mask sets, with one mask set being used per reticle 1402*a*-1402*d*. Due to the number of independent mask sets being used to fabricate this Benes switch 1300, such an optical flow switch may be costly to fabricate. Additionally, not all fabrication foundries can support four independent mask sets within a single wafer.

Figure 14B:
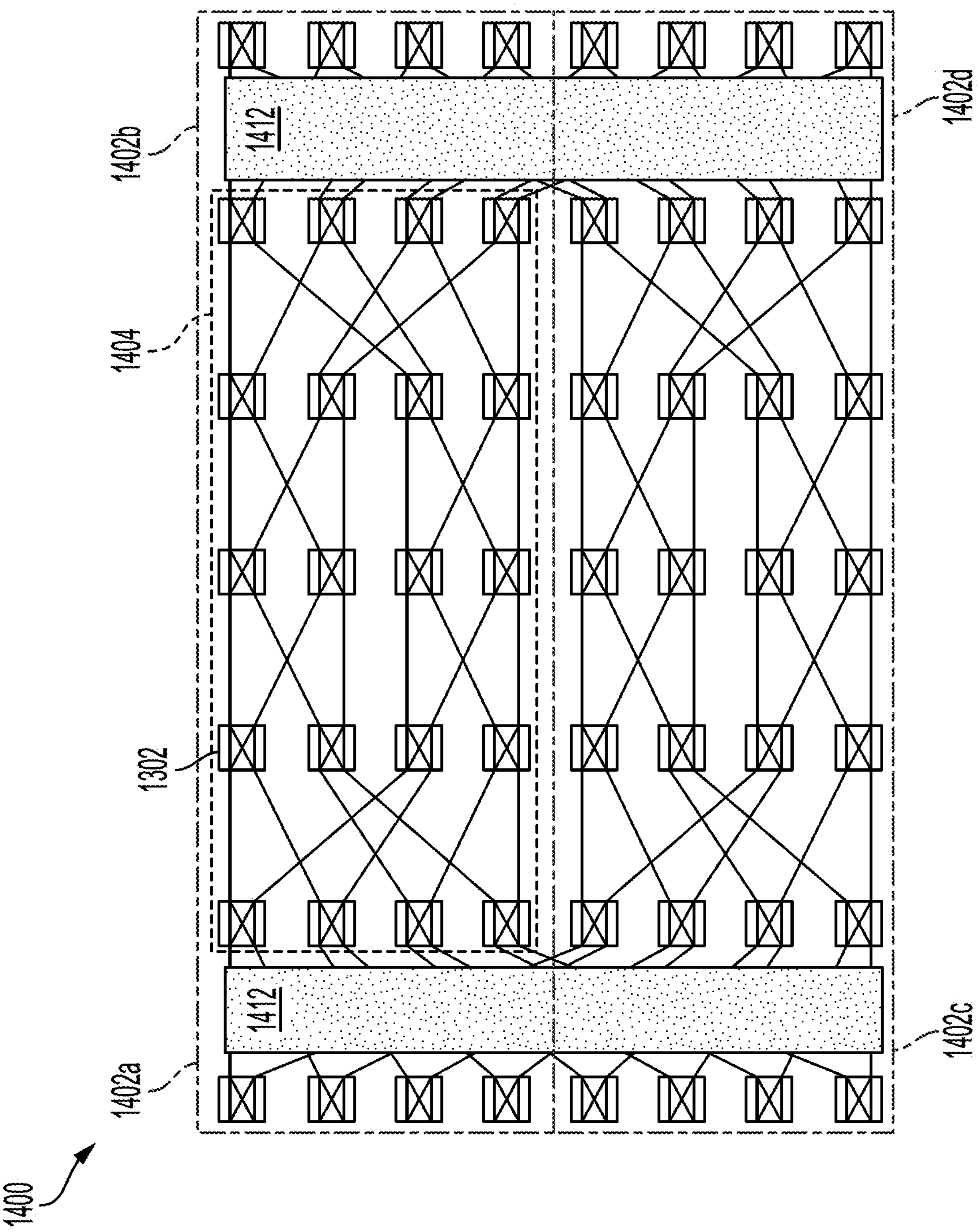
FIG. 14B is a schematic diagram illustrating a 16×16 Benes switch implemented using two columns and two rows of reticles, a reduced number of reticle mask sets, and switch routers, in accordance with some embodiments of the technology described herein.

In contrast, the example of FIG. 14B shows an example of a 16×16 Benes switch 1400 that can be manufactured using a reduced number of reticle mask sets, in accordance with some embodiments of the technology described herein. The Benes switch 1400 may be manufactured using, for example, two reticle mask sets. One reticle mask set may be used for the reticles 1402*a* and 1402*c*, forming the left column of the Benes switch 1400, and one reticle mask set may be used for the reticles 1402*b* and 1402*d*, forming the right column of the Benes switch 1400.

In the example of FIG. 14B, the number of reticle mask sets may be reduced because: (i) the Benes switch 1400 can be described recursively as containing two 8×8 Benes switches 1404, and (ii) the layer containing waveguides crossing the horizontal reticle boundary between the two rows of reticles is replaced with waveguides and switch routers 1412. Because the layer forming the Benes switch 1400 is achieved with just two rows, the switches in the switch routers 1412 comprise 1:2 and 2:1 switches. In general, if a layer in the optical flow switch is achieved with N rows, then the switches used in the switch routers are 1:N and N:1 switches.

Figure 15:
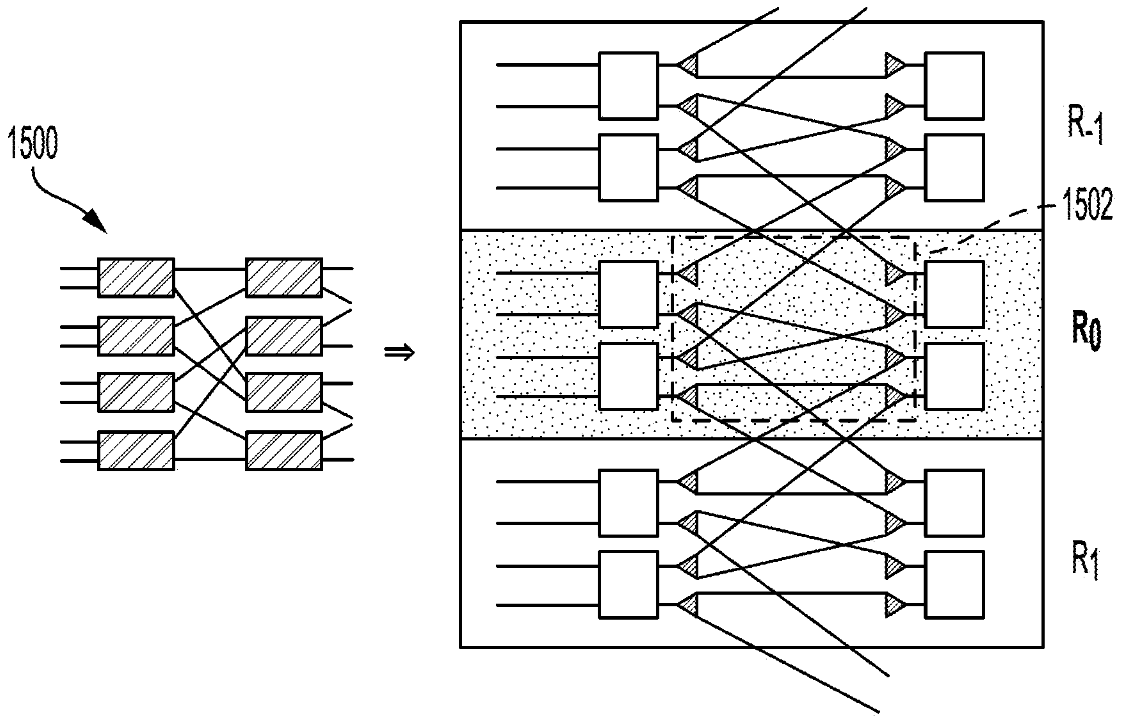
FIG. 15 is a schematic diagram illustrating routing using 1:2 and 2:1 switches, in accordance with some embodiments of the technology described herein.

FIG. 15 is a schematic diagram illustrating routing in a first layer of an 8×8 Benes switch 1500, in accordance with some embodiments of the technology described herein. In some embodiments, the switch router 1502 may include 1:2 and 2:1 switches that can be actively configured to achieve routing within the Benes switch architecture.

Figure 16A:
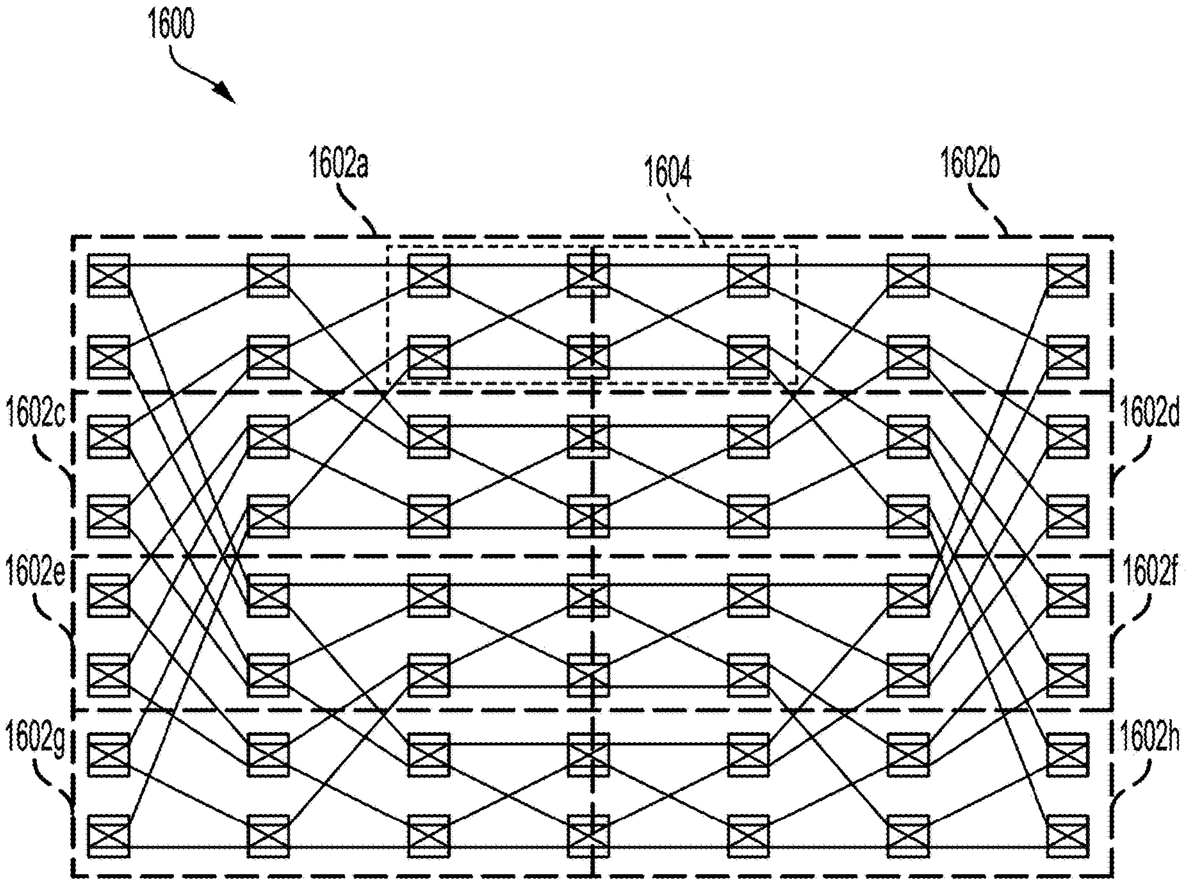
FIG. 16A is a schematic diagram illustrating a 16×16 Benes switch implemented using two columns and four rows of reticles, in accordance with some embodiments of the technology described herein.

FIG. 16A is another example of a 16×16 Benes switch 1600 implemented using two columns and four rows of reticles, for a total of eight reticles 1602*a*-1602*h*, in accordance with some embodiments of the technology described herein. As depicted in FIG. 16A, fabrication of the Benes switch 1600 would need to use two reticle masks sets of four masks each, which may not be supported by many fabrication facilities.

Figure 16B:
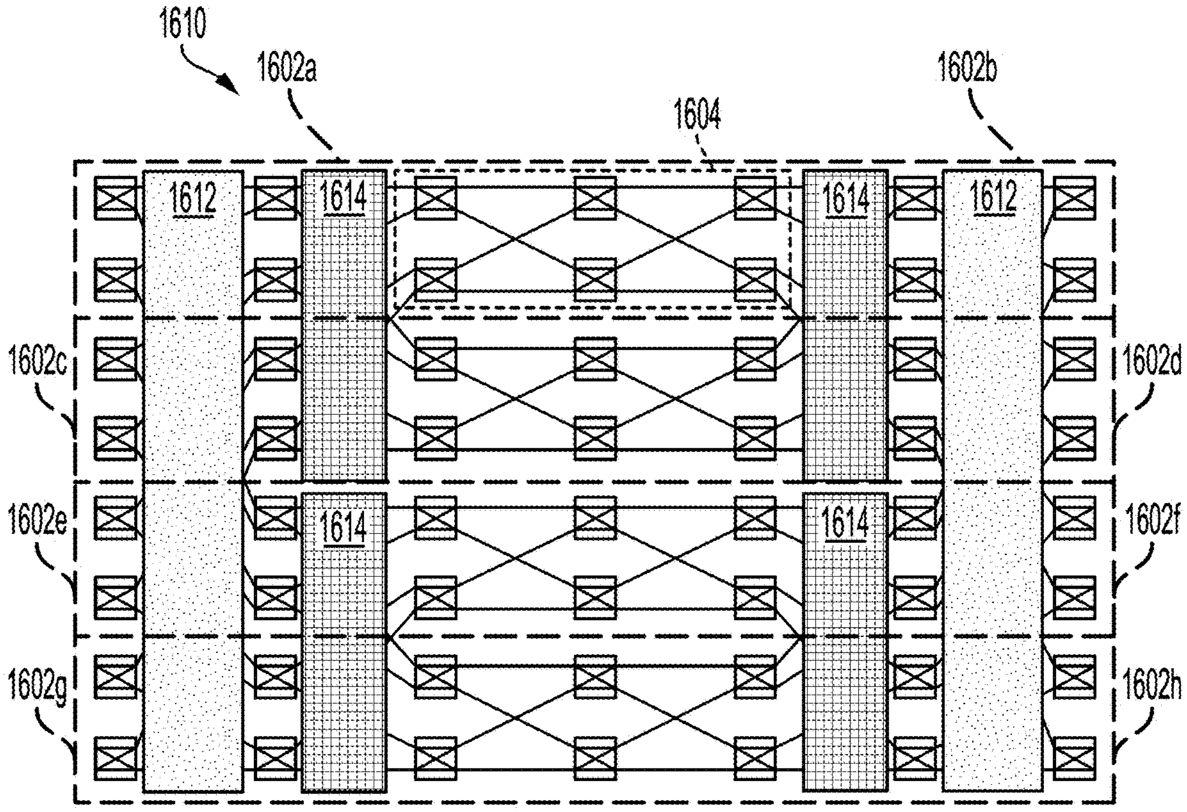
FIG. 16B is a schematic diagram illustrating a 16×16 Benes switch implemented using two columns and four rows of reticles, a reduced number of reticle mask sets, and switch routers, in accordance with some embodiments of the technology described herein.

In contrast, and as shown in the example of FIG. 16B, a 16×16 Benes switch 1610 may be fabricated with a reduced number of reticle masks by replacing interconnections spanning four reticles with switch routers 1612 comprising 1:4 and 4:1 routing switches. Additionally, interconnections spanning two reticles may be replaced with switch routers 1614 comprising 1:2 and 2:1 routing switches. In this manner, the 16×16 Benes switch 1610 may be recursively reduced to a series of 4×4 Benes switches 1604.

Figure 17A:
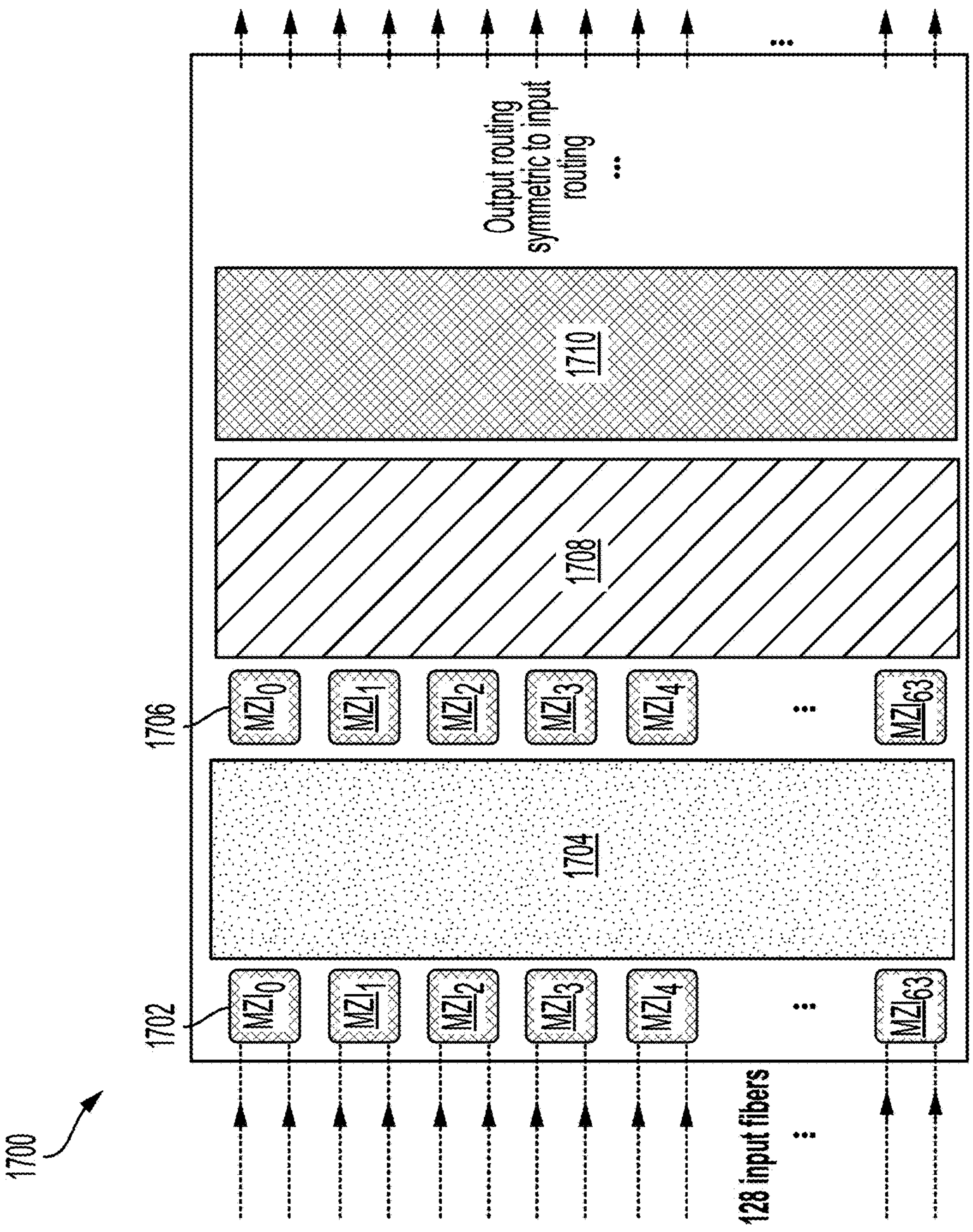
FIG. 17A is a schematic diagram illustrating a 512×512 Benes switch implemented using four reticles, in accordance with some embodiments of the technology described herein.

This routing strategy described above may be scaled up to accommodate larger N×N Benes switches. FIG. 17A is a schematic diagram illustrating a 512×512 Benes switch 1700 implemented using four reticles, in accordance with some embodiments of the technology described herein. Input optical fibers are coupled to first photonic switches 1702, which are optically coupled to second photonic switches 1706 by a first switch router 1704. The first switch router 1704 includes 1:4 and 4:1 switches to interconnect the first photonic switches 1702 with second photonic switches 1706 across the six reticles. The second photonic switches 1706 are then optically coupled to the Benes switches 1710 by second switch router 1702 which includes 1:2 and 2:1 switches. A symmetric output routing structure couples the Benes switches 1710 to the output optical fibers.

Figure 17B:
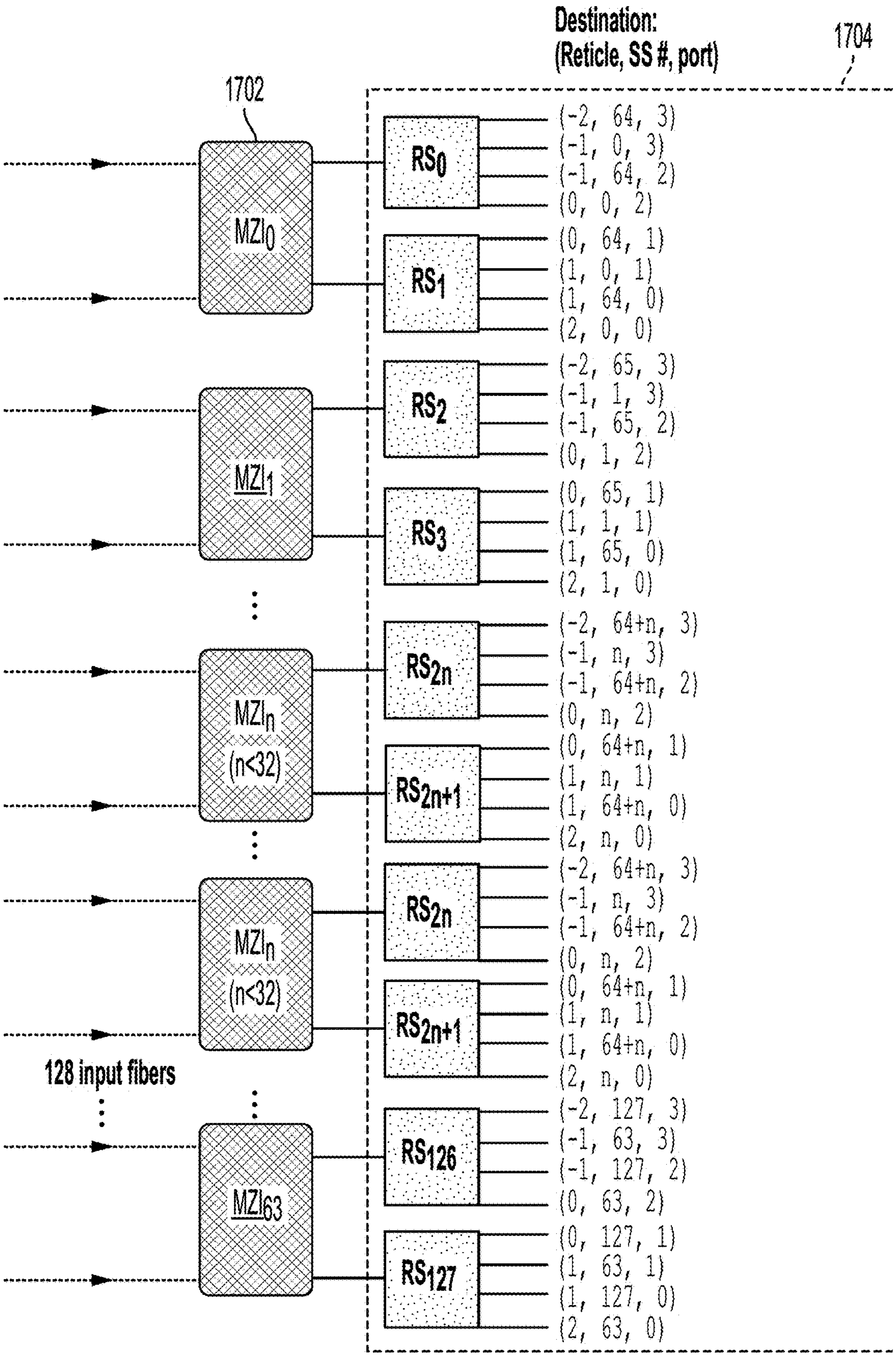
FIGS. 17B and 17C are schematic diagrams illustrating switch outputs and destinations for the first routing layer of the Benes switch of FIG. 17A, in accordance with some embodiments of the technology described herein.
Figure 17C:
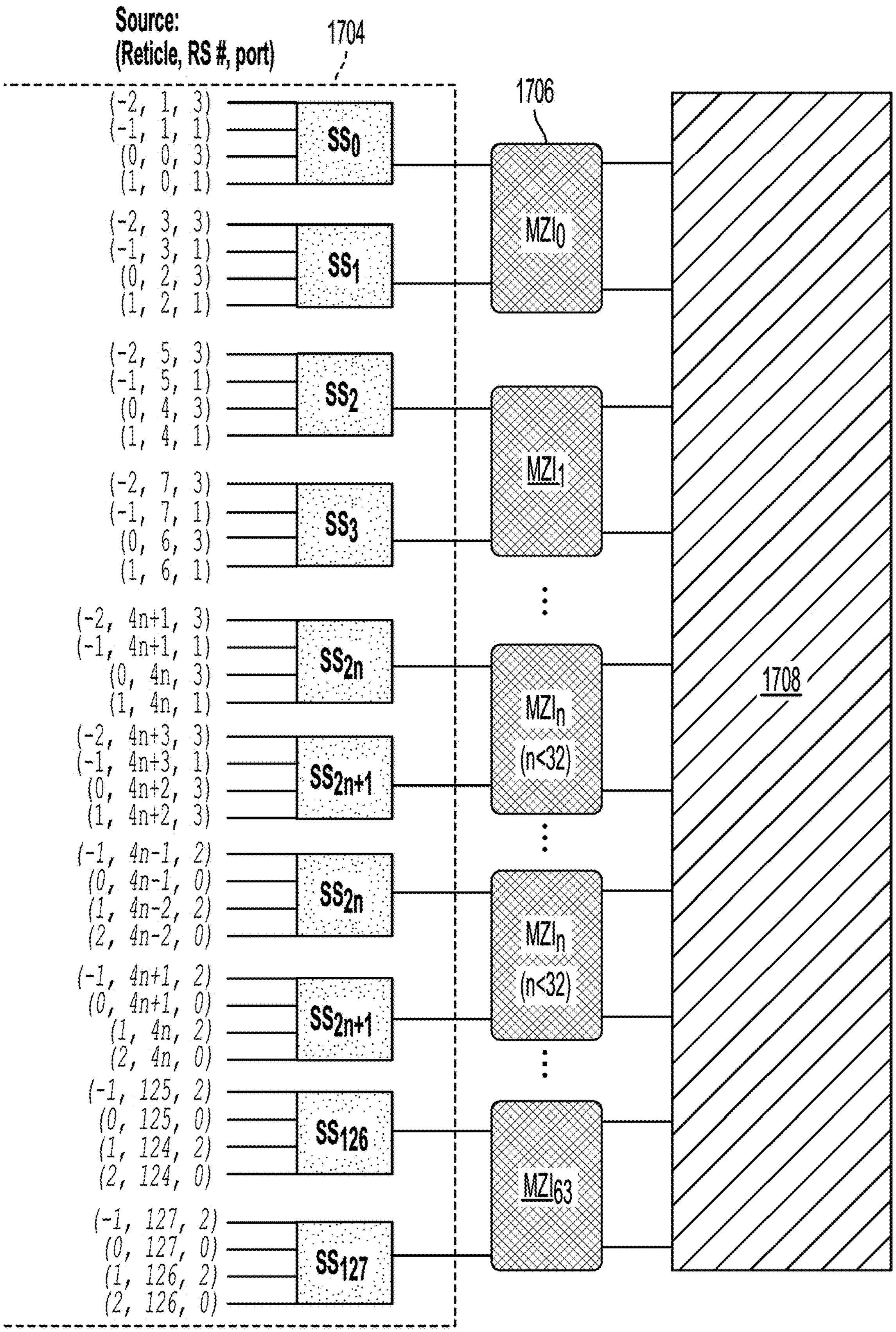

FIGS. 17B and 17C illustrate switch output addresses and destination addresses for switches in the first switch router 1704, in accordance with some embodiments of the technology described herein. In FIG. 17B, the output address of the RS switches in the first switch router 1704 is described by a string of three values indicating the reticle number, the destination switch number, and the output port number. Similarly, in FIG. 17C, the destination addresses of the SS switches are described by a string of three values indicating the reticle number, the transmitting RS switch number, and the output port number.

Figure 17D:
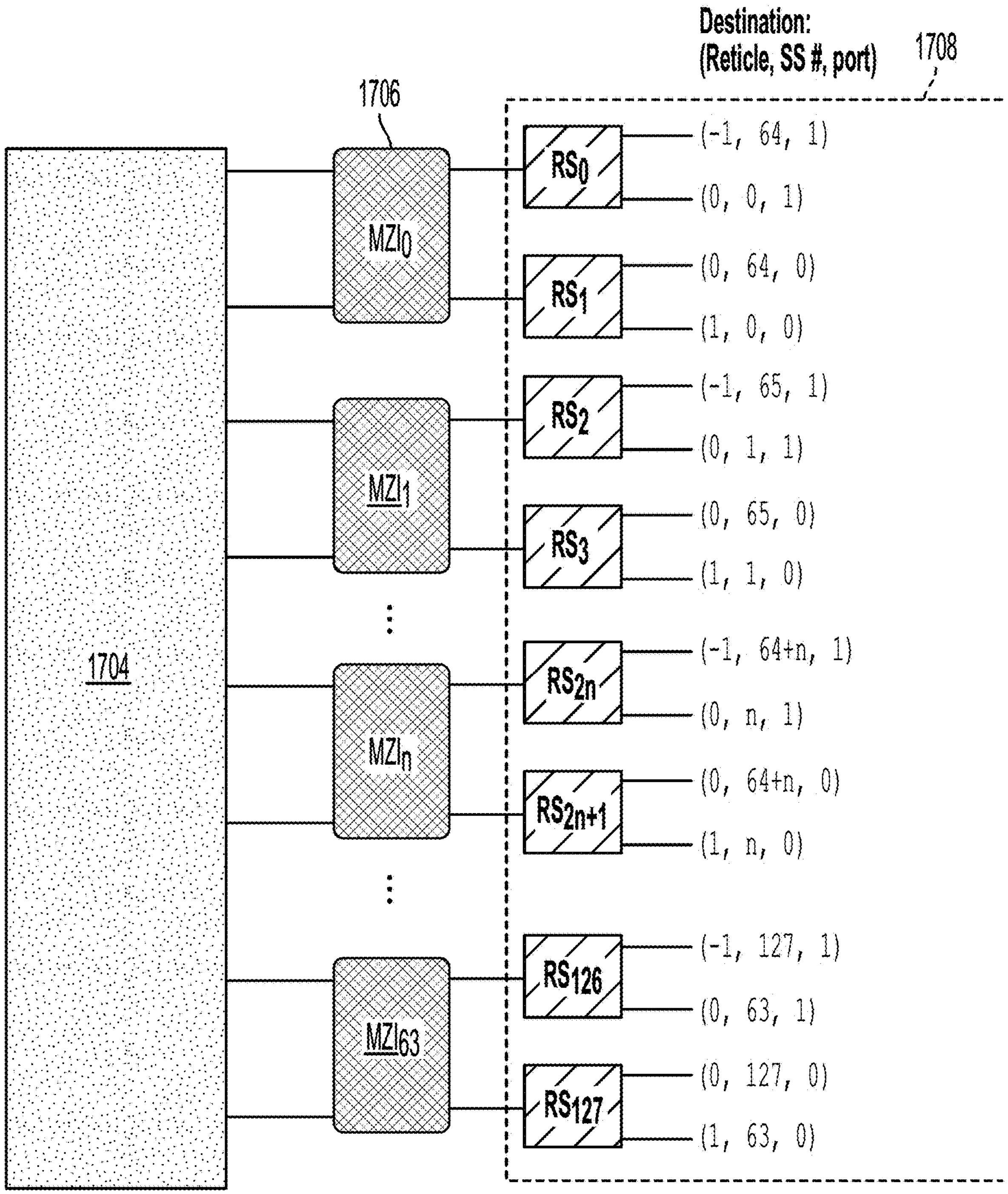
FIGS. 17D and 17E are schematic diagrams illustrating switch outputs and destinations for the second routing layer of the Benes switch of FIG. 17A, in accordance with some embodiments of the technology described herein.
Figure 17E:
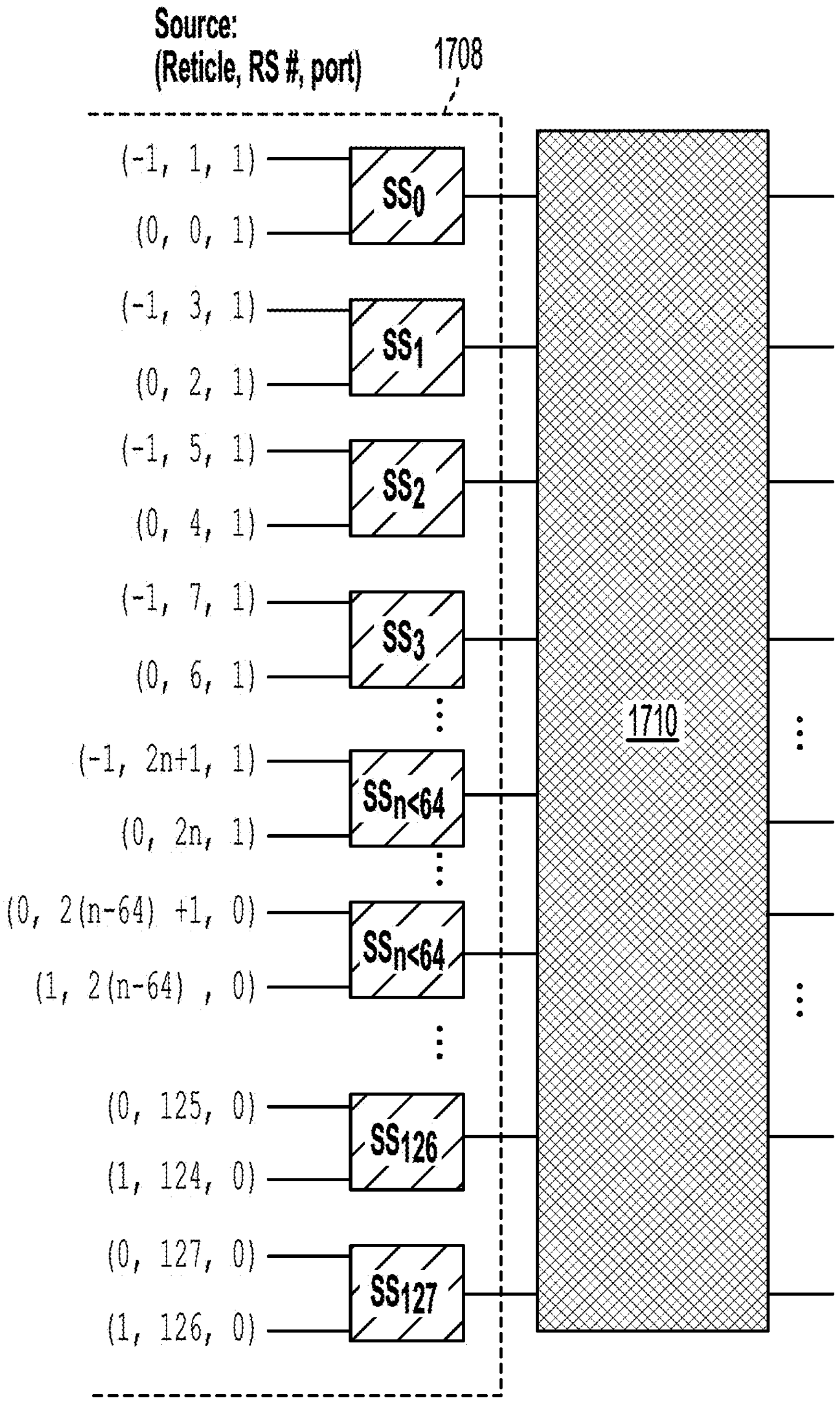

FIGS. 17D and 17E illustrate switch output addresses and destination addresses for switches in the second switch router 1708, in accordance with some embodiments of the technology described herein. In FIG. 17D, the output address of the RS switches in the second switch router 1708 are described by a string of three values indicating the reticle number, the destination switch number, and the output port number. Similarly, in FIG. 17E, the destination addresses of the SS switches are described by a string of three values indicating the reticle number, the transmitting RS switch number, and the output port number.

In some instances, it may be preferable to, or required by the fabrication facility, to divide the switch network between multiple columns of reticles, where each column use the same reticle mask set. In a Benes or Cantor network switch, there is a symmetry around the center of the switch. The symmetry can be described as either a mirror symmetry or a 180-degree rotation around the z-axis. If the fabrication process allows for either of these symmetries, then the optical flow switches as described in FIGS. 14B and 16B can be fabricated. However, most fabrication facilities require each reticle to have identical mask sets. The inventors have recognized and appreciated that a solution to this problem is to add additional input and output switches to each reticle. The additional switches allow for the routing of a Benes switch while adhering to the fabrication requirement that each column of reticles must use the same mask set.

Figure 18A:
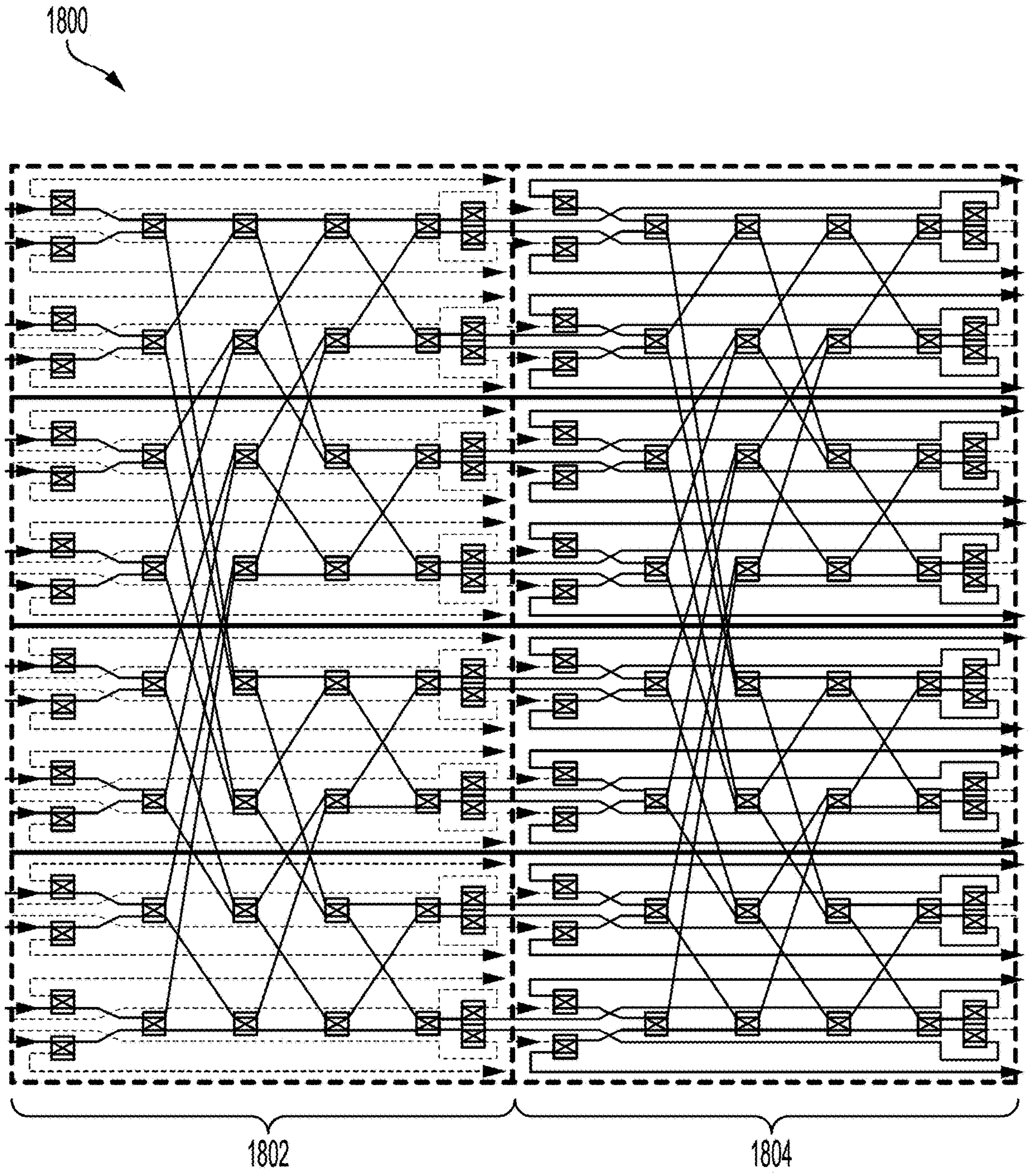
FIG. 18A is a schematic diagram illustrating a 16×16 Benes switch implemented using two columns and four rows of reticles, where each column is formed using a same reticle mask set, in accordance with some embodiments of the technology described herein.
Figure 18B:
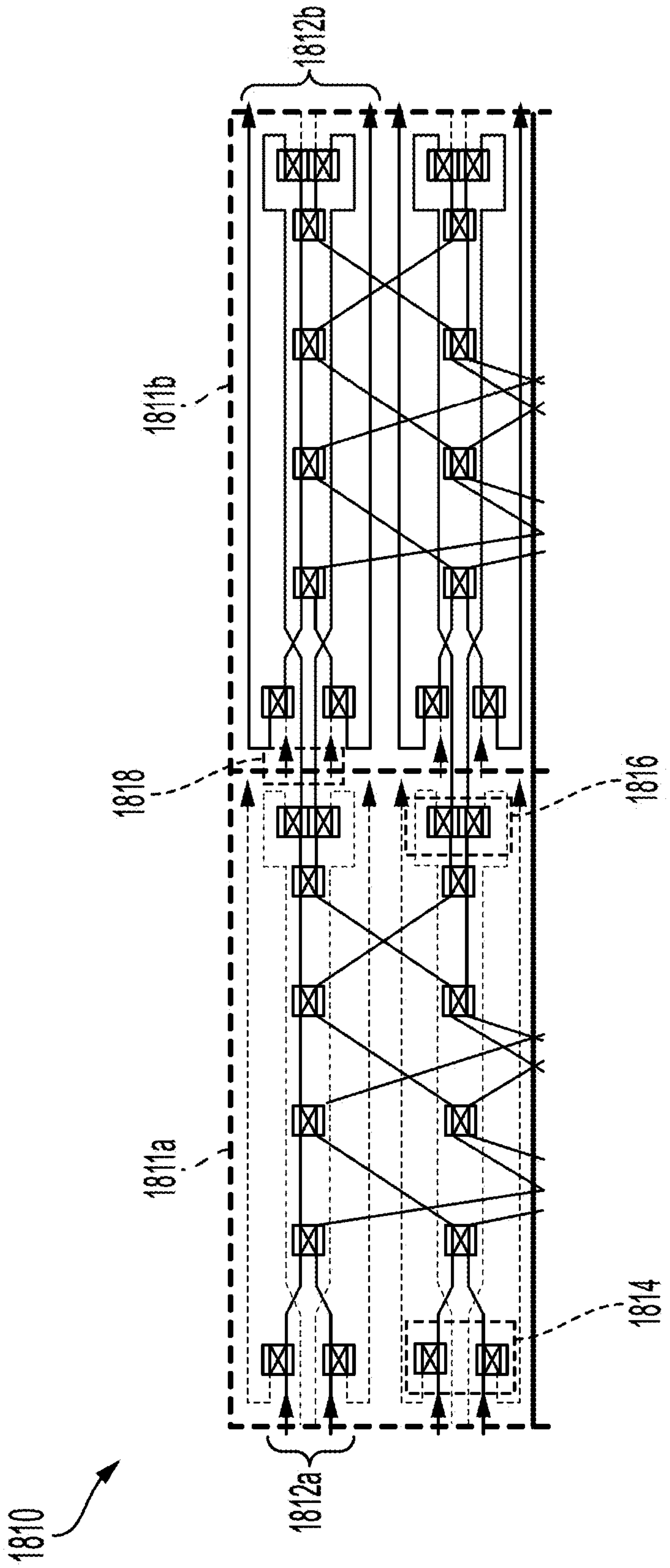
FIG. 18B is a detailed view of a first row of the Benes switch of FIG. 18A, in accordance with some embodiments of the technology described herein.

FIG. 18A is a schematic diagram illustrating an example of a 16×16 Benes switch 1800 implemented using two columns 1802 and 1804 and four rows of reticles, where each column is formed using a same reticle mask set (i.e., the two reticles in each row are identical), in accordance with some embodiments of the technology described herein. FIG. 18B is a detailed view of a first row of Benes switch 1800. Each reticle of Benes switch 1800 includes additional pairs of switches at inputs and outputs of each reticle.

In some embodiments, for an optical signal to traverse the row of reticle 1811*a* and 1811*b* from left to right, it may enter the switch network at edge couplers 1812*a*. The optical signal may then encounter a first pair of switches 1814. The first pair of switches 1814 may be configured to select whether the input optical signal will pass through the first pair of switches 1814 to the remaining switches within the reticle 1811*a* or if the input optical signal will be output from the reticle 1811*b* by edge couplers 1812*b*.

If the first pair of switches 1816 are configured to pass the optical signal from the first pair of switches 1814 to the remainder of the optical flow switch, then the optical signal will be transmitted to the second pair of switches 1816. In some embodiments, the second pair of switches 1816 may be configured to select whether the received optical signal will be output to the next reticle 1811*b*, or if the reticle 1811*b* will instead receive inputs from a reticle (not shown) to the left of the reticle 1811*a*.

Figure 19:
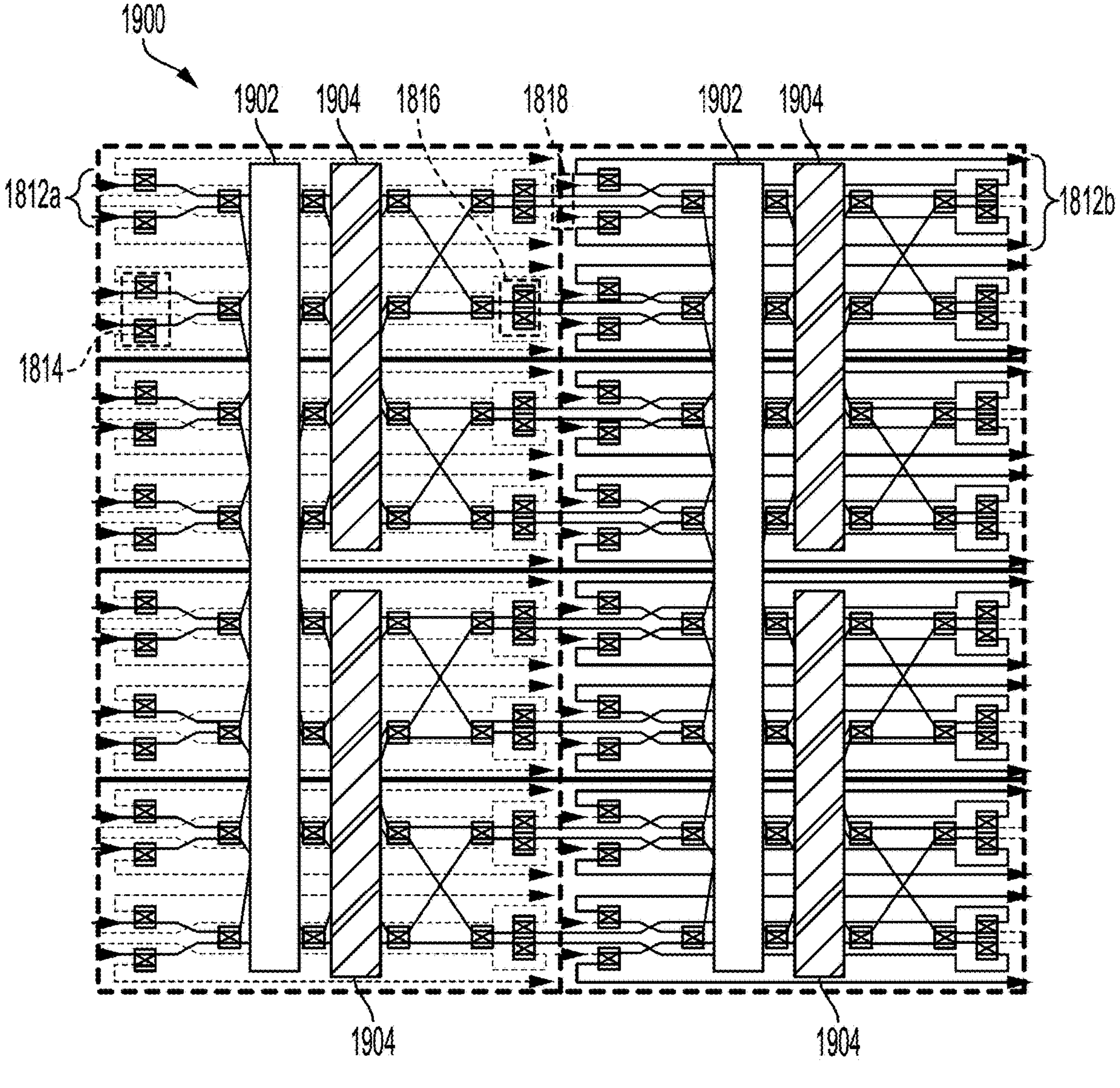
FIG. 19 is a schematic diagram illustrating a 16×16 Benes switch implemented using two columns and four rows of reticles and switch routers, where each column is formed using a same reticle mask set, in accordance with some embodiments of the technology described herein.

The inventors have also appreciated that the switch routing techniques described in connection with FIGS. 14B-17E may be combined with the reticle design techniques described in connection with FIGS. 18A-18B. FIG. 19 is a schematic diagram illustrating a 16×16 Benes switch 1900, where each column is formed using a same reticle mask set, in accordance with some embodiments of the technology described herein. In the example of FIG. 19, each column of the Benes switch 1900 includes first switch routers 1902 comprising 1:4 switches and second switch routers 1904 comprising 1:2 switches.

It should be appreciated that while the switch network design techniques described in connection with FIGS. 14B-19 are described in connection with various Benes switches, Cantor switch networks exhibit the same mirror symmetries as Benes switches. Accordingly, the switch design techniques described in connection with FIGS. 14B-19 may also be applied to Cantor switch networks, or other switch networks exhibiting mirror symmetries, as aspects of the technology described herein are not limited in this respect.

IX. Optical Flow Switch Packages

Figure 20A:
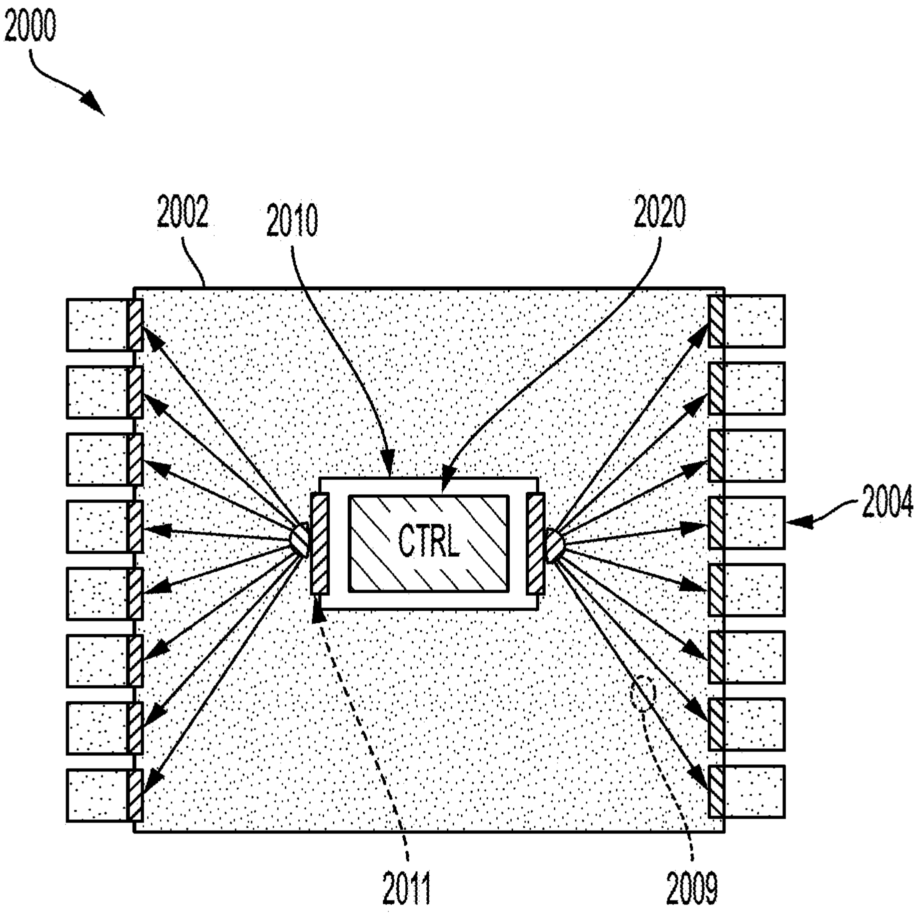
FIG. 20A is a schematic diagram of an optical flow switch package including a switch photonic integrated circuit (PIC) bonded to a glass substrate, in accordance with some embodiments of the technology described herein.
Figure 20B:
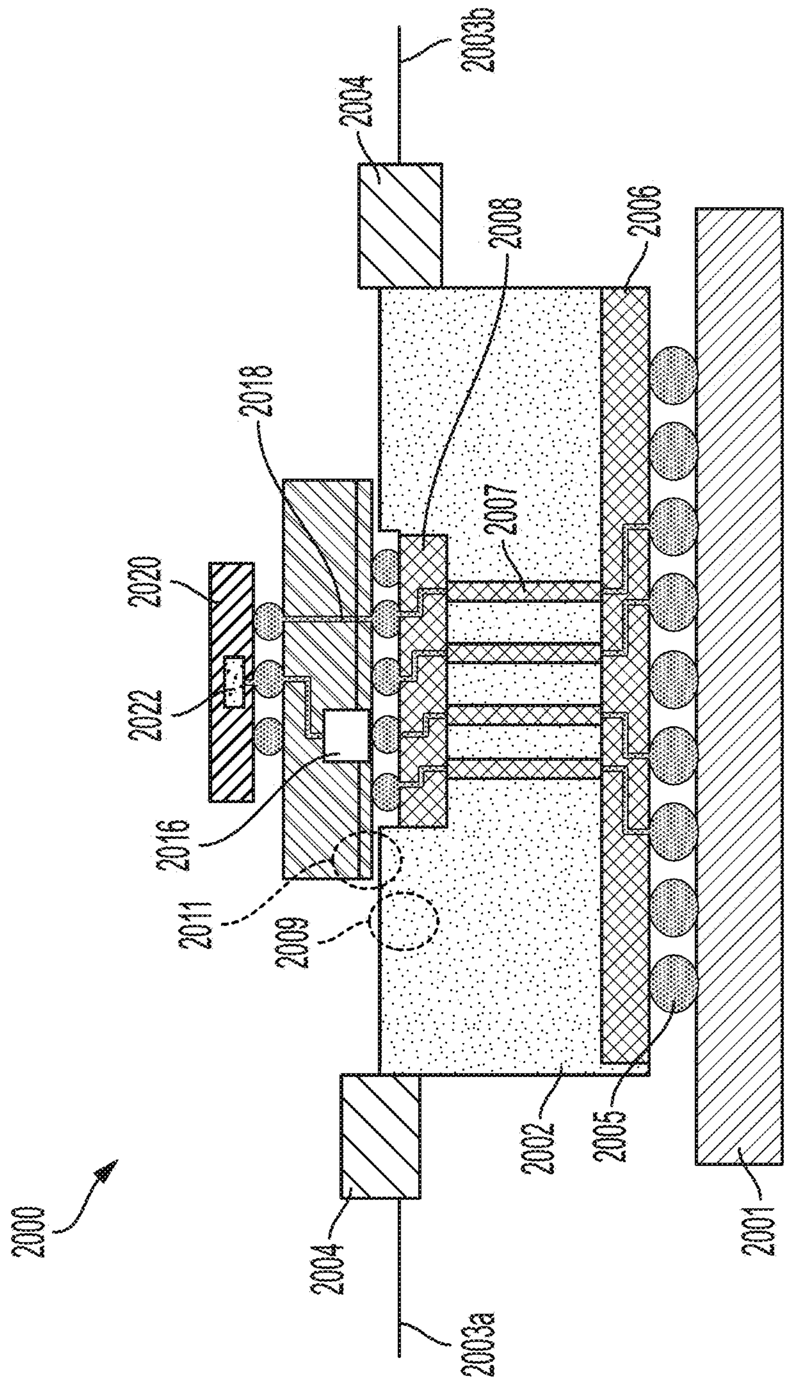
FIG. 20B is a cross-sectional view of the optical flow switch package of FIG. 20A, in accordance with some embodiments of the technology described herein.

In some embodiments, an optical flow switch (e.g., formed using one reticle or formed using multiple reticles, as described herein) can be packaged using a glass substrate. In the examples of FIGS. 20A and 20B, an optical flow switch package 2000 includes a glass substrate 2002 bonded to an electronic substrate 2001 (e.g., a printed circuit board or other substrate suitable for routing electronic signals). The glass substrate 2002 includes glass waveguides 2009 configured to provide an optical fan out from the pitch of the waveguides on the switch photonic integrated circuit (PIC) 2020 (e.g., on the order of 30 μm) to the pitch of optical fiber connections at edges of the glass substrate 2002 (e.g., on the order of 127 μm or 250 μm). In some embodiments, the glass waveguides 2009 are optically coupled to the switch PIC 2010 using evanescent couplers 2011 (e.g., 512 evanescent couplers) disposed on the switch PIC 2010.

In some embodiments, the fan out allows for the use of direct pluggable fiber array connectors 2004 comprising, for example, multi-fiber connectors (e.g., a 16-fiber or a 32-fiber multifiber push-on (MPO) connector) that can be directly plugged into the glass substrate to optically couple optical fibers 2003*a* and 2003*b* to the glass waveguides 2009. The direct pluggable fiber array connectors 2004 may be active pluggable fiber array units. For example, the direct pluggable fiber array connectors 2004 may include semiconductor optical amplifiers (SOAs) for amplifying the optical signals entering and exiting the optical flow switch package 2000 so that overall loss caused by the optical flow switch package 2000 may be minimized.

In some embodiments, the glass substrate 2002 also provides the electrical connections between the switch PIC 2010 and the substrate 2001. The glass substrate may include a bottom redistribution layer (RDL) 2006 and a top RDL 2008. The glass substrate 2002 may be bonded to the substrate 2001 by electrical connections 2005 (e.g., by solder-bonding or other suitable electrical bonding techniques) formed between the substrate 2001 and the bottom RDL 2006. The bottom RDL 2006 may be electronically coupled to the top RDL 2008 by through-glass vias 2007.

In some embodiments, the switch PIC 2010 is bonded to the glass substrate 2002 at top RDL 2008 (e.g., by solder-bonding or other suitable electrical bonding techniques). The switch PIC 2010 includes photonic switch elements 2016 (e.g., photonic switch networks forming optical flow switches, as described herein). Additionally, a control chip 2020 including control circuitry 2022 is bonded on top of the switch PIC 2010. The control circuitry 2022 may be configured to provide control signals to the photonic switch elements 2016 (e.g., to reconfigure the photonic switch elements 2016 during operation of the optical flow switch package 2000). Electrical signals from the substrate 2001 are routed to the control chip 2020 using through silicon vias (TSVs) 2018.

Figure 20C:
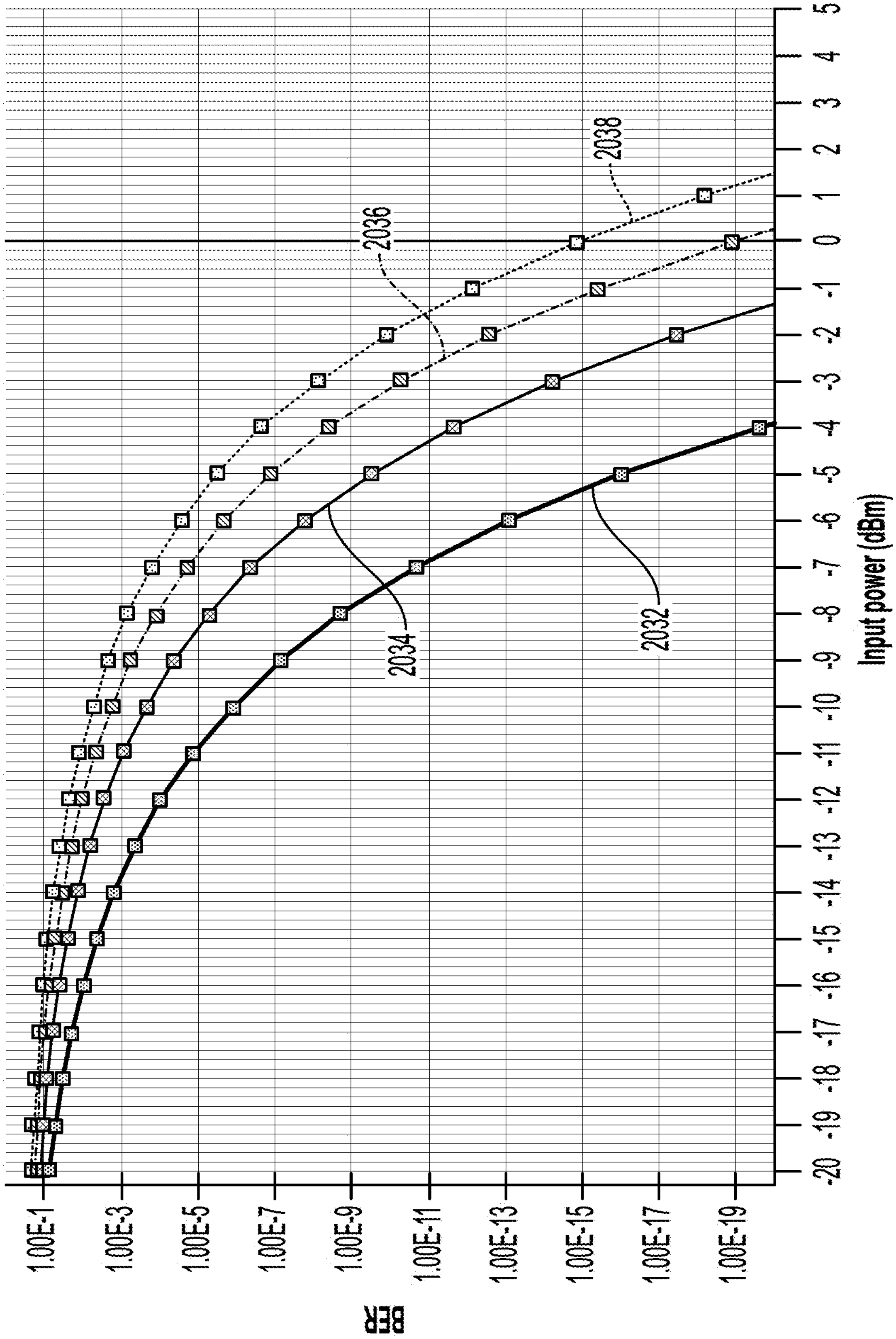
FIG. 20C is a plot illustrating simulated bit error rates (BERs) as a function of input power for the optical flow switch package of FIG. 20A, in accordance with some embodiments of the technology described herein.

FIG. 20C is a plot illustrating simulated bit error rates (BERs) as a function of input power for optical flow switch package 2000, in accordance with some embodiments of the technology described herein. The plot includes simulation results for the transmission of a 64 Gbps non-return-to-zero (NRZ) optical signal traversing a network of 512×512 photonic switches. The plot includes curves showing the simulated BER for one traversal of the network (2032), two traversals of the network (2034), three traversals of the network (2036), and four traversals of the network (2038).

Figure 21:
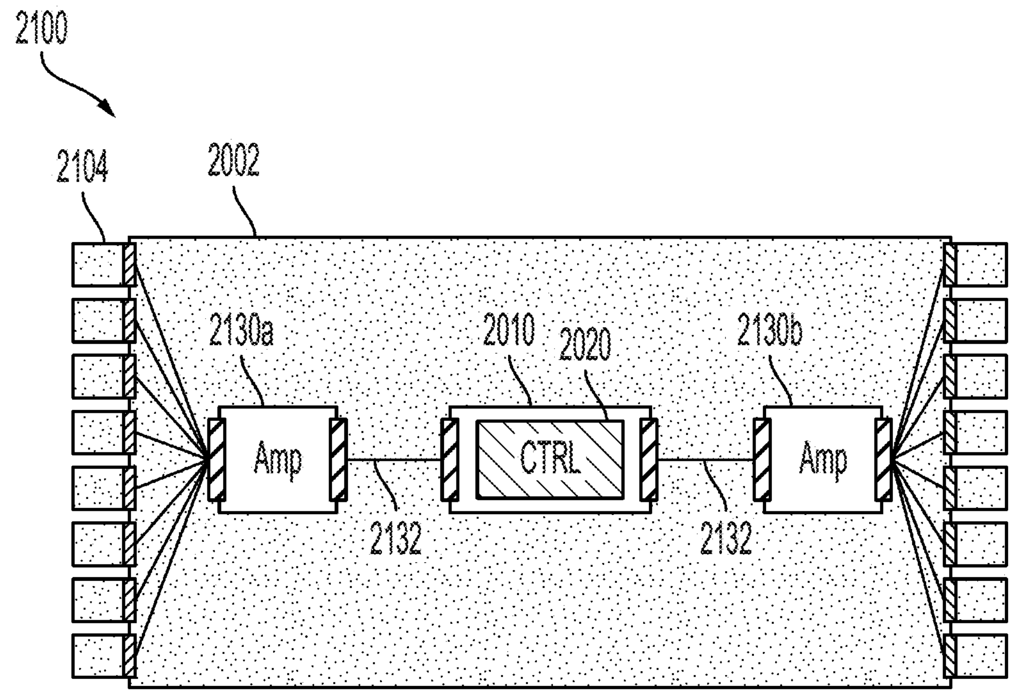
FIG. 21 is a schematic diagram of another optical flow switch package including a switch PIC bonded to a glass substrate and two additional amplifier PICs, in accordance with some embodiments of the technology described herein.

In some embodiments, amplification may be provided by one or more PICs disposed on the glass substrate 2002 rather than by active fiber array units. FIG. 21 depicts an example of an optical flow switch package 2100 including amplifier PICs 2130*a* and 2130*b* coupled between the switch PIC 2010 and each of the passive fiber array units 2104. The amplifier PICs 2130*a* and 2130*b* are coupled to the switch PIC 2010 by glass waveguides 2132. The amplifier PICs 2130*a* and 2130*b* may be, for example, PICs including SOAs.

Figure 22A:
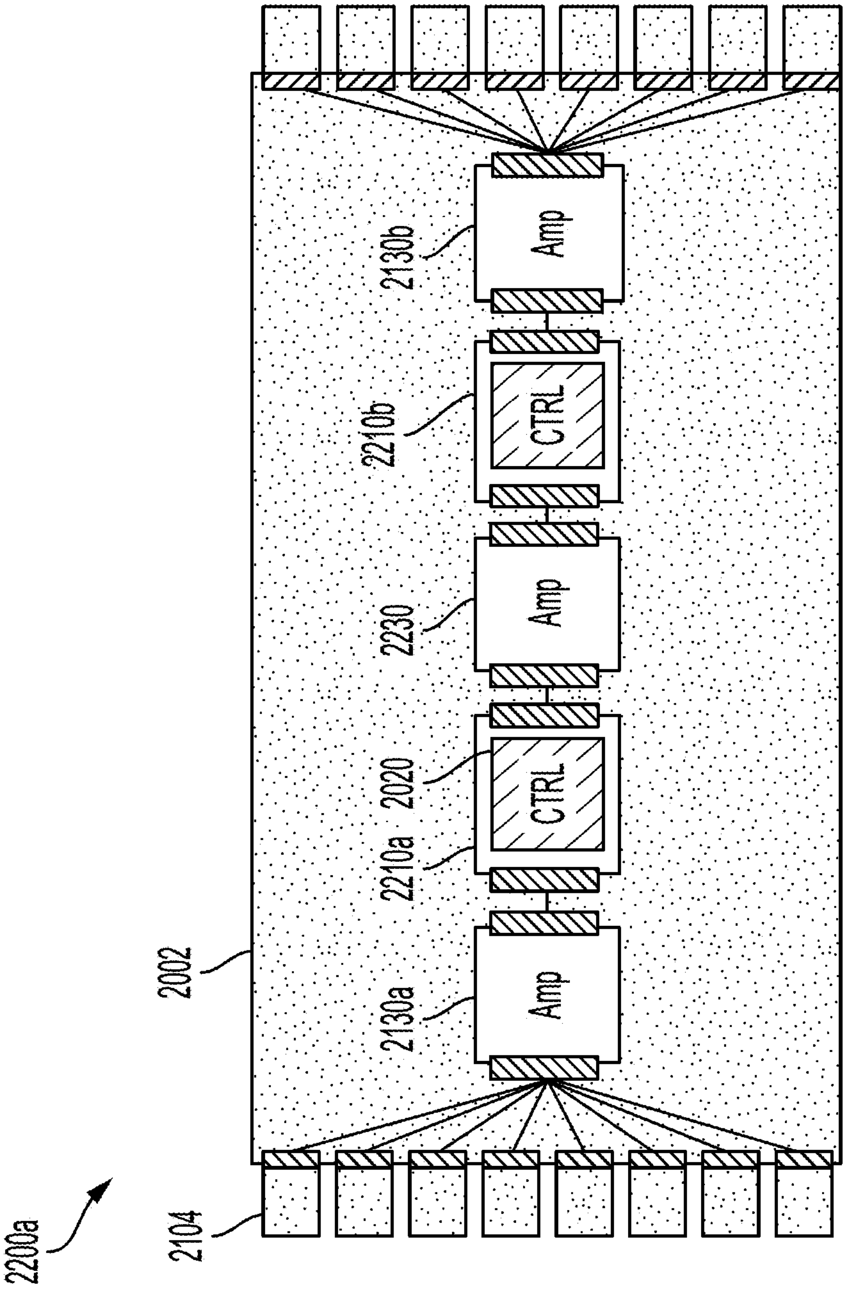
FIG. 22A is a schematic diagram of another optical flow switch package including two switch PICs bonded to a glass substrate and three additional amplifier PICs, in accordance with some embodiments of the technology described herein.

In some embodiments, the mirror symmetry of the Benes or Cantor switch network may be utilized to simplify fabrication of the switch PIC. FIG. 22A depicts an example of an optical flow switch package 2200*a* including two switch PICs 2210*a* and 2210*b* separated by a third amplifier PIC 2030. The two switch PICs 2210*a* and 2210*b* each include only half of the total switch network used by the optical flow switch package 2200*a* (i.e., the switch network of switch PIC 2010 is distributed across the two switch PICs 2210*a* and 2210*b*). The first switch network of switch PIC 2010*a* is disposed on the glass substrate 2002 in a first orientation, and the second switch network of switch PIC 2010*b* is disposed on the glass substrate 2002 in a second orientation that is rotated 180 degrees relative to the first orientation of the switch PIC 2010*a*. That is, switch PICs 2010*a* and 2010*b* include switch networks that have mirror symmetry with one another.

Figure 22B:
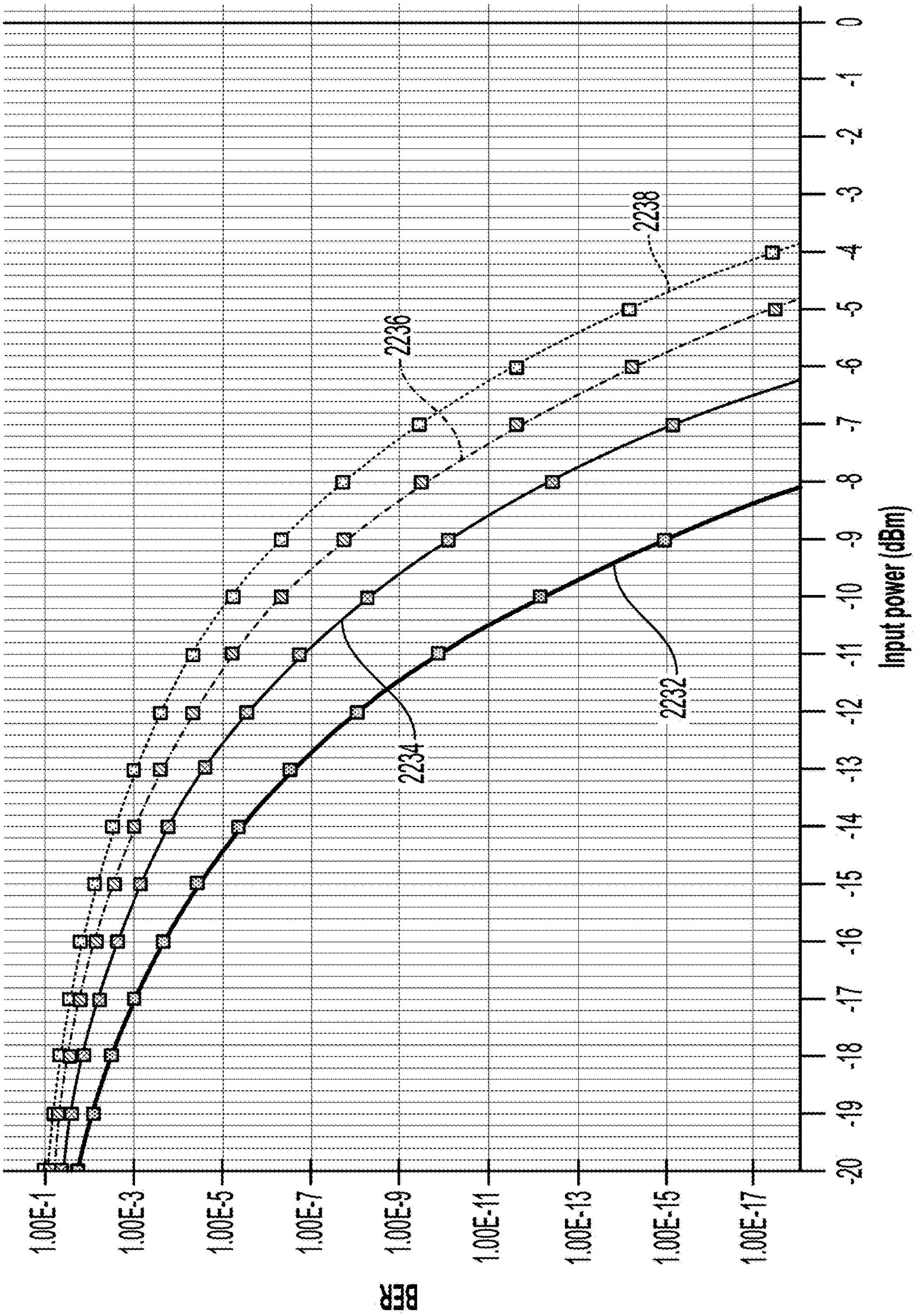
FIG. 22B is a plot illustrating simulated BERs as a function of input power for traversals of the optical flow switch of FIG. 22A, in accordance with some embodiments of the technology described herein.

FIG. 22B is a plot illustrating simulated BERs as a function of input power for traversals of the optical flow switch of FIG. 22A, in accordance with some embodiments of the technology described herein. The plot includes simulation results for the transmission of a 64 Gbps non-return-to-zero (NRZ) optical signal traversing a network of 512×512 photonic switches and a central amplifier. The plot includes curves showing the simulated BER for one traversal of the network (2232), two traversals of the network (2234), three traversals of the network (2236), and four traversals of the network (2238). In contrast with the curves shown in the plot of FIG. 20C, the BER curves of FIG. 22B indicate that the additional amplifier PIC 2230 reduces the overall noise figure of the optical flow switch package 2200*a*. That is, the split-switch configuration requires significantly lower optical power to achieve a same BER for the same number of optical flow switch traversals than the single-switch configuration of FIGS. 20A and 20B. The difference in required optical power can be understood as an additional power penalty due to the higher optical noise figure of the single-switch case.

Figure 22C:
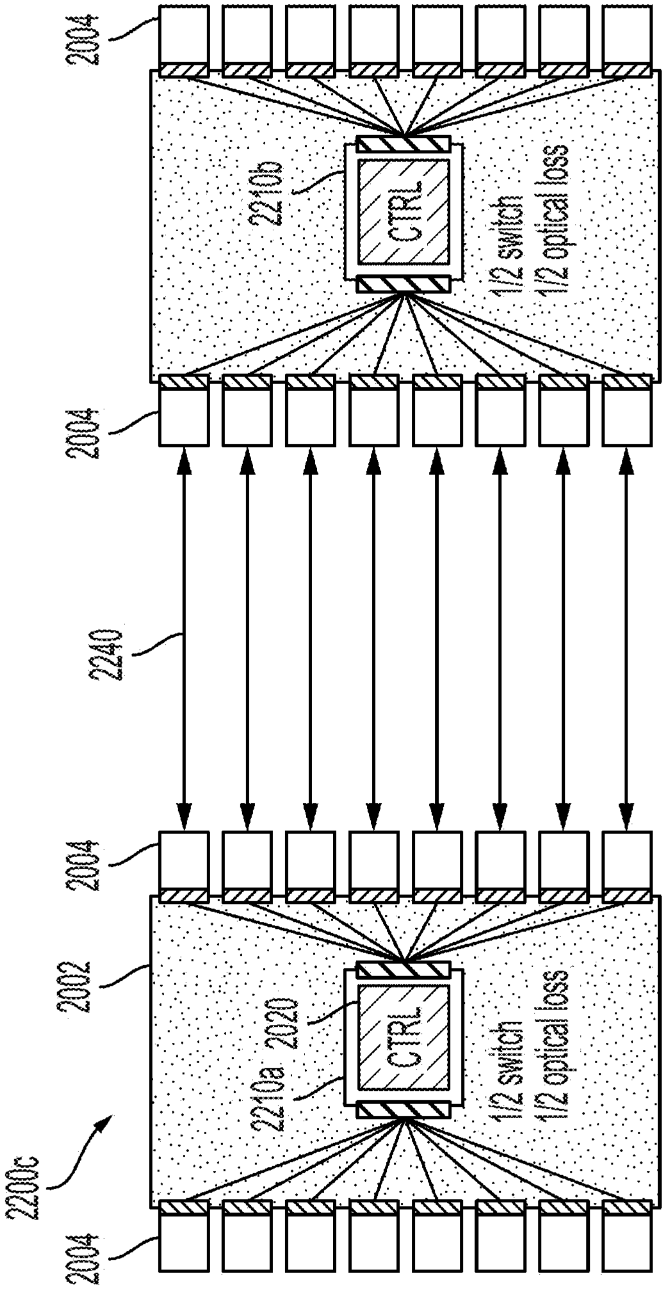
FIG. 22C is a schematic diagram of another optical flow switch package including two switch PICs, each bonded to a separate glass substrate, in accordance with some embodiments of the technology described herein.

In some embodiments, additional amplification between the two switch PICs 2210*a* and 2210*b* may be provided by direct pluggable fiber array connectors 2004. FIG. 22C depicts and example of an optical flow switch package 2200*c* including two switch PICs 2210*a* and 2210*b*, each bonded to a separate glass substrate, in accordance with some embodiments of the technology described herein. Amplification between the two switch PICs 2210*a* and 2210*b* is provided by the central pair of direct pluggable fiber array connectors 2004. The central pair of direct pluggable fiber array connectors 2004 are coupled, for example, by optical fibers or any other suitable off-chip optical coupling techniques.

Figure 22D:
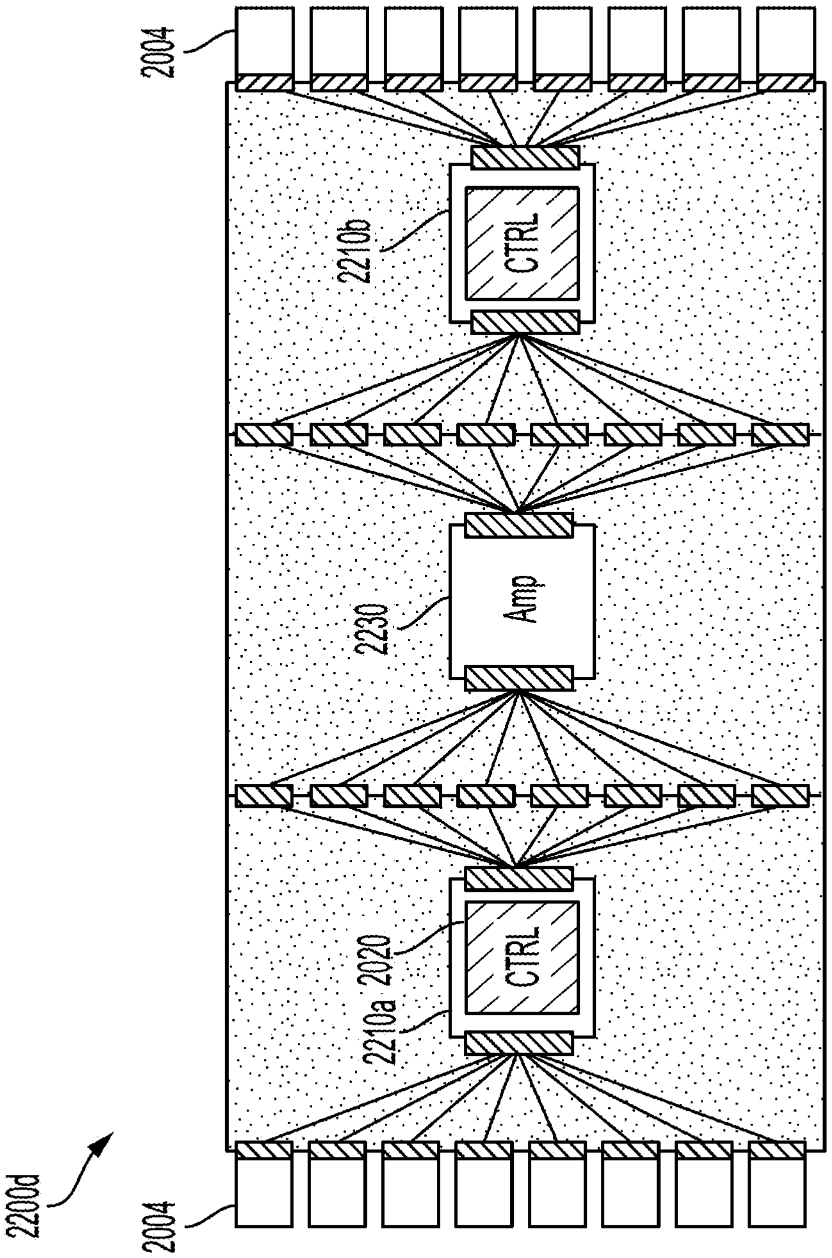
FIG. 22D is a schematic diagram of another optical flow switch package including two switch PICs bonded to a glass substrate and optically coupled through an amplifier PIC, in accordance with some embodiments of the technology described herein.

In some embodiments, the amplification at the input and output of the optical flow switch may be provided by direct pluggable fiber array connectors 2004. FIG. 22D depicts an example of an optical flow switch package 2200*d* including two switch PICs 2210*a* and 2210*b* bonded to a glass substrate and optically coupled through an amplifier PIC, in accordance with some embodiments of the technology described herein. Amplification at inputs and outputs of the optical flow switch package 2200*d* are provided by the direct pluggable fiber array connectors 2004 as described herein.

Figure 24:
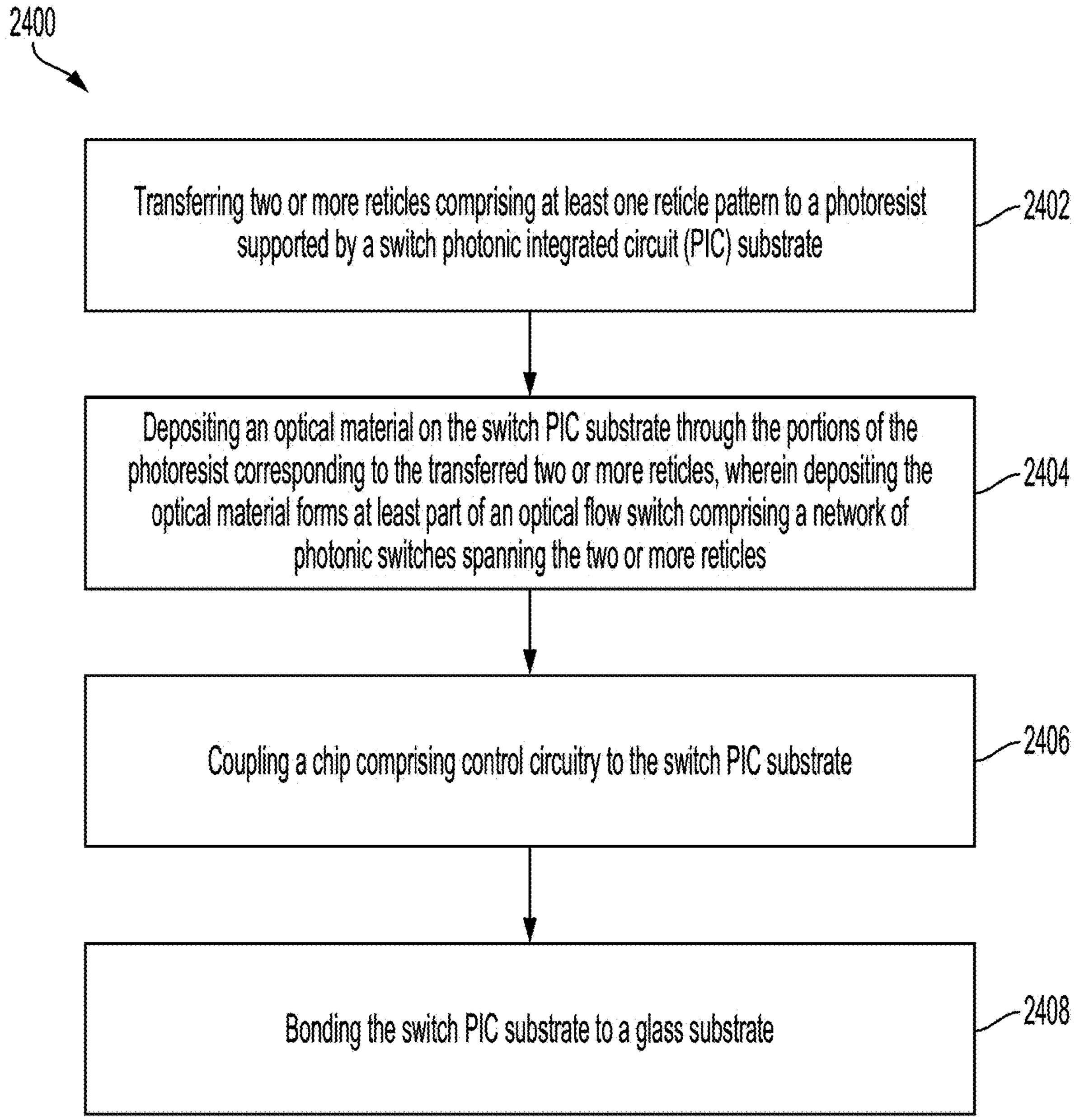
FIG. 24 is a flowchart of a process 2400 of manufacturing an optical flow switch package, in accordance with some embodiments of the technology described herein.

FIG. 24 is a flowchart of a process 2400 of manufacturing an optical flow switch package, in accordance with some embodiments of the technology described herein. Process 2400 may begin at act 2402, in which two or more reticles comprising at least one reticle pattern may be transferred to a photoresist supported by a switch PIC substrate. For example, the two or more reticles may be transferred to the photoresist by exposing portions of the photoresist to ultraviolet (UV) light through transparent portions of the at least one reticle pattern. The photoresist may be a positive photoresist, such that exposed portions of the photoresist may be soluble to a photoresist developer. Alternatively, the photoresist may be a negative photoresist, such that portions of the photoresist that are not exposed to the UV light may be soluble to a photoresist developer.

In some embodiments, the two or more reticles have a same reticle pattern. When transferring the two or more reticles to the photoresist, the same reticle pattern may be stamped repeatedly across the photoresist, iteratively exposing the photoresist to transfer a repeating reticle pattern that may be used to form the network of photonic switches. Alternatively, the two or more reticles may be associated with sets of reticle mask patterns. The sets of mask patterns may be stamped repeatedly across the photoresist, iteratively exposing columns or rows of the photoresist to transfer repeating reticle patterns in columns or rows that may be used to form the network of photonic switches.

In some embodiments, the network of photonic switches may be formed across two switch PIC substrates. Transferring the two or more reticles to the photoresist may then comprises transferring the two or more reticles to regions of photoresist that correspond to regions that will be used to form separated switch PIC substrates. For example, the two or more reticles may be transferred to regions of the photoresist on portions of the substrate that will be diced apart from one another. Alternatively, the two or more reticles may be transferred to photoresists located on separate substrates.

After act 2402, process 2400 may proceed to act 2404 in some embodiments. At act 2404, an optical material may be deposited on the switch PIC substrate through the portions of the photoresist corresponding to the transferred two or more reticles. The optical material may be deposited by any suitable deposition technique (e.g., chemical vapor deposition, atomic layer deposition, etc.). The optical material may comprise, for example, a semiconductor (e.g., silicon).

In some embodiments, depositing the optical material forms at least part of a network of photonic switches comprising a Cantor network or a Benes network. In some embodiments, depositing the optical material forms at least part of a network of photonic switches comprising a first plurality of switches arranged to form Benes switches. Depositing the optical material may also form a second plurality of switches comprising input routing switches coupled between input ports disposed on the switch PIC substrate and the Benes switches. Finally, depositing the optical material may form waveguides and/or waveguide crossing coupling switches of the second plurality of switches to Benes switches disposed across the two or more reticles.

After act 2404, process 2400 may proceed to act 2406, in some embodiments. At act 2406, a chip comprising control circuitry may be coupled to the switch PIC substrate. For example, the chip may be electrically coupled to a top surface of the switch PIC substrate (e.g., as shown in the example of FIG. 20B herein). The chip may be electrically coupled to the top surface of the switch PIC substrate using any suitable method (e.g., solder bonding).

After act 2406, process 2400 may proceed to act 2408, in some embodiments. At act 2408, the switch PIC substrate may be bonded to a glass substrate. For example, the switch PIC substrate may be electrically and optically coupled to a top surface of the glass substrate (e.g., as shown in the example of FIG. 20B herein). Optical couplings between waveguides on the glass substrate and waveguides on the switch PIC substrate may be implemented using evanescent couplers. Electrical coupling may be implemented by bonding the switch PIC substrate to a top redistribution layer of the glass substrate using any suitable method (e.g., solder bonding).

In some embodiments, bonding the switch PIC substrate to the glass substrate also includes bonding a second switch PIC substrate. The two switch PIC substrates may support substantially identical networks of photonic switches, each switch PIC substrate supporting half of a complete switch network used to form the optical flow switch (e.g., as described in connection with FIG. 22A herein). The two switch PIC substrates may also be arranged such that their respective networks of photonics switches have mirror symmetry (e.g., being rotated 180 degrees relative to one another in a plane parallel to a plane of the glass substrate).

In some embodiments, the process 2400 further includes bonding one or more amplifier PICs to the glass substrate. For example, two amplifier PICs may be bonding to the glass substrate, a first amplifier PIC coupling input ports of the glass substrate to the switch PIC substrate and a second amplifier PIC coupling the switch PIC to output ports of the glass substrate. In some embodiments including two switch PICs, alternatively or additionally, an amplifier PIC may be bonded to the glass substrate between the two switch PICs such that the two switch PICs are optically coupled by the amplifier PIC.

In some embodiments, the glass substrate includes two glass substrates and the switch PIC includes two switch PICs. Bonding the switch PIC to the glass substrate may then include bonding a first switch PIC to a first glass substrate and bonding the second switch PIC to a second glass substrate. In some embodiments, the method may further include optically coupling the two switch PIC substrates using, for example, optical fibers coupled between the two glass substrates.

X. Bidirectional Communication

Figure 23:
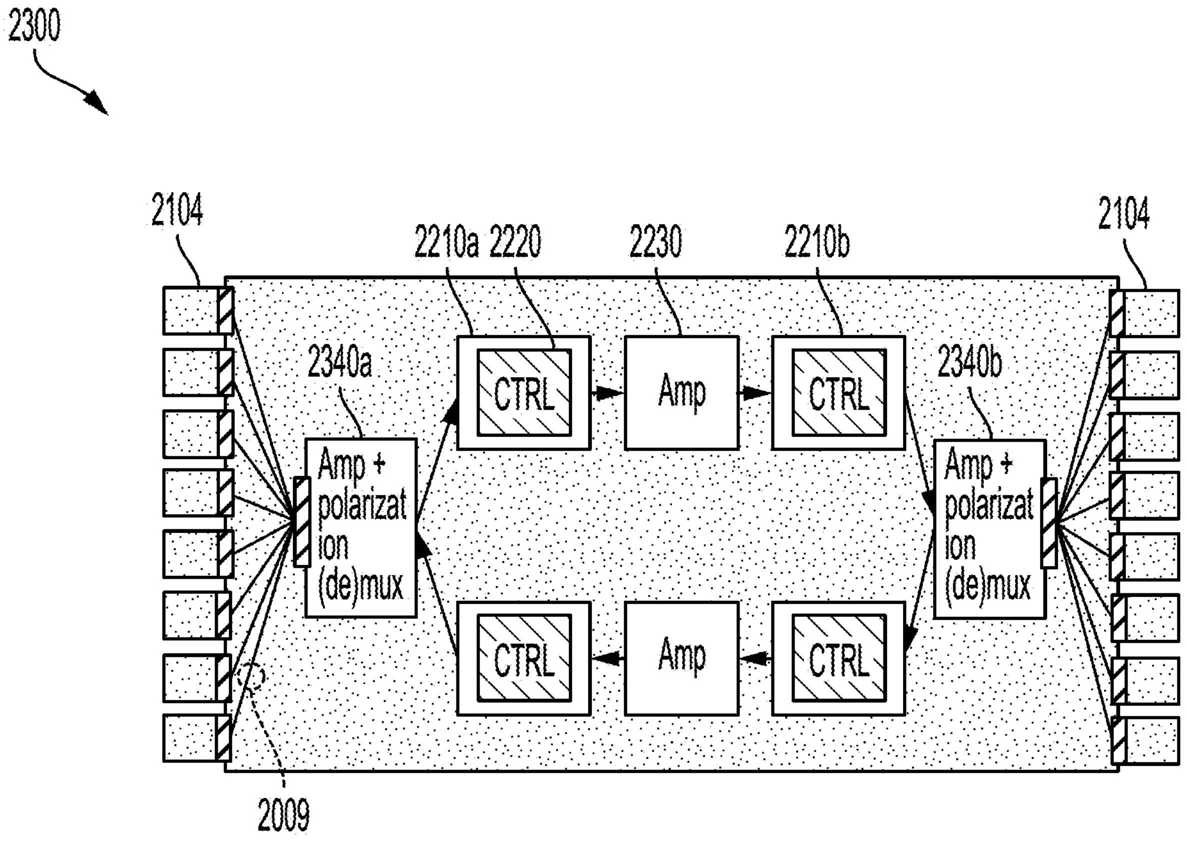
FIG. 23 is a schematic diagram of a bidirectional optical flow switch package, in accordance with some embodiments of the technology described herein.

In some embodiments, the optical flow switch may be configured to enable bidirectional communication using two different polarizations of light within single optical fibers. FIG. 23 depicts an example of an optical flow switch package 2300 including two switching branches: one for optical signals passing in one direction (e.g., left to right) and one for optical signals passing in the opposite direction (e.g., right to left). The optical flow switch package 2300 includes amplifier and polarization (de)multiplexing PICs 2340*a* and 2340*b* coupled to each set of passive fiber array units 2104. Two optical flow switch branches are coupled between the amplifier and polarization (de)multiplexing PICs 2340*a* and 2340*b*. Each branch includes two switch PICs 2210*a* and 2210*b* and a central amplifier PIC 2230 coupled between the two switch PICs 2210*a* and 2210*b*.

In some embodiments, the amplifier and polarization demultiplexing PICs 2340*a* and 2340*b* are each configured to demultiplex incoming optical signals and multiplex outgoing optical signals using the polarization state of the light. If the optical fibers coupled to the passive fiber array units 2104 are polarization-maintaining (PM) optical fibers, then the amplifier and polarization demultiplexing PICs 2340*a* and 2340*b* include a polarization splitter-rotator module that receives as input two signals in two polarizations (e.g., TE and TM polarizations) within a single glass/silicon waveguide and outputs to two separate waveguides using TE modes only. If the optical fibers coupled to passive fiber array units 2104 are single-mode (SM) optical fibers, then the amplifier and polarization demultiplexing PICs 2340*a* and 2340*b* include polarization devices as described in connection with FIGS. 25A-26B below.

The arrangement of optical flow switch package 2300 allows for communication links to be arranged at the simplex level (e.g., from one transmitter to only one receiver). For example, the transmitter of a first PIC may be in communication with the receiver of a second PIC, while the receiver of the first PIC may be in communication with the transmitter of a third PIC. The first PIC is not required to receive signals from the second PIC.

Figure 25A:
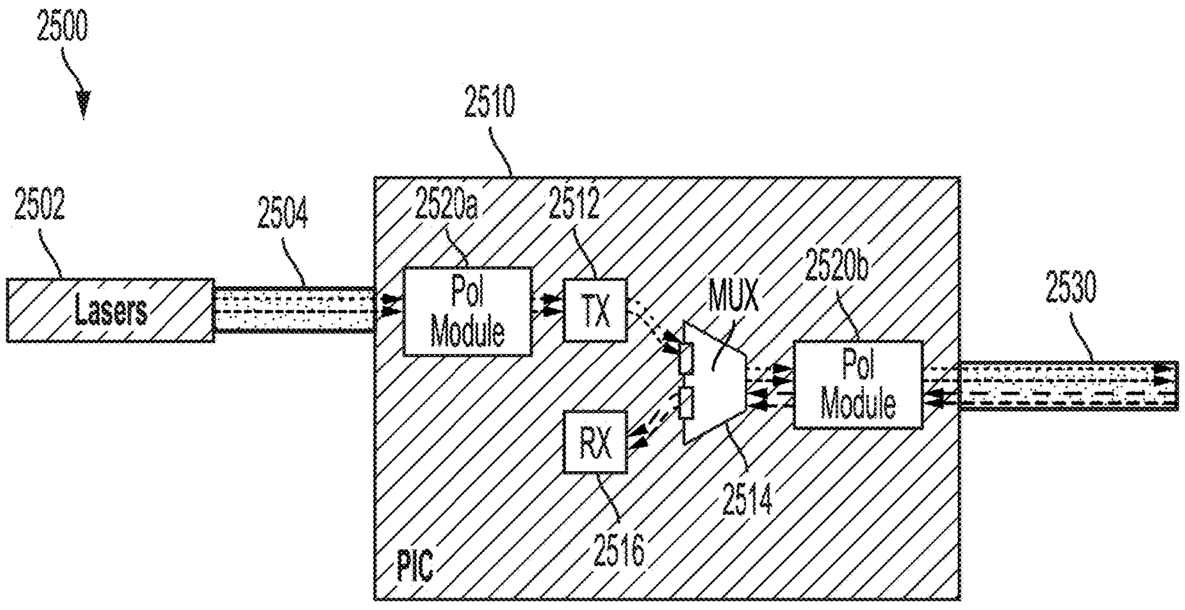
FIG. 25A is a schematic diagram of a PIC for implementing bidirectional wavelength-division multiplexed (WDM) communication, in accordance with some embodiments of the technology described herein.

In some embodiments, the amplifier and polarization demultiplexing PICs 2340*a* and 2340*b* may be configured as depicted in the example of FIG. 25A, which shows a polarization demultiplexing PIC system 2500 which is configured for bidirectional wavelength-division multiplexed (WDM) communication. The polarization demultiplexing PIC system 2500 includes a laser 2502 providing light to the PIC 2510 through SM optical fiber 2504. The randomized polarization state of the provided light from the laser 2502 is then provided to a polarization module 2520*a*, which splits, retimes, and recombines the light. The polarization module 2520*a* then outputs the light to the transmitter 2512, which selects desired wavelengths for communication.

In some embodiments, the PIC 2510 receives additional sets of wavelengths from off-chip through SM optical fiber 2530. The received light from SM optical fiber 2530 is similarly adjusted for polarization scrambling in the polarization module 2520*b*. An optical wavelength filter 2514 splits the two sets of wavelengths, providing appropriate routing to the receiver 2516 on the PIC 2510. The wavelength filter 2514 also acts as a circulator and is tunable to send a first set of wavelengths to the transmitter 2512 and a second set of wavelengths different than the first set of wavelengths to the receiver 2516. Alternatively, the positions of the polarization module 2520*b* and the optical wavelength filter 2514 may be switched because the optical wavelength filter 2514 is polarization independent, with incoming light from the SM optical fiber 2530 first passing through the optical wavelength filter 2514 and then through the polarization module 2520*b*, as aspects of this technology are not limited in this respect.

Figure 25B:
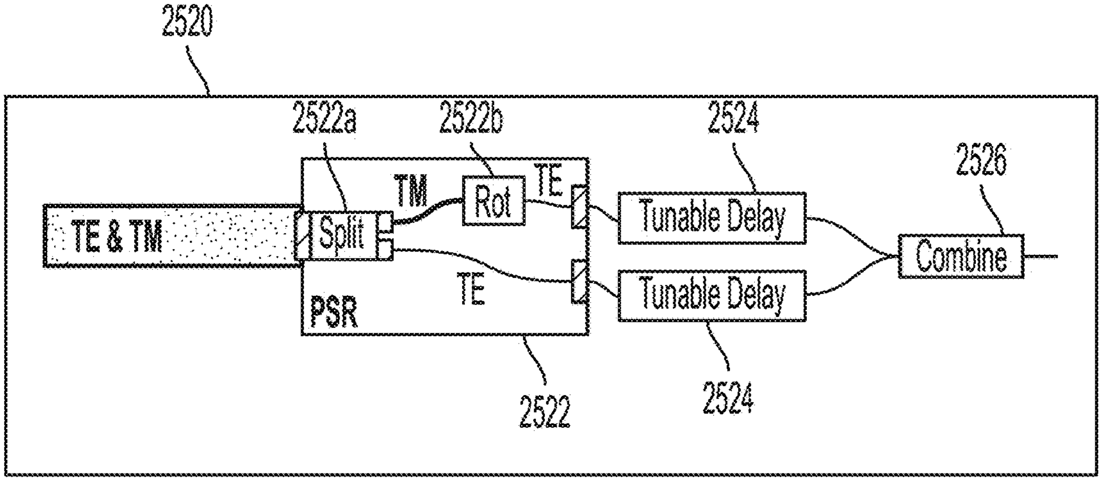
FIG. 25B is a schematic of a polarization management module of the PIC of FIG. 25A, in accordance with some embodiments of the technology described herein.

FIG. 25B is a schematic of an example of a polarization module 2520, which may be used as either or both of the polarization modules 2520*a* and 2520*b* on PIC 2510, in accordance with some embodiments of the technology described herein. The polarization module 2520 includes a polarization splitter and rotator (PSR) 2522 configured to convert received light having scrambled polarizations into two separate outputs having TE polarizations. The PSR 2522 includes a splitter 2522*a* configured to split the light into two paths: one for TE light and one for TM light. The path for TM light includes a rotator 2522*b* configured to rotate the TM light into a TE polarization.

In some embodiments, the two paths of light from the PSR 2522 are output to respective tunable delay lines 2524. The respective tunable delay lines 2524 are configured to compensate for polarization mode dispersion (PMD) within the SM optical fibers 2504 and 2530, as PMD is a linear phenomenon, and the TE and TM signals are traveling along the same optical fiber paths. The tunable delay lines 2524 are also configured to retime the two output TE signals so that they may be recombined at combiner 2526 with aligned phases.

Figure 26A:
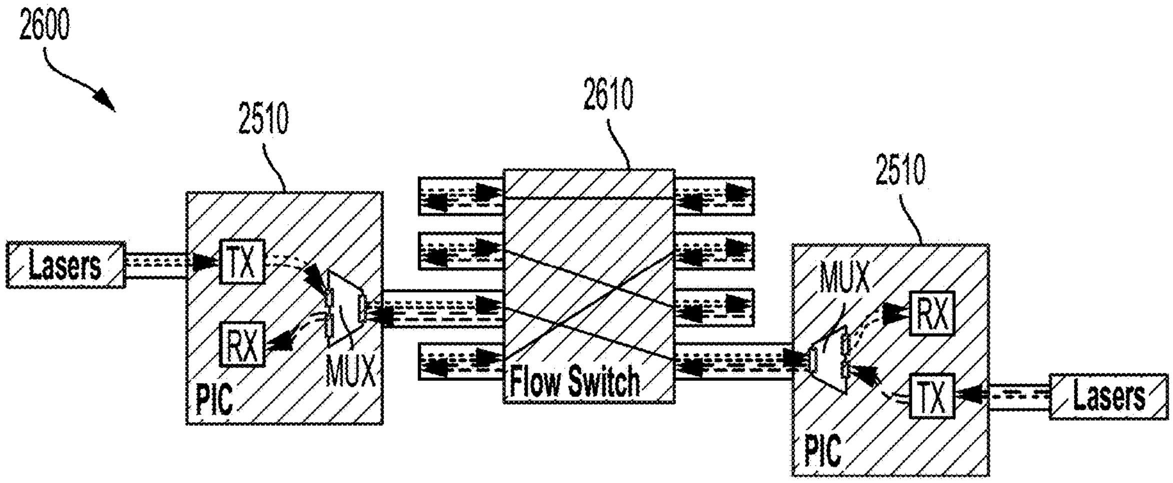
FIG. 26A is a schematic diagram of a system for implementing bidirectional WDM communication between two PICs intermediated by an optical flow switch, in accordance with some embodiments of the technology described herein.

In some embodiments, polarization demultiplexing PIC systems 2500 may be combined with an optical flow switch to form a bidirectional communication system. An example of a bidirectional communication system 2600 is depicted in FIG. 26A. The bidirectional communication system 2600 includes two PICs 2510, as described in connection with FIGS. 25A and 25B herein, coupled to opposing inputs of an optical flow switch 2610. This arrangement allows for fully duplexed communication between two PICs. For any single switch configuration, a first PIC can send signals to a second PIC, and using the same flow switch paths, signals from the second PIC can be received by the first PIC.

Figure 26B:
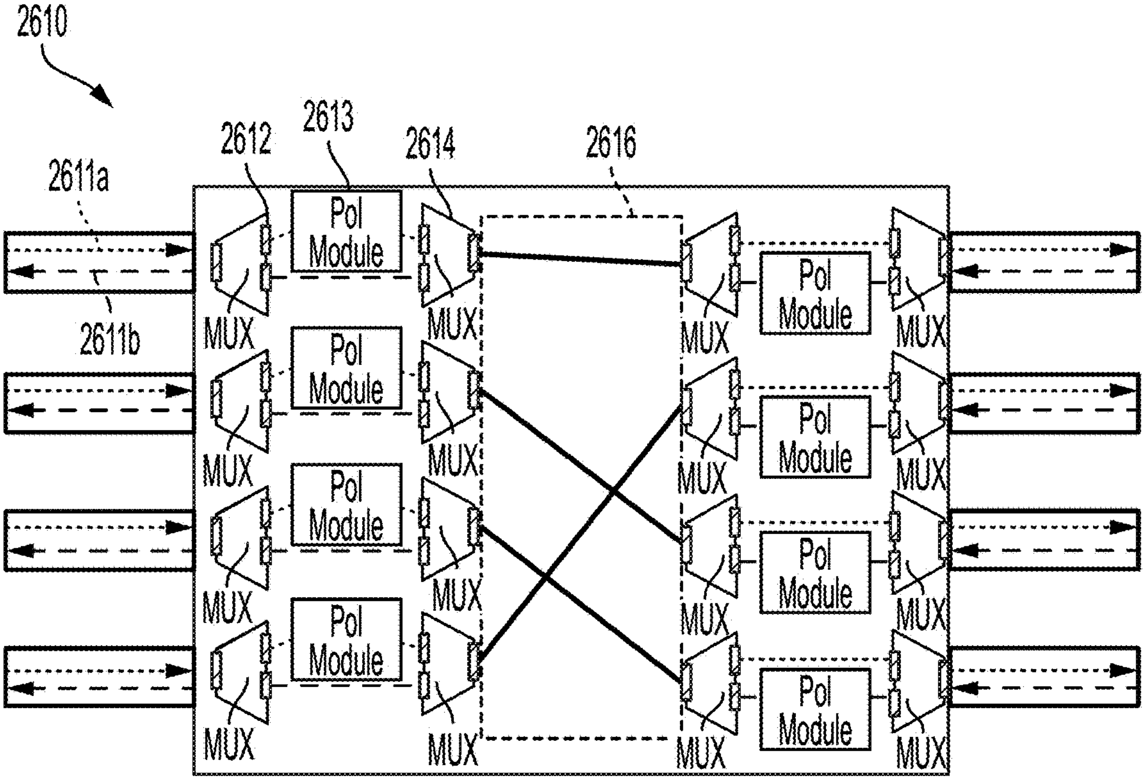
FIG. 26B is a schematic diagram of an optical flow switch suitable for intermediating bidirectional WDM communication, in accordance with some embodiments of the technology described herein.

While the optical flow switch 2610 may be polarization independent, in some embodiments the optical flow switch 2610 may be polarization dependent and include polarization management modules. An example of optical flow switch 2610 including polarization management modules 2613 is shown in FIG. 26B. As shown in FIG. 26B, the optical flow switch 2610 receives light of a first wavelength 2611*a* at a left side of the optical flow switch 2610 and receives light of a second wavelength 2611*b* at a right side of the optical flow switch 2610, the first and second wavelengths being different from one another. That is, the light having the first wavelength 2611*a* travels in one direction from left to right, and the light having the second wavelength 2611*b* travels in the opposite direction from right to left through the optical flow switch 2610.

At each input/output of the optical flow switch 2610, wavelength splitters 2612 and 2614 are coupled at either end of the polarization management modules 2613. The wavelength splitters 2612 and 2614 are arranged to select which wavelength of light is passing to the polarization management modules 2613. The wavelength splitters 2612 and 2614 are polarization independent in the configuration shown in the example of FIG. 26B. Alternatively, polarization management modules 2613 may be arranged so that light of both wavelengths 2611*a* and 2611*b* pass through the polarization management modules 2613, as aspects of the technology described herein are not limited in this respect.

In some embodiments, the polarization management modules 2613 are configured to compensate for polarization scrambling in SM optical fibers, as described in connection with polarization module 2520. Additionally, the polarization management modules 2613 are configured to provide light having the desired polarization to the switching layer 2616 within the optical flow switch 2610.

In some embodiments, the two PICs communicating across the optical flow switch 2610 can include two or more lasers configured to generate the light having the first wavelength 2611*a* and the light having the second wavelength 2611*b*. The two PICs can cooperatively determine a configuration where one PIC communicates using the first wavelength 2611*a* and the other PIC communicates using the second wavelength 2611*b*.

In some embodiments, three or more PICs may be communicating across the optical flow switch 2610. The system can determine that a first PIC of the three or more PICs will use light having the first wavelength 2611*a* to send data to a second PIC. Simultaneously, the first PIC may use light having the second wavelength 2611*b* to transmit data to the third PIC. The second PIC may then transmit data to the first PIC using light having the second wavelength 2611*b*, and the third PIC may transmit data to the first PIC using light having the first wavelength 2611*a*. In such embodiments, the optical flow switch 2610 may include polarization management modules 2613 on both optical arms between the wavelength splitters 2612 and 2614, thereby removing the restriction that light of one wavelength travel unidirectionally across the optical flow switch 2610. This arrangement allows for communications between two transceiver PICs that go through multiple flow switches.

XI. Crossing Stamps for Optical Flow Switches

The inventors have recognized that the complexity of crossings between waveguides can present challenges in designing the layout of a Benes switch using silicon photonics technology. Accordingly, the inventors have developed techniques for laying out optical flow switches using layer-by-layer or column-by-column cross stamps.

Figure 27A:
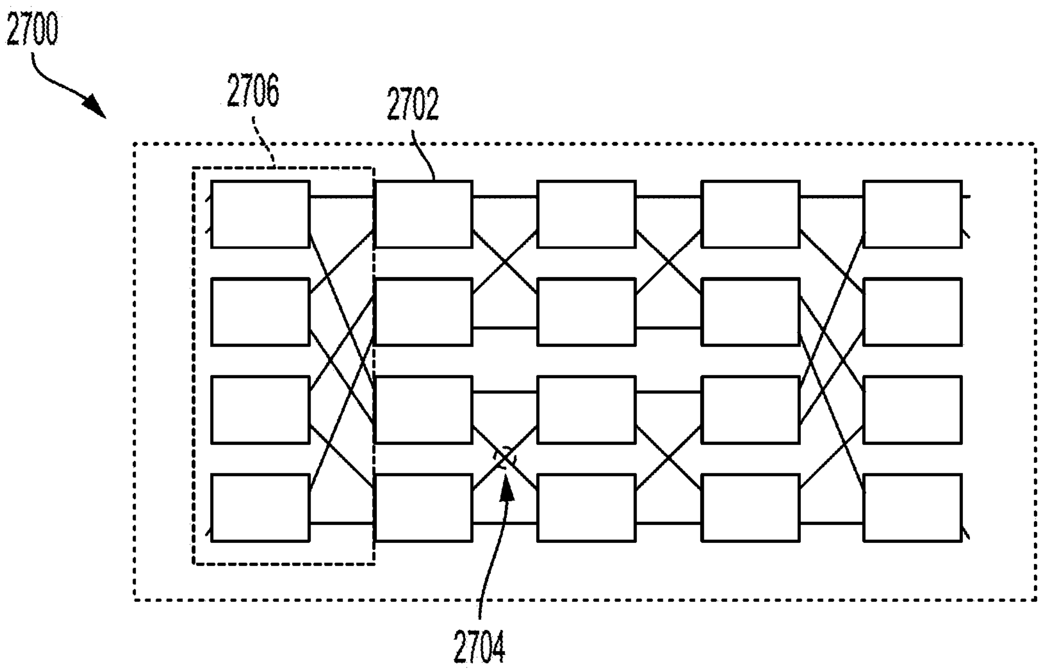
FIG. 27A is a schematic diagram of an 8×8 Benes switch, in accordance with some embodiments of the technology described herein.
Figure 27B:
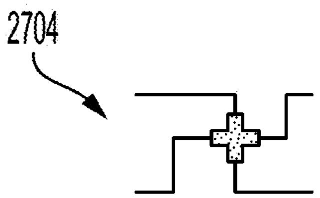
FIG. 27B is a schematic illustration of a waveguide crossing, in accordance with some embodiments of the technology described herein.

FIG. 27A is a schematic diagram of an 8×8 Benes switch 2700, in accordance with some embodiments of the technology described herein. The Benes switch 2700 includes photonic switches 2702 and waveguide crossings 2704. An example of a crossing stamp that may be used to implement waveguide crossings 2704 is shown in FIG. 27B, and an example design of a crossing stamp for use in photolithography is shown in FIG. 27D.

Figure 27C:
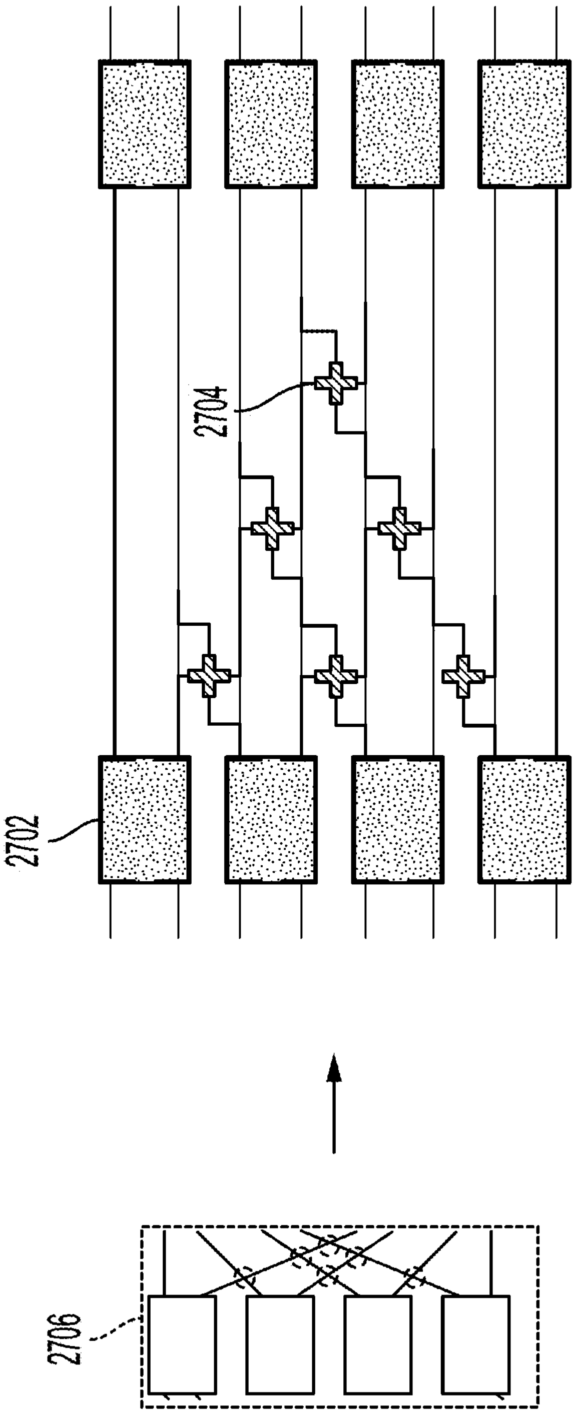
FIG. 27C is a schematic diagram of waveguide crossings in the first column of the Benes switch of FIG. 27A, in accordance with some embodiments of the technology described herein.
Figure 27D:
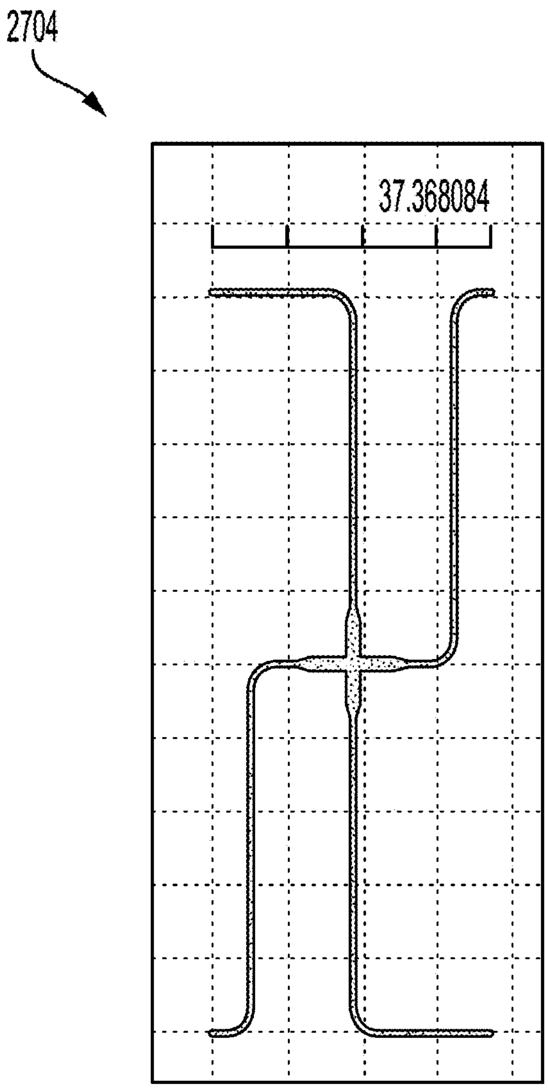
FIG. 27D is an illustration of a waveguide crossing, in accordance with some embodiments of the technology described herein.
Figure 28:
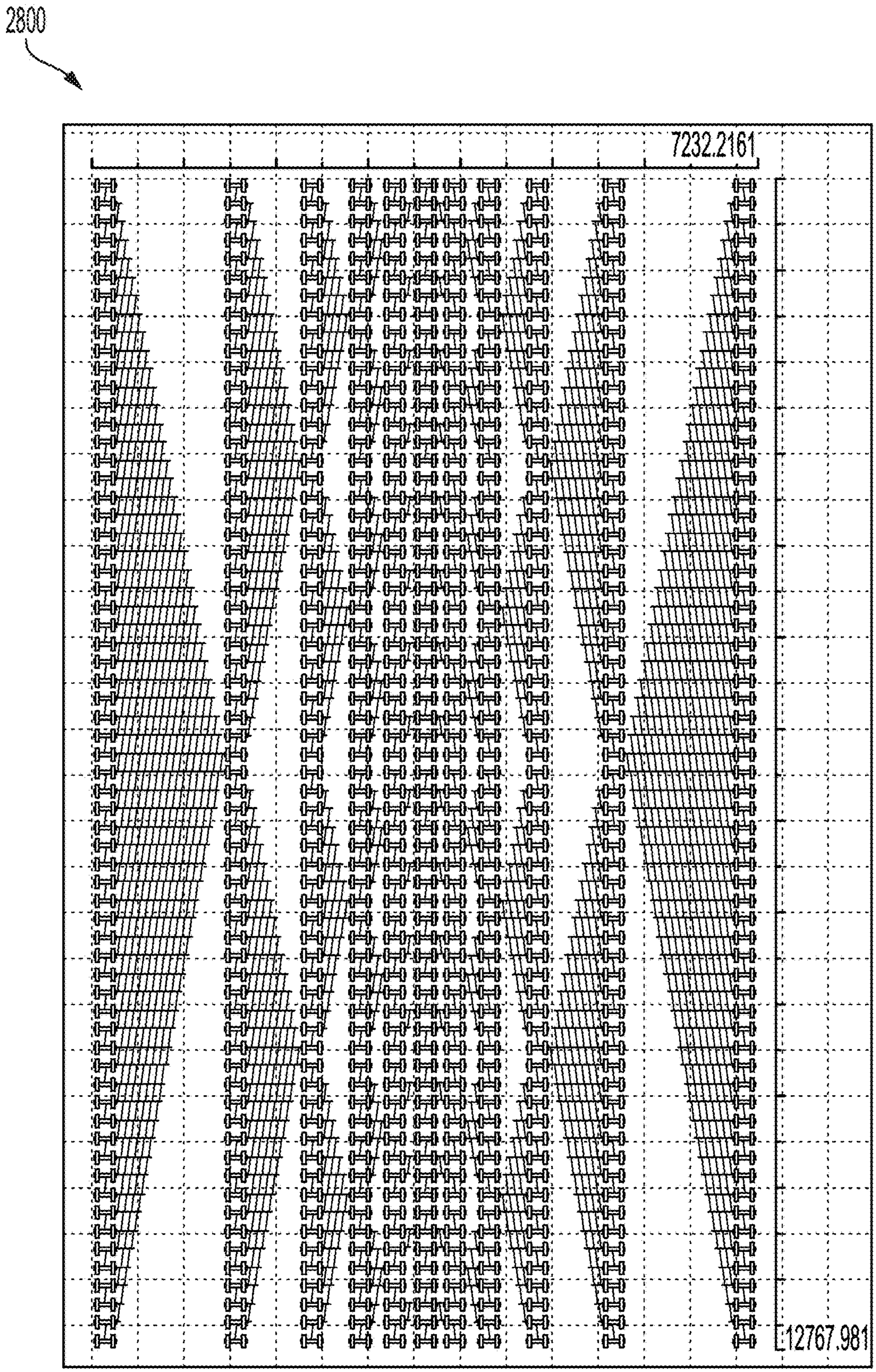
FIG. 28 is an illustration of a layout of a 64×64 Benes switch network, in accordance with some embodiments of the technology described herein.

FIG. 27C depicts the first layer 2706 of the Benes switch 2700 as constructed using multiple columns of crossing stamps, in accordance with some embodiments of the technology described herein. Waveguide crossings 2704 may be implemented using such crossing stamps because the crossings in a layer of a Benes switch can be understood as multiple layers or columns of crossing. The first column includes M crossings, the second column includes M−1 crossings, the third column has M−2 crossings, and so on. Here, M=S−1 where S is the number of switches the particular Benes layer connects to. For example, the first layer of an 8×8 Benes switch has S=4, and the second layer of an 8×8 Benes switch has S=2. The columns of crossing stamps will naturally lend itself to a triangular layout. FIG. 28 shows an example layout for a 64×64 Benes optical flow switch having such a triangular layout.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B,” when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within ±20% of a target value in some embodiments, within ±10% of a target value in some embodiments, within ±5% of a target value in some embodiments, within ±2% of a target value in some embodiments. The terms "approximately," "substantially," and "about" may include the target value.

What is claimed is:

1. An optical flow switch, comprising:

a network of photonic switches arranged between input and output ports of the optical flow switch, wherein:

the network of photonic switches spans two or more reticles, wherein the two or more reticles comprise rows or columns of reticles, each row or column of reticles being formed using a same set of reticle patterns, wherein:

the rows or columns of reticles comprise X rows or columns of reticles, and the optical flow switch further comprises 1: X and/or X:1 switch routers disposed between photonic switches of the network of photonic switches.

2. The optical flow switch of claim 1, wherein:

the two or more reticles comprise a same reticle pattern, and the network of photonic switches is formed of a repeating arrangement of the same reticle pattern.

3. The optical flow switch of claim 2, wherein the network of photonic switches comprises a first plurality of switches arranged to form Benes switches.

4. The optical flow switch of claim 3, wherein the network of photonic switches further comprises a second plurality of switches comprising input routing switches coupled between the input ports and the Benes switches.

5. The optical flow switch of claim 4, wherein switches of the second plurality of switches are coupled between an input port of the input ports and each Benes switch of the Benes switches.

6. The optical flow switch of claim 4, wherein switches of the second plurality of switches are coupled between an input port of the input ports and Benes switches disposed across the two or more reticles.

7. The optical flow switch of claim 4, wherein the second plurality of switches comprise:

first input routing switches arranged to receive optical signals from the input ports;

second input routing switches arranged to receive optical signals from the first routing switches; and third input routing switches arranged to receive optical signals from the second routing switches and to transmit optical signals to the Benes switches.

8. The optical flow switch of claim 7, wherein:

the network comprises an N×N Cantor network, the input ports comprise k input ports, the two or more reticles comprise r reticles, the Benes switches comprise m total $\tilde{N}\times\tilde{N}$ Benes switches, $\tilde{N}=2^{ceil(log_2 N)}$, $m=qr\geq\log_2\tilde{N}$, and $kr\geq\tilde{N}$.

9. The optical flow switch of claim 8, wherein:

the first input routing switches comprise k total 1: r photonic switches;

the second input routing switches comprise kr total 1: r photonic switches; and the third input routing switches comprise $kr^2$ total r: q photonic switches.

10. The optical flow switch of claim 4, wherein the network of photonic switches further comprises a third plurality of switches comprising output routing switches coupled between the Benes switches and the output ports.

11. The optical flow switch of claim 10, wherein switches of the third plurality of switches are coupled between each Benes switch and an output port of the output ports.

12. The optical flow switch of claim 10, wherein switches of the third plurality of switches are coupled between Benes switches disposed across the two or more reticles and an output port of the output ports.

13. The optical flow switch of claim 1, wherein the network of photonic switches comprises a Cantor network or a Benes network.

14. The optical flow switch of claim 1, wherein X=2.

15. The optical flow switch of claim 1, wherein X=4.

16. The optical flow switch of claim 15, further comprising 1:2 and/or 2:1 switch routers disposed between photonic switches of the network of photonic switches.

17. The optical flow switch of claim 1, wherein photonic switches of the network of photonic switches that are disposed in a first reticle are coupled to photonic switches of the network of photonic switches disposed in a second reticle by waveguides.

18. The optical flow switch of claim 1, wherein photonic switches of the network of photonic switches are disposed in an arrangement spanning two or more chips.

19. The optical flow switch of claim 18, wherein the two or more chips are coupled using optical fibers.

20. The optical flow switch of claim 1, wherein photonic switches of the network of photonic switches comprise a 2×2 Mach-Zehnder interferometer (MZI) switch.

21. The optical flow switch of claim 1, wherein photonic switches of the network of photonic switches comprise three MZI switches arranged in series.

22. The optical flow switch of claim 1, wherein photonic switches of the network of switches comprise a dilated MZI switch.

23. The optical flow switch of claim 1, wherein photonic switches of the network of photonic switches comprise silicon photonic switches.

24. The optical flow switch of claim 1, wherein the input and output ports comprise grating couplers, edge couplers, and/or v-groove couplers.

25. An optical flow switch, comprising:

a network of photonic switches arranged between input and output ports of the optical flow switch, wherein:

the network of photonic switches spans two or more reticles, wherein the two or more reticles comprise a same reticle pattern, and the network of photonic switches is formed of a repeating arrangement of the same reticle pattern, the network of photonic switches comprises a first plurality of switches arranged to form Benes switches and a second plurality of switches comprising input routing switches coupled between the input ports and the Benes switches, and the second plurality of switches comprise:

first input routing switches arranged to receive optical signals from the input ports;

second input routing switches arranged to receive optical signals from the first routing switches; and third input routing switches arranged to receive optical signals from the second routing switches and to transmit optical signals to the Benes switches.

26. The optical flow switch of claim 25, wherein:

the network comprises an N×N Cantor network, the input ports comprise k input ports, the two or more reticles comprise r reticles, the Benes switches comprise m total $\tilde{N}\times\tilde{N}$ Benes switches, $\tilde{N}=2^{ceil(log_2 N)}$, $m=qr\geq\log_2\tilde{N}$, and $kr\geq\tilde{N}$.

27. The optical flow switch of claim 26, wherein:

the first input routing switches comprise k total 1: r photonic switches;

the second input routing switches comprise kr total 1: r photonic switches; and the third input routing switches comprise $kr^2$ total r: q photonic switches.

28. The optical flow switch of claim 25, wherein the network of photonic switches further comprises a third plurality of switches comprising output routing switches coupled between the Benes switches and the output ports.

29. The optical flow switch of claim 28, wherein switches of the third plurality of switches are coupled between each Benes switch and an output port of the output ports.

30. The optical flow switch of claim 28, wherein switches of the third plurality of switches are coupled between Benes switches disposed across the two or more reticles and an output port of the output ports.

* * * * *